United States Patent
Lapstun et al.

(10) Patent No.: US 7,414,749 B2
(45) Date of Patent: *Aug. 19, 2008

(54) DUAL PRINTHEAD CONTROLLER ARCHITECTURE

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 61 days.

This patent is subject to a terminal disclaimer.

(21) Appl. No.: 11/501,775

(22) Filed: Aug. 10, 2006

(65) Prior Publication Data

US 2006/0268293 A1    Nov. 30, 2006

Related U.S. Application Data

(63) Continuation of application No. 10/273,848, filed on Oct. 21, 2002, now Pat. No. 7,187,470, which is a continuation of application No. 09/459,409, filed on Dec. 11, 1999, now Pat. No. 7,239,407.

(30) Foreign Application Priority Data

Dec. 16, 1998   (AU)   ..................... PP7737
Dec. 16, 1998   (AU)   ..................... PP7738
Dec. 16, 1998   (AU)   ..................... PP9961

(51) Int. Cl.
G06F 15/00    (2006.01)
G06K 1/00     (2006.01)
G06K 15/00    (2006.01)

(52) U.S. Cl. ........................ 358/1.8; 358/1.1

(58) Field of Classification Search .......... 358/1.1–1.18
See application file for complete search history.

(56) References Cited

U.S. PATENT DOCUMENTS

| | | | |
|---|---|---|---|
| 4,739,344 A | 4/1988 | Sullivan et al. | |
| 4,860,652 A | 8/1989 | Kawata | |
| 4,874,264 A | 10/1989 | Suzuki et al. | |
| 5,103,263 A | 4/1992 | Moore et al. | |
| 5,147,209 A | 9/1992 | Litwin et al. | |
| 5,251,295 A | 10/1993 | Ikenoue et al. | |
| 5,495,801 A | 3/1996 | Denkert | |
| 5,558,449 A | 9/1996 | Morgavi | |
| 5,663,942 A | 9/1997 | Ishibashi et al. | |
| 5,784,077 A | 7/1998 | Silverbrook | |
| 5,833,375 A * | 11/1998 | Gauthier et al. | ............... 400/82 |
| 5,949,464 A | 9/1999 | Hirata et al. | |
| 6,179,419 B1 | 1/2001 | Rasmussen et al. | |
| 6,267,518 B1 | 7/2001 | Abe | |
| 6,350,005 B1 | 2/2002 | Asai et al. | |
| 6,493,937 B1 * | 12/2002 | Axtell et al. | ............... 29/890.1 |

FOREIGN PATENT DOCUMENTS

| | | | |
|---|---|---|---|
| JP | 57178758 A | 4/1982 |
| JP | 5147209    | 5/1993 |

* cited by examiner

Primary Examiner—Douglas Q Tran

(57) ABSTRACT

Dual printhead controller architecture includes a master central processor capable of being interfaced with a first printhead. A slave central processor is capable of being interfaced with a second printhead. Data transfer means is operatively connected between the master central processor and the slave central processor to permit communication between the master and slave central processors. A host link is operatively connected to the master central processor to permit the master central processor to receive page data from a host processor.

5 Claims, 37 Drawing Sheets

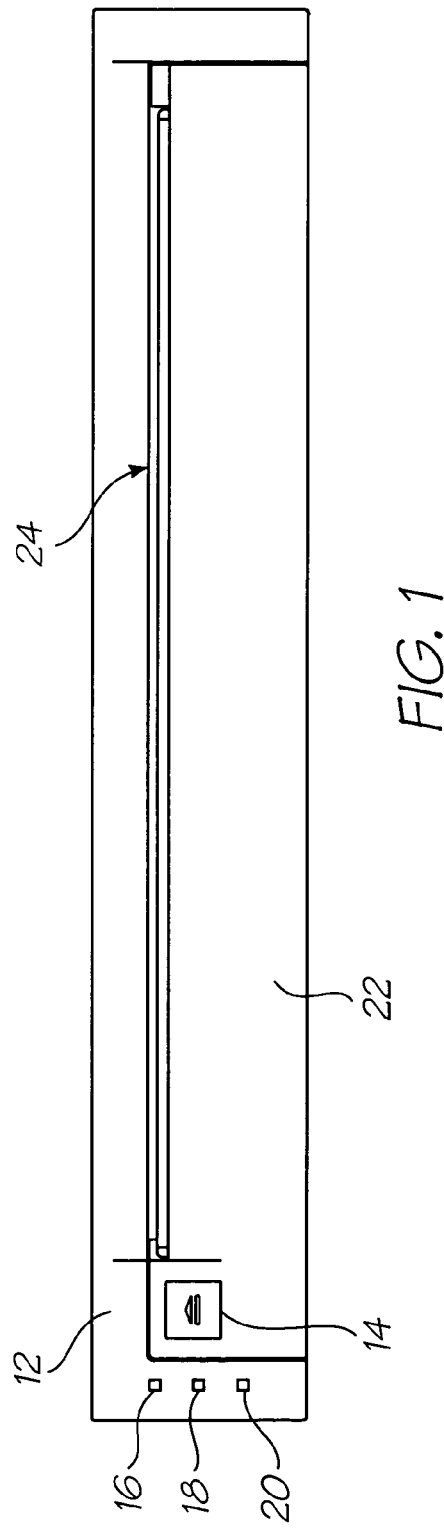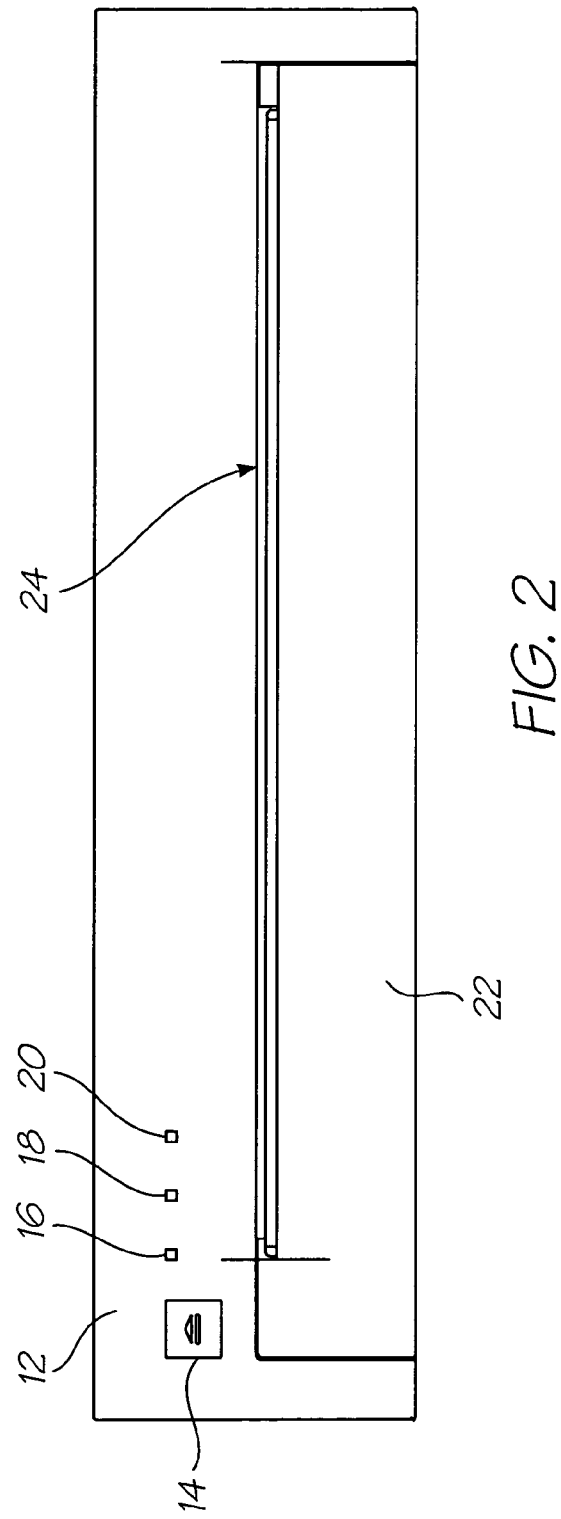

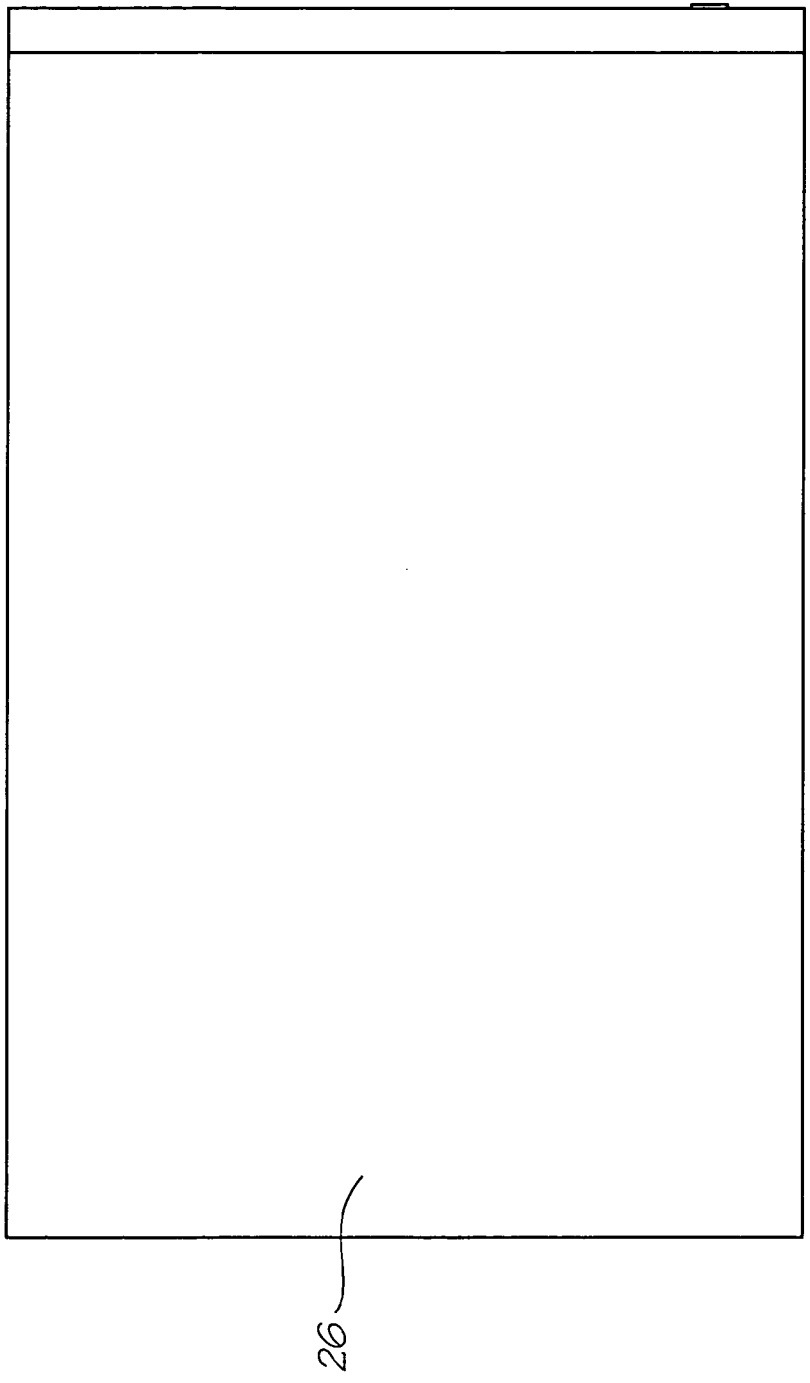

Δ0
Δ0
Δ0
create 5, create 3, Δ0
Δ-1, Δ+1, Δ0
Δ-1, create 2, kill, Δ0
Δ-1, Δ-1, Δ0
Δ+1, Δ+1, Δ0
Δ+1, kill, create 5, Δ0
Δ+1, Δ-1, Δ0
kill, kill, Δ0
create 0, kill, create 13
Δ0, Δ0
Δ0, Δ0
kill, kill, create 13, EOP C = Cyan
M = magenta
Y = Yellow
K = Black 5 chromapods C = Cyan
M = Magenta
Y = Yellow
K = Black

DUAL PRINTHEAD CONTROLLER ARCHITECTURE

CROSS REFERENCE TO RELATED APPLICATION

The present application is a Continuation of U.S. application Ser. No. 10/273,848 filed on Oct. 21, 2002, which is a continuation of U.S. application Ser. No. 09/459,409 filed on Dec. 11, 1999, all of which is herein incorporated by reference.

FIELD OF THE INVENTION

This invention relates to a printing system. More particularly, the invention relates to a controller for controlling printing on both surfaces of a sheet of print media and to a method of controlling printing on both surfaces of a sheet of print media.

SUMMARY OF THE INVENTION

According to a first aspect of the invention, there is provided a controller for controlling printing on both surfaces of a sheet of print media, the controller including:

a first print controller for controlling printing by a page width printhead of a first print engine;

a second print controller for controlling printing by a page width printhead of a second print engine substantially simultaneously with the printing by the printhead of the first print engine;

a first communications link interconnecting the first print controller and the second print controller for synchronizing the print controllers; and a second communications link interconnecting at least one of the print controllers with a host system for receipt from the host system of descriptions of pages to be printed on said surfaces of the sheet of print media by the print engines.

In this specification, unless the context clearly indicate otherwise the term "page width printhead", is to be understood as a printhead having a printing zone that prints one line at a time on a page, the line being parallel either to a longer edge or a shorter edge of the page. The line is printed as a whole as the page moves past the printhead and the printhead is stationary, i.e. it does not raster.

The first print controller is, preferably, a master print controller with the second print controller being a slave print controller operable under command of the master print controller on receipt of signals via the first communications link.

The first communications link may be a bi-directional link enabling the transmission of data from the slave print controller to the master print controller. Thus, after the printing of a page, or more frequently, the master print controller may obtain ink consumption information from the slave print controller via the first communications link. The master print controller uses this to update the remaining ink volume in an ink cartridge. Further, the master print controller and slave print controller may also exchange error events and host-initiated printer reset commands via the first communications link.

The master print controller may have the second communications link connected to it to present a unified view to the host system to mask the presence of the slave print controller. The master print controller may print described pages on a rear surface of the print media with the slave print controller printing on a front surface of the print media so that the master print controller always has a page buffer available for a page description destined for the slave print controller.

Print synchronization may be achieved by the master print controller controlling a printing operation of the slave print controller. Printhead interfaces of both print controllers may be synchronized to a shared line synchronization signal generated by one of the print controllers.

According to a second aspect of the invention there is provided a method of controlling printing on both surfaces of a sheet of print media, the method including the steps of:

receiving data relating to a first page to be printed in a first print controller of a first print engine;

transmitting the data relating to the first page from the first print controller to a second print controller of a second print engine;

receiving data relating to a second page to be printed in the first print controller; and controlling printing by the print engines under command of the first print controller to achieve synchronization of printing of the pages by the first print controller and the second print controller on rear and front surfaces of the print media, respectively.

The method may include synchronizing printhead interfaces of both print controllers by means of a shared line synchronization signal generated by the first print controller which is a master print controller. Further, the method may include transmitting data relating to the pages to be printed from a host system to the master print controller by means of a host communications link, the master print controller determining whether or not said data are to be routed to the second print controller which is a slave print controller.

The method may also include receiving said data in its entirety in a memory of the master print controller before forwarding it to the slave print controller.

The method may include selecting the master print controller to print the rear surface of the print media to ensure that the master print controller always has a page buffer available for a page description destined for the slave print controller.

As described above, the method may include, periodically, transmitting predetermined data from the slave print controller to the master print controller.

BRIEF DESCRIPTION OF THE DRAWINGS

The invention is now described by way of example with reference to the accompanying drawings in which:

FIG. 1 shows a front view of a CePrint printer, in accordance with a first embodiment if the invention;

FIG. 2 shows a front view of the printer, in accordance with a second embodiment of the invention;

FIG. 3 shows a side view of the printer of FIG. 1;

FIG. 4 shows a plan view of the printer of FIG. 1;

DETAILED DESCRIPTION OF THE DRAWINGS

1 Introduction

Figure 5:
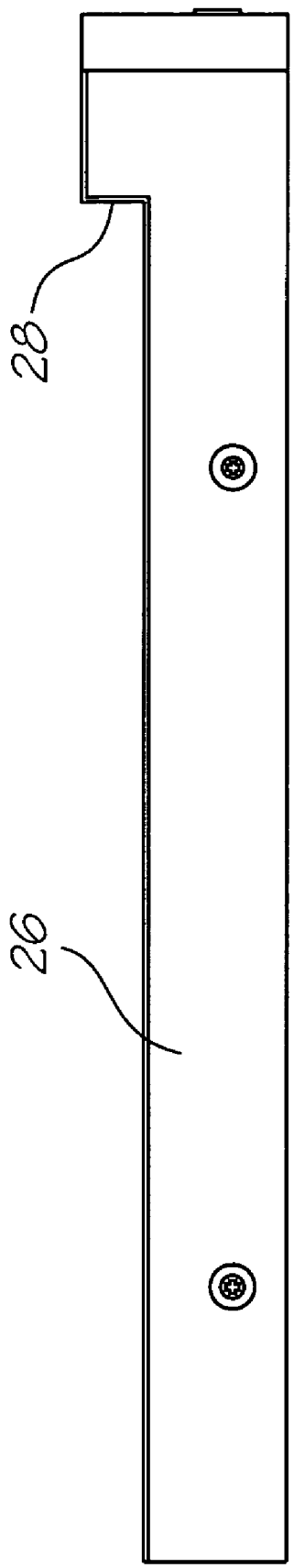
FIG. 5 shows a side view of the printer of FIG. 2.

The printer, in accordance with the invention, is a high-performance color printer which combines photographic-quality image reproduction with magazine-quality text reproduction. It utilizes an 8" page-width microelectromechanical inkjet printhead which produces 1600 dots per inch (dpi) bi-level CMYK (Cyan, Magenta, Yellow, blacK). In this description the printhead technology shall be referred to as "Memjet", and the printer shall be referred to as "CePrint".

CePrint is conceived as an original equipment manufacture (OEM) part designed for inclusion primarily in consumer electronics (CE) devices. Intended markets include televisions, VCRs, PhotoCD players, DVD players, Hi-fi systems, Web/Internet terminals, computer monitors, and vehicle consoles. As will be described in greater detail below, it features a low-profile front panel and provides user access to paper and ink via an ejecting tray. It operates in a horizontal orientation under domestic environmental conditions.

CePrint exists in single- and double-sided versions. The single-sided version prints 30 full-color A4 or Letter pages per minute. The double-sided version prints 60 full-color pages per minute (i.e. 30 sheets per minute). Although CePrint supports both paper sizes, it is configured at time of manufacture for a specific paper size.

1.1 Operational Overview

CePrint reproduces black text and graphics directly using bi-level black, and continuous-tone (contone) images and graphics using dithered bi-level CMYK. For practical purposes, CePrint supports a black resolution of 800 dpi, and a contone resolution of 267 pixels per inch (ppi).

CePrint is embedded in a CE device, and communicates with the CE device (host) processor via a relatively low-speed (1.5 MBytes/s) connection. CePrint relies on the host processor to render each page to the level of contone pixels and black dots. The host processor compresses each rendered page to less than 3 MB for sub-two-second delivery to the printer. CePrint decompresses and prints the page line by line at the speed of its micro-electromechanical inkjet (Memjet) printhead. CePrint contains sufficient buffer memory for two compressed pages (6 MB), allowing it to print one page while receiving the next, but does not contain sufficient buffer memory for even a single uncompressed page (119 MB).

The double-sided version of CePrint contains two printheads which operate in parallel. These printheads are fed by separate data paths, each of which replicates the logic found in the single-sided version of CePrint. The double-sided version has a correspondingly faster connection to the host processor (3 MB/s).

2 Product Specification

Table 1 gives a summary product specification of the single-sided and double-sided versions of the CePrint unit.

TABLE 1

CePrint Specification

| | single-sided version | double-sided version |
|---|---|---|
| dot pitch | 1600 dpi | |
| paper | standard A4/Letter | |
| paper tray capacity | 150 sheets | |
| print speed | 30 pages per minute | 60 pages per minute, 30 sheets per minute |
| warm-up time | nil | |
| first print time | 2-6 seconds | |
| subsequent prints | 2 seconds/sheet | |
| color model | 32-bit CMYK process color | |
| printable area | full page (full edge bleed) | |
| printhead | page width Memjet with 54,400 nozzles | dual printheads |
| print method | self-cleaning transfer roller, titanium nitride (TiN) coated | dual transfer rollers |
| size (h × w × d) | 40 mm × 272 mm × 416 mm | 60 mm × 272 mm × 416 mm |
| weight | 3 kg (approx.) | 4 kg (approx.) |
| power supply | 5 V, 4 A | 5 V, 8 A |
| ink cartridge color capacity | 650 pages at 15% coverage | |
| ink cartridge black capacity | 900 pages at 15% coverage | |
| ink cartridge size (h × w × d) | 21 mm × 188 mm × 38 mm | |

3 Memjet-based Printing

A Memjet printhead produces 1600 dpi bi-level CMYK. On low-diffusion paper, each ejected drop forms an almost perfectly circular 22.5 mm diameter dot. Dots are easily produced in isolation, allowing dispersed-dot dithering to be exploited to its fullest. Since the Memjet printhead is page-width and operates with a constant paper velocity, the four color planes are printed in perfect registration, allowing ideal dot-on-dot printing. Since there is consequently no spatial interaction between color planes, the same dither matrix is used for each color plane.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a number of intensity levels (i.e. 16×16×8 bits for 257 intensity levels). CePrint uses a dither volume of size 64×64×3×8 bits. The volume provides an extra degree of freedom during the design of the dither by allowing a dot to change states multiple times through the intensity range, rather than just once as in a conventional dither matrix.

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree. At a normal viewing distance of 12 inches (about 300 mm), this translates roughly to 200-300 cycles per inch (cpi) on the printed page, or 400-600 samples per inch according to Nyquist's theorem. Contone resolution beyond about 400 pixels per inch (ppi) is therefore of limited utility, and in fact contributes slightly to color error through the dither.

Black text and graphics are reproduced directly using bi-level black dots, and are therefore not antialiased (i.e. low-pass filtered) before being printed. Text is therefore super-sampled beyond the perceptual limits discussed above, to produce smoother edges when spatially integrated by the eye. Text resolution up to about 1200 dpi continues to contribute to perceived text sharpness (assuming low-diffusion paper, of course).

4 Page Delivery Architecture

4.1 Page Image Sizes

CePrint prints A4 and Letter pages with full edge bleed. Corresponding page image sizes are set out in Table 2 for various spatial resolutions and color depths used in the following discussion. Note that the size of an A4 page exceeds the size of a Letter page, although the Letter page is wider. Page buffer requirements are therefore based on A4, while line buffer requirements are based on Letter.

TABLE 2

Page Image Sizes

| spatial resolution (pixels/inch) | color depth (bits/pixel) | A4[a] page buffer size | Letter[b] page buffer size |
|---|---|---|---|
| 1600 | 32 | 948 MB | 913 MB |
| 800 | 32 | 237 MB | 228 MB |
| 400 | 32 | 59.3 MB | 57.1 MB |
| 267 | 32 | 26.4 MB | 25.4 MB |
| 1600 | 4 | 119 MB | 114 MB |
| 800 | 4 | 29.6 MB | 28.5 MB |
| 1600 | 1 | 29.6 MB | 28.5 MB |
| 800 | 1 | 7.4 MB | 7.1 MB |

[a] 210 mm × 297 mm, or 8.3" × 11.7"
[b] 8.5" × 11"

4.2 Constraints

The act of interrupting a Memjet-based printer during the printing of a page produces a visible discontinuity, so it is advantageous for the printer to receive the entire page before commencing printing, to eliminate the possibility of buffer underrun. Furthermore, if the transmission of the page from the host to the printer takes significant time in relation to the time it takes to print the page, then it is advantageous to provide two page buffers in the printer so that one page can be printed while the next is being received. If the transmission time of a page is less than its 2-second printing time, then double-buffering allows the full 30 pages/minute page rate of CePrint to be achieved.

Figure 6:
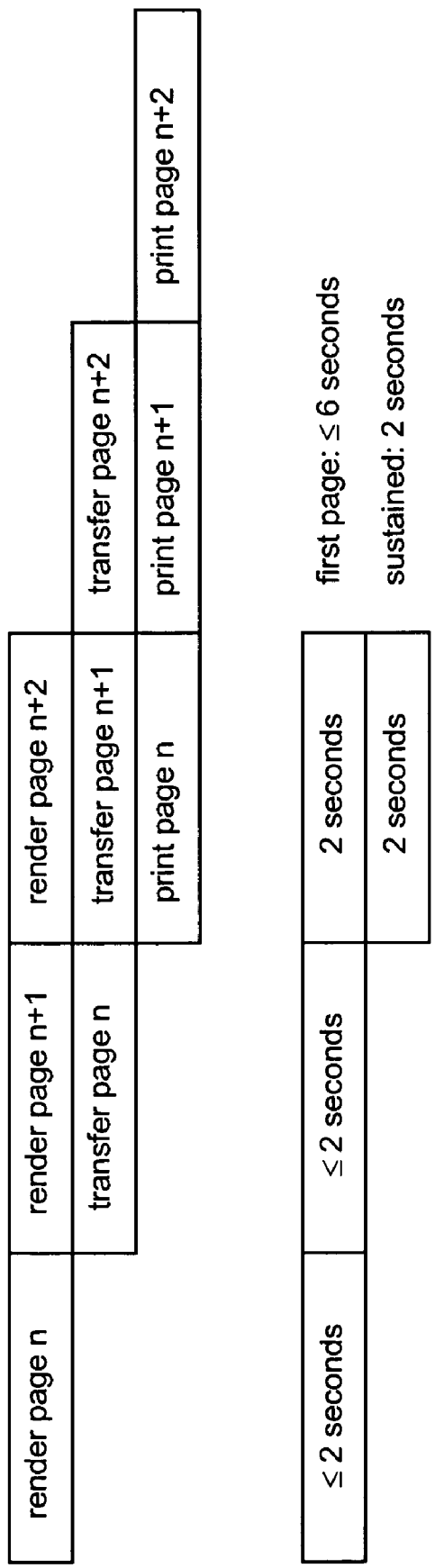
FIG. 6 shows a table illustrating a sustained printing rate of the printer achievable with double-buffering in the printer.

FIG. 6 illustrates the sustained printing rate achievable with double-buffering in the printer, assuming 2-second page rendering and 2-second page transmission.

Assuming it is economic for the printer to have a maximum of only 8 MB of memory (i.e. a single 64 Mbit DRAM), then less than 4 MB is available for each page buffer in the printer, imposing a limit of less than 4 MB on the size of the page image. To allow for program and working memory in the printer, we limit this to 3 MB per page image.

Assuming the printer has only a typical low-speed connection to the host processor, then the speed of this connections is 2 MB/s (i.e. 2 MB/s for parallel port, 1.5 MB/s for USB, and 1 MB/s for 10Base-T Ethernet). Assuming 2-second page transmission (i.e. equal to the printing time), this imposes a limit of 2-4 MB on the size of the page image, i.e. a limit similar to that imposed by the size of the page buffer.

In practice, because the host processor and the printer can be closely coupled, a high-speed connection between them may be feasible.

Whatever the speed of the host connection required by the single-sided version of CePrint, the double-sided version requires a connection of twice that speed.

4.3 Page Rendering and Compression

Page rendering (or rasterization) can be split between the host processor and printer in various ways. Some printers support a full page description language (PDL) such as Postscript, and contain correspondingly sophisticated renderers. Other printers provide special support only for rendering text, to achieve high text resolution. This usually includes support for built-in or downloadable fonts. In each case the use of an embedded renderer reduces the rendering burden on the host processor and reduces the amount of data transmitted from the host processor to the printer. However, this comes at a price. These printers are more complex than they might be, and are often unable to provide full support for the graphics system of the host, through which application programs construct, render and print pages. They fail to exploit the possibly high performance of the host processor.

CePrint relies on the host processor to render pages, i.e. contone images and graphics to the pixel level, and black text and graphics to the dot level. CePrint contains only a simple rendering engine which dithers the contone data and combines the results with any foreground bi-level black text and graphics. This strategy keeps the printer simple, and independent of any page description language or graphics system. It fully exploits the high performance expected in the host processor of a multimedia CE device. The downside of this strategy is the potentially large amount of data which must be transmitted from the host processor to the printer. We therefore use compression to reduce the page image size to the 3 MB required to allow a sustained printing rate of 30 pages/minute.

An 8.3"×11.7" A4 page has a bi-level CMYK page image size of 119 MBytes at 1600 dpi, and a contone CMYK pagesize of 59.3 MB at 400 ppi.

We use JPEG compression to compress the contone data. Although JPEG is inherently lossy, for compression ratios of 10:1 or less the loss is usually negligible. To achieve a high-quality compression ratio of less than 10:1, and to obtain an integral contone to bi-level ratio, we choose a contone resolution of 267 ppi. This yields a contone CMYK pagesize of 25.5 MB, a corresponding compression ratio of 8.5:1 to fit within the 3 MB/page limit, and a contone to bi-level ratio of 1:6 in each dimension.

A full page of black text (and/or graphics) rasterized at printer resolution (1600 dpi) yields a bi-level image of 29.6 MB. Since rasterizing text at 1600 dpi places a heavy burden on the host processor for a small gain in quality, we choose to rasterize text at 800 dpi. This yields a bi-level image of 7.4 MB, requiring a lossless compression ratio of less than 2.5:1 to fit within the 3 MB/page limit. We achieve this using a two-dimensional bi-level compression scheme similar to the compression scheme used in Group 4 Facsimile.

As long as the image and text regions of a page are non-overlapping, any combination of the two fits within the 3 MB limit. If text lies on top of a background image, then the worst case is a compressed page image size approaching 6 MB (depending on the actual text compression ratio). This fits within the printer's page buffer memory, but prevents double-buffering of pages in the printer, thereby reducing the printer's page rate by two-thirds, i.e. to 10 pages/minute.

4.4 Page Expansion and Printing

As described above, the host processor renders contone images and graphics to the pixel level, and black text and graphics to the dot level. These are compressed by different means and transmitted together to the printer.

The printer contains two 3 MB page buffers—one for the page being received from the host, and one for the page being printed. The printer expands the compressed page as it is being printed. This expansion consists of decompressing the 267 ppi contone CMYK image data, halftoning the resulting contone pixels to 1600 dpi bi-level CMYK dots, decompressing the 800 dpi bi-level black text data, and compositing the resulting bi-level black text dots over the corresponding bi-level CMYK image dots.

Figure 7:
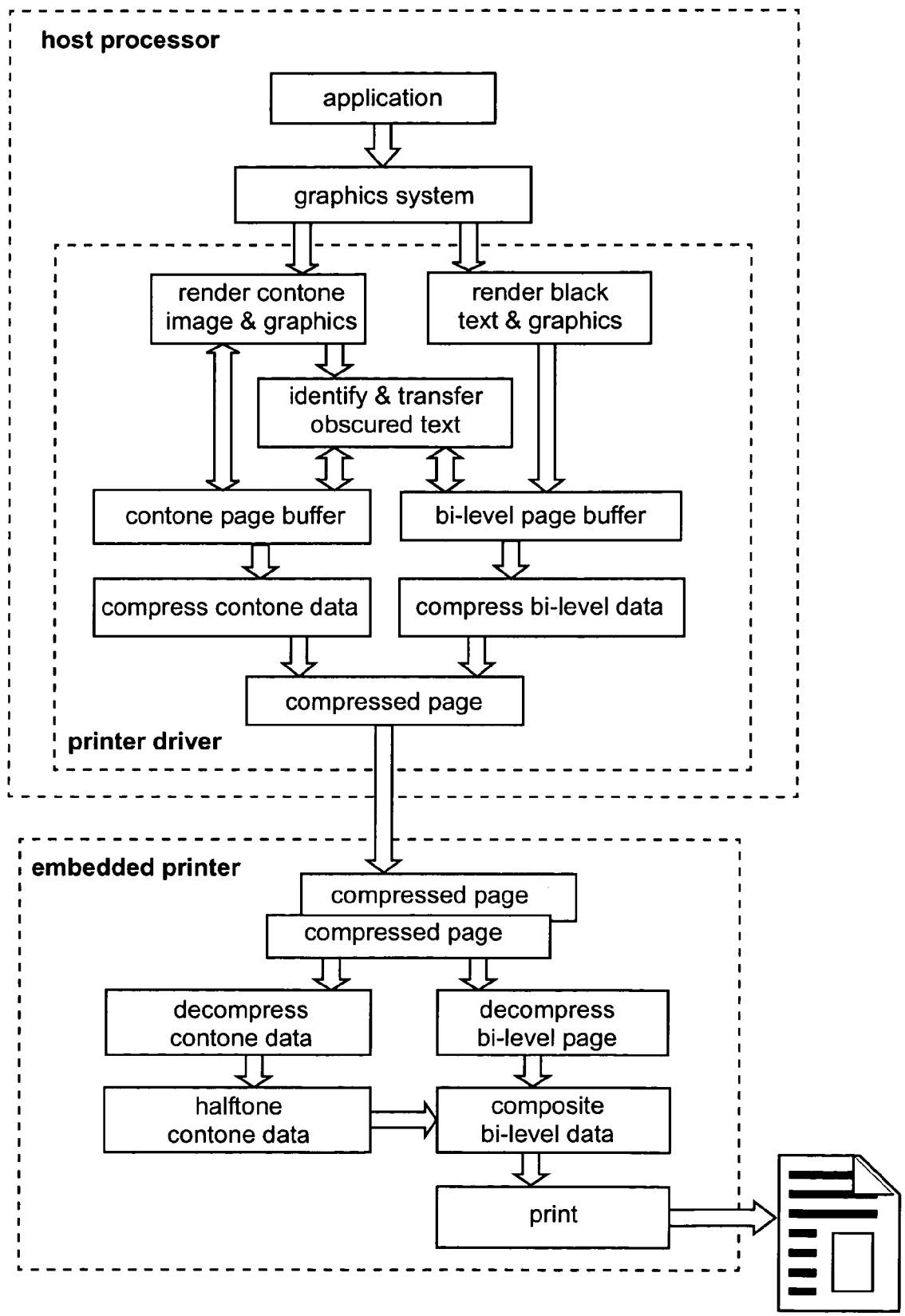
FIG. 7 shows a flowchart illustrating the conceptual data flow from application to printed page.

The conceptual data flow from the application to the printed page is illustrated in FIG. 7.

5 Printer Hardware

CePrint is conceived as an OEM part designed for inclusion primarily in consumer electronics (CE) devices. Intended markets include televisions, VCRs, PhotoCD players, DVD players, Hi-fi systems, Web/Internet terminals, computer monitors, and vehicle consoles. It features a low-profile front panel and provides user access to paper and ink via an ejecting tray. It operates in a horizontal orientation under domestic environmental conditions.

Because of the simplicity of the page width Memjet printhead, CePrint contains an ultra-compact print mechanism which yields an overall product height of 40 mm for the single-sided version and 60 mm for the double-sided version.

The nature of an OEM product dictates that it should be simple in style and reflect minimum dimensions for inclusion into host products. CePrint is styled to be accommodated into all of the target market products and has minimum overall dimensions of 40 mm high×272 mm wide×416 mm deep. The only cosmetic part of the product is the front fascia and front tray plastics. These can be re-styled by a manufacturer if they wish to blend CePrint with a certain piece of equipment.

Front views of the two versions of CePrint or the printer are illustrated in FIGS. 1 and 2, respectively, of the drawings and are designated generally by the reference numeral 10. It is to be noted that, mechanically, both versions are the same, apart from the greater height of the double-sided version to accommodate a second print engine instead of a pinch roller. This will be described in greater detail below. Side and plan views of the single-sided version of CePrint are illustrated in FIGS. 3 and 4 respectively. The side view of of the double-sided version of CePrint is illustrated in FIG. 5.

CePrint 10 is a motorized A4/Letter paper tray with a removable ink cartridge and a Memjet printhead mechanism. It includes a front panel 12 housing a paper eject button 14, a power LED 16, an out-of-ink LED 18 and an out-of-paper LED 20. A paper tray 22 is slidably arranged relative to the front panel 12. When the paper tray 22 is in its "home" position, a paper output slot 24 is defined between the front panel 12 and the paper tray 22.

The front panel 12 fronts a housing 26 containing the working parts of the printer 10. As illustrated in 5 of the drawings, the housing 26, in the case of the double-sided version is stepped, at 28, towards the front panel 12 (FIGS. 1 and 2) to accommodate the second print engine. The housing 26 covers a metal chassis 30 (FIG. 8), fascias, the (molded) paper tray 22, an ink cartridge 32 (FIG. 10), three motors, a flex PCB 34 (FIG. 8A), a rigid PCB 36 (FIG. 8) and various injection moldings and smaller parts to achieve a cost effective high volume product.

The printer 10 is simple to operate, only requiring user interaction when paper or ink need replenishing as indicated by the front-panel LEDs 20 or 18, respectively. The paper handling mechanisms are similar to current printer applications and are therefore considered reliable. In the rare event of a paper jam, the action of ejecting the paper tray allows the user to deal with the problem. The tray 22 has a sensor which retracts the tray if the tray 22 is pushed. If the tray 22 jams on the way in, this is also sensed and the tray 22 is re-ejected. This allows the user to be lazy in operating the tray 22 by just pushing it to close and protects the unit from damage should the tray 22 get knocked while in the out position. It also caters for children sticking fingers in the tray 22 while closing. Ink is replaced by inserting a new cartridge 32 into the paper tray 22 (FIG. 8) and securing it by a cam lock lever mechanism.

5.1 Overview

Figure 8:
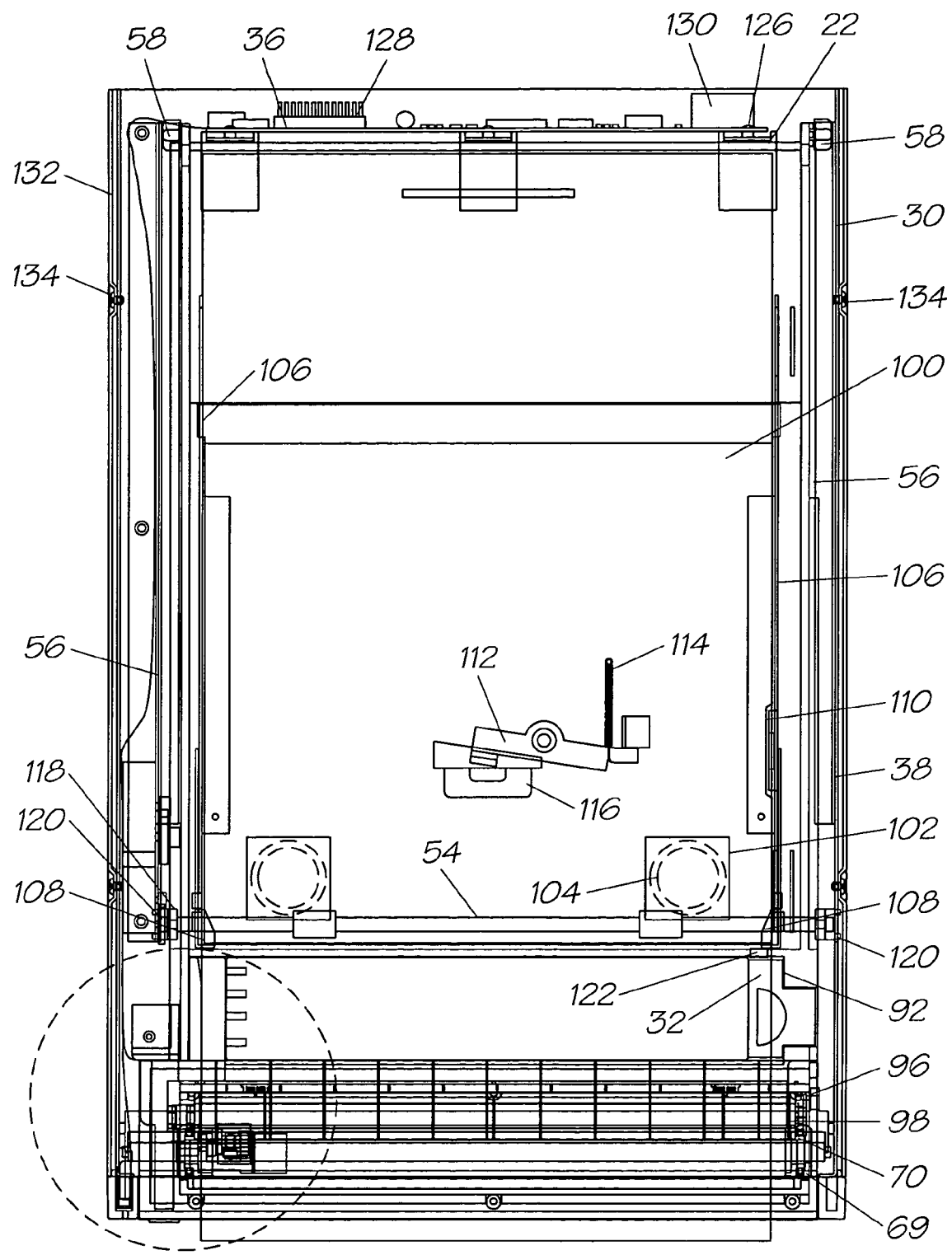
FIG. 8 shows a schematic, sectional plan view of the printer.
Figure 8A:
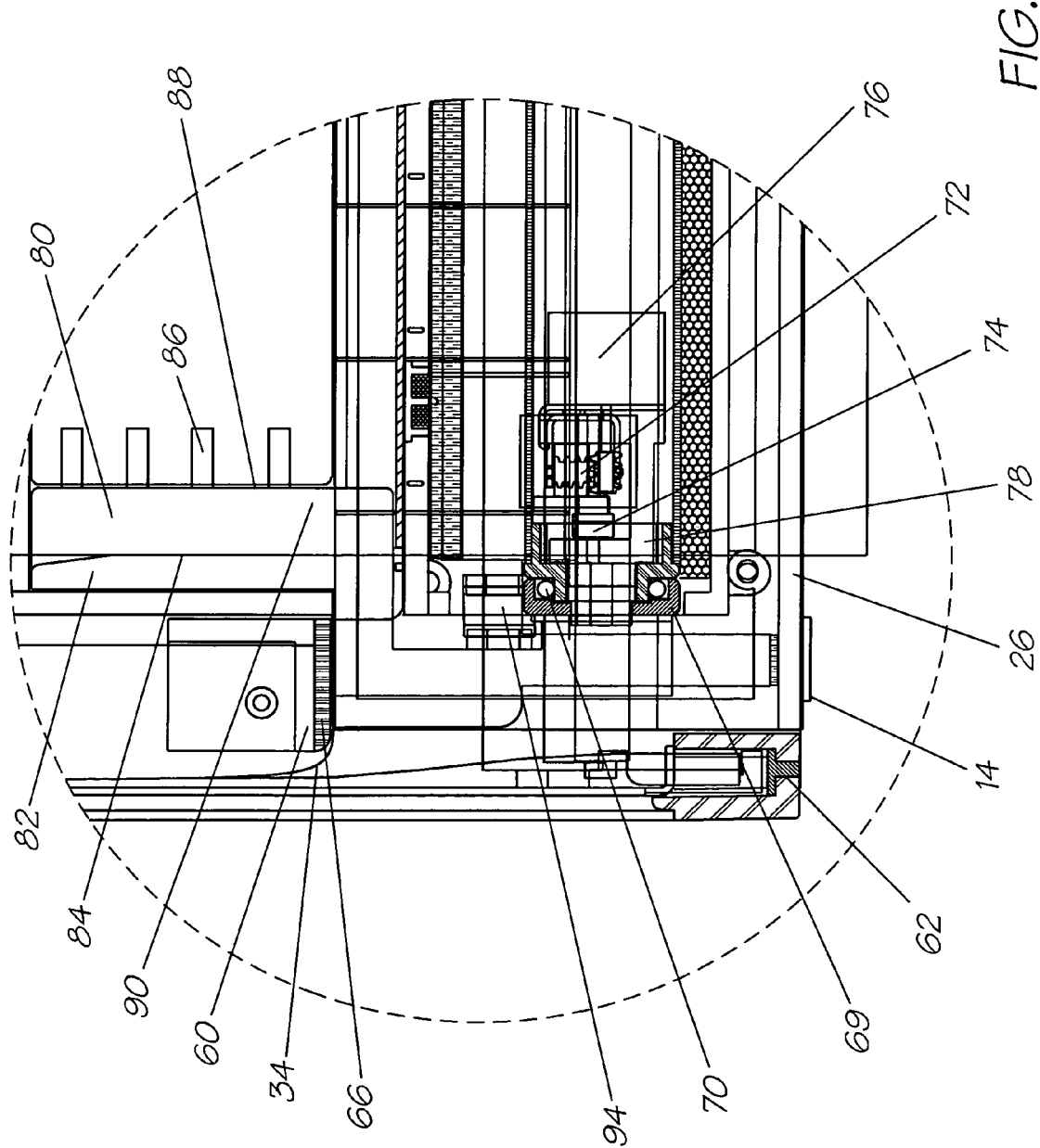
FIG. 8A shows a detailed view of the area circled in FIG. 8.
Figure 9:
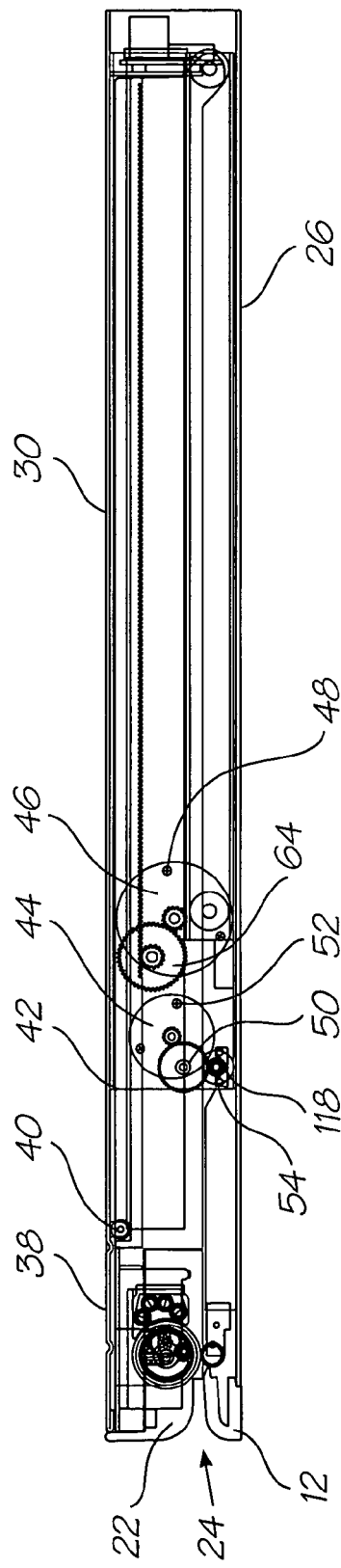
FIG. 9 shows a side view, from one side, of the printer of FIG. 8.
Figure 10:
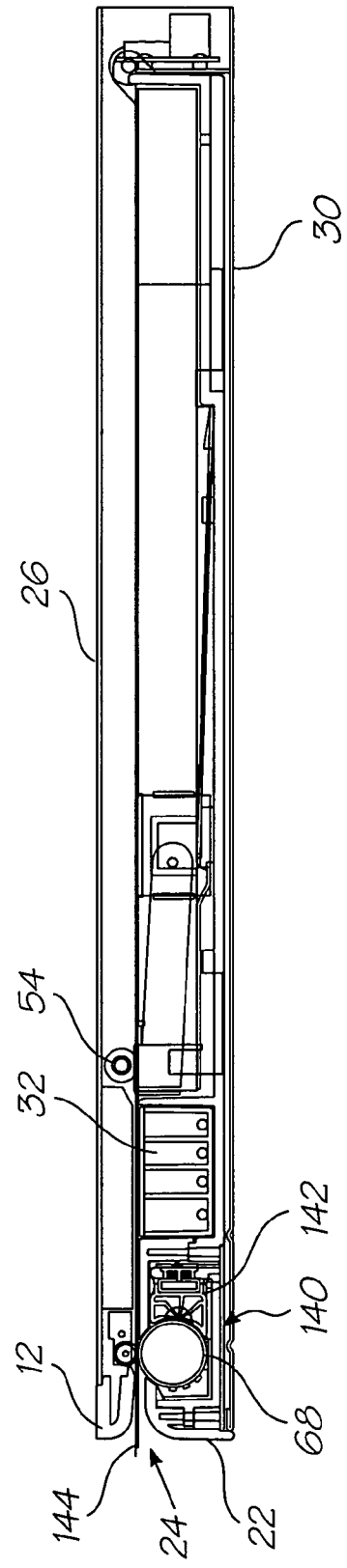
FIG. 10 shows a side view, from the other side, of the printer of FIG. 8.

The overall views of CePrint 10 are shown in FIGS. 8 to 10. As shown in FIG. 9 the chassis 30 includes base metalwork 38 on which front roller wheels 40 of the paper tray 22 are slidable. A bracket 42 accommodates motors 44, 46 and 48 and gears 50 and 52 for ejecting the paper tray 22 and driving a paper pick-up roller 54.

Attached to the bracket 42 and the base metalwork 38 are two guide rails 56 that allow the molded paper tray 22 and its rear roller wheels 58 to slide forward. As described above, the tray 22 also sits on front rollers 40 a this provides a strong, low friction and steady method of ejection and retraction. The flex PCB 34 (FIG. 8A) runs from the main PCB 36 via the motors 44, 46 and 48 to a contact molding 60 and a lightpipe area 62. An optical sensor on the flex PCB 34 allows the tray ejector motor 46 to retract the tray 22 independently of the eject button 14 if the tray 22 is pushed when in the out position by sensing a hole in a gear wheel 64 (FIG. 9). Similarly, the tray 22 is ejected if there is any stoppage during retraction.

The contact molding 60 has a foam pad 66 that the flex PCB 34 is fixed onto and provides data and power contacts to the printhead and bus bars during printing.

Figure 14:
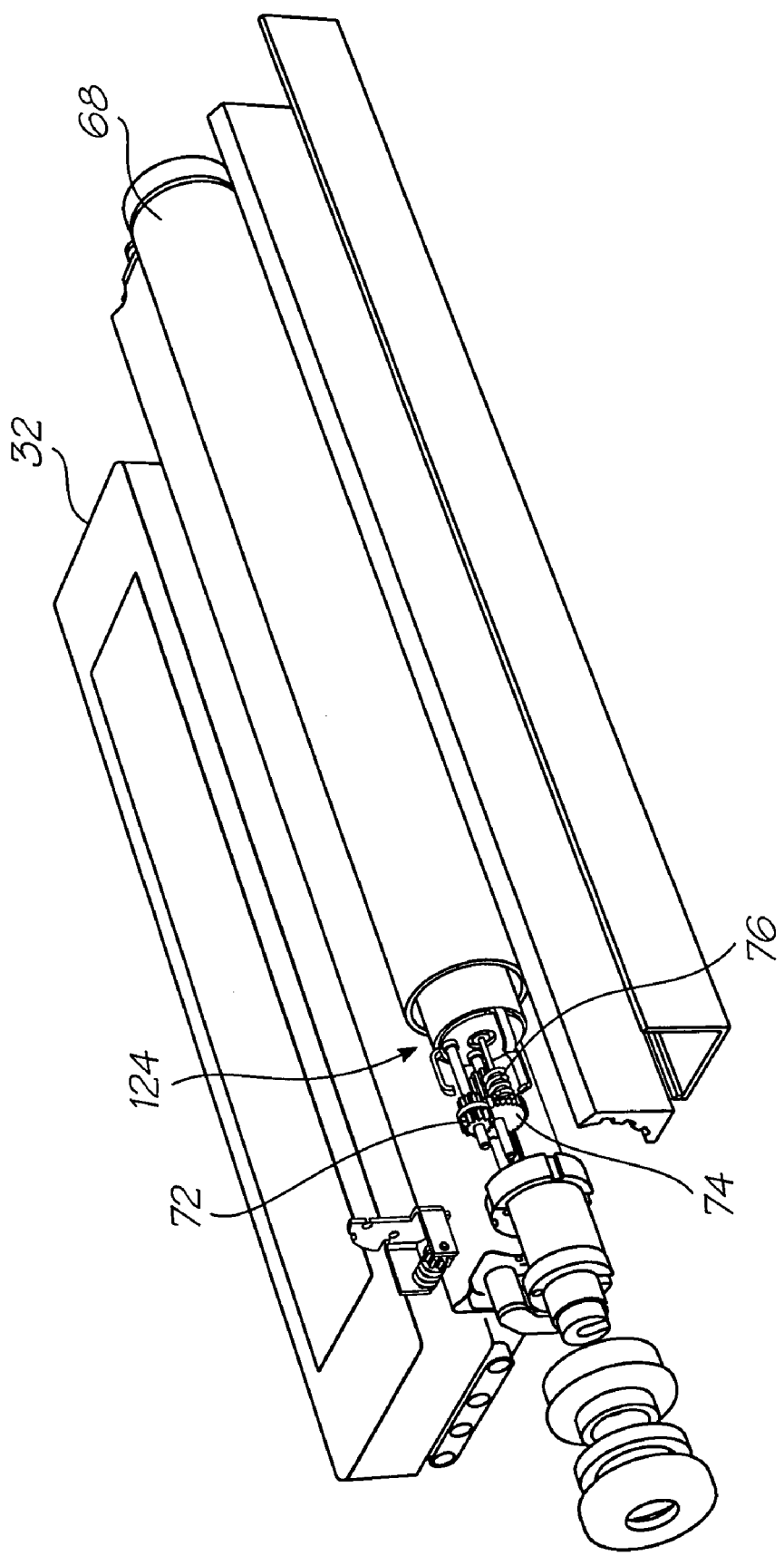
FIG. 14 shows a three-dimensional, exploded view of a paper drive chain of the printer.

A transfer roller 68 (FIG. 11) has two end caps 69 (FIG. 8A) that run in low friction bearing assemblies 70. One of the end caps 69 has an internal gear that acts on a small gear 72 (FIG. 14) which transfers power through a reduction gear 74 to a worm drive. This is reduced further via another gear to a motor worm drive 76 mounted on an output shaft of a stepper motor 124 arranged within the transfer roller 68. This solution for a motor drive assembly that is housed inside the transfer roller 68 saves space for future designs and mounts onto a small chassis 78 (FIG. 8A) that is attached to ink connector moldings 80, 82.

An ink connector 84 has four pins 86 with an ejector plate 88 and springs 90 that interfaces with the ink cartridge 32 (FIG. 10). The ink cartridge 32 is accessed via a cam lock lever and spring 92 (FIG. 8). The ink is conducted through molded channels into a flexible four-channel hose connector 94 that interfaces with a printhead cartridge end cap 96. The other end of the printhead cartridge has a different flexible sealing connector 98 (FIG. 8) on the end cap to allow ink to be drawn through the cartridge during assembly and effectively charge the unit and ink connector with ink in a sealed environment. The printhead and ink connector assemblies are mounted directly into the paper tray 22.

The paper tray 22 has several standard paper handling components, namely a metal base channel 100 (FIG. 8) with low friction pads 102, sprung by two compression springs 104 and two metal paper guides 106 with arms 108 secured by rivets. The paper is aligned to one side of the tray 22 by a spring steel clip 110. The tray 22 is normally configured to take A4 paper, but Letter size paper is accommodated by relocating one of the paper guide assemblies 106 and clipping a plate into the paper tray 22 to provide a rear stop. The paper tray 22 can accommodate up to 150 sheets.

As is standard practice for adding paper, the metal base channel 100 is pushed down and is latched using a tray lock molding 112 and a return spring 114. When paper has been added and the tray 22 retracted, the tray lock molding 112 is unlatched by hitting a metal return 116 in the base metalwork 38 (FIG. 9).

The printer 10 is now ready to print. When activated, the paper pick-up roller 54 is driven by a small drive gear 118 that meshes with another drive gear 50 and a normal motor 44. The roller 54 is located to the base metalwork 38 (FIG. 9) by two heat staked retainer moldings 120 (FIG. 8). A small molding on the end of the pick-up roller 54 acts with a sensor on the flex PCB 34 to accurately position the pick-up roller 54 in a parked position so that paper and tray 22 can be withdrawn without touching it when ejecting. This accurate positioning also allows the roller 54 to feed the sheet to the transfer roller 68 (FIG. 10) with a fixed number of revolutions. As the transfer roller 68 is running at a similar speed there should be no problem with take-up of the paper. An optical sensor 122 mounted into the housing 26 finds the start of each sheet and engages a transfer motor 124 (FIG. 14), so there is no problem if for example a sheet has moved forward of the roller during any strange operations.

The main PCB 36 is mounted onto the base metalwork 38 via standard PCB standoffs 126 and is fitted with a data connector 128 and a DC connector 130.

The front panel 12 is mounted onto the base metalwork 38 using snap details and a top metal cover 132 completes the overall product with RFI/EMI integrity via four fixings 134.

5.2 Printhead Assembly and Image Transfer Mechanism

Figure 11:
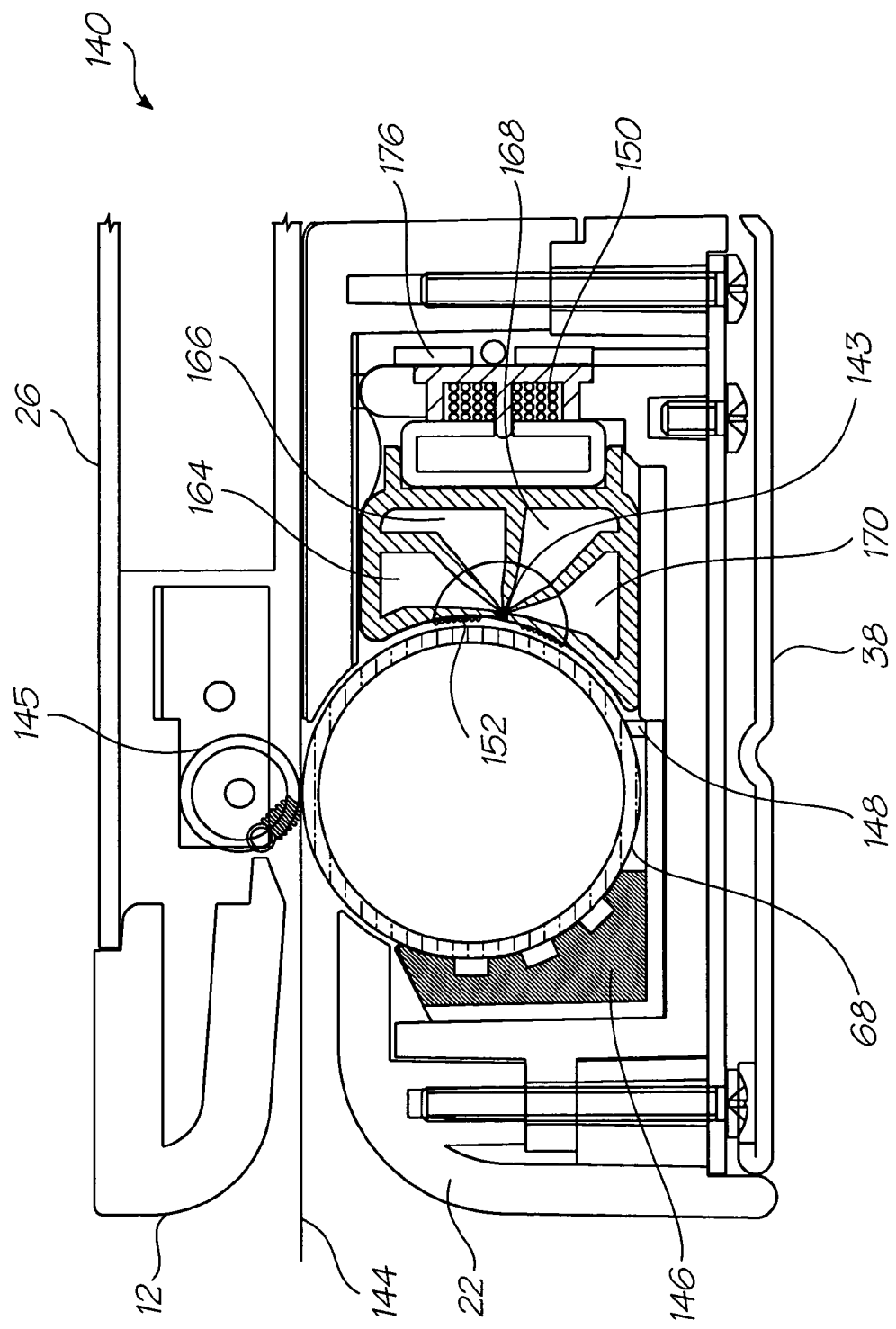
FIG. 11 shows a schematic side view of part of the printer showing the relationship between a print engine and image transfer mechanism of the printer.
Figure 13:
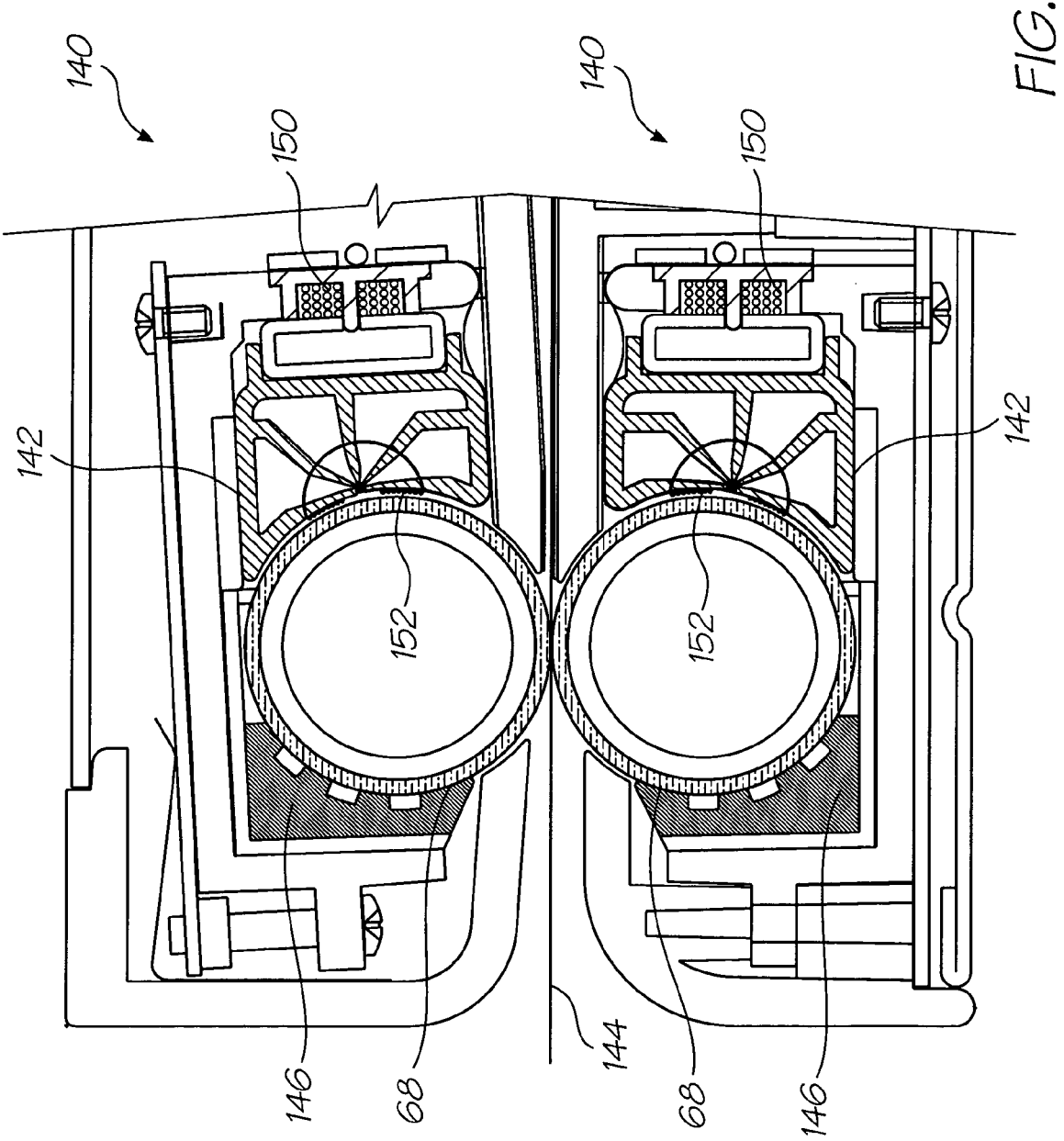
FIG. 13 shows a schematic side view of the arrangement of the printheads and transfer mechanisms of the double-sided printer of FIG. 2.

The print engine is shown in greater detail in FIG. 11 and is designated generally by the reference numeral 140. The Memjet printhead assembly is, in turn, designated by the reference numeral 142. This represents one of the four possible ways to deploy the Memjet printhead 143 in conjunction with the ink cartridge 32 in a product such as CePrint 10:

permanent printhead, replaceable ink cartridge (as shown in FIG. 11)
separate replaceable printhead cartridge and ink cartridge
refillable combined printhead and ink cartridge
disposable combined printhead and ink cartridge The Memjet printhead 143 prints onto the titanium nitride (TiN) coated transfer roller 68 which rotates in an anticlockwise direction to transfer the image onto a sheet of paper 144. The paper 144 is pressed against the transfer roller 68 by a spring-loaded rubber coated pinch roller 145 in the case of the single-sided version. As illustrated in FIG. 13, in the case of the double-sided version, the paper 144 is pressed against one of the transfer rollers 68 under the action of the opposite transfer roller 68. After transferring the image to the paper 144 the transfer roller 68 continues past a cleaning sponge 146 and finally a rubber wiper 148. The sponge 146 and the wiper 148 form a cleaning station for cleaning the surface of the transfer roller 68.

Figure 12A:
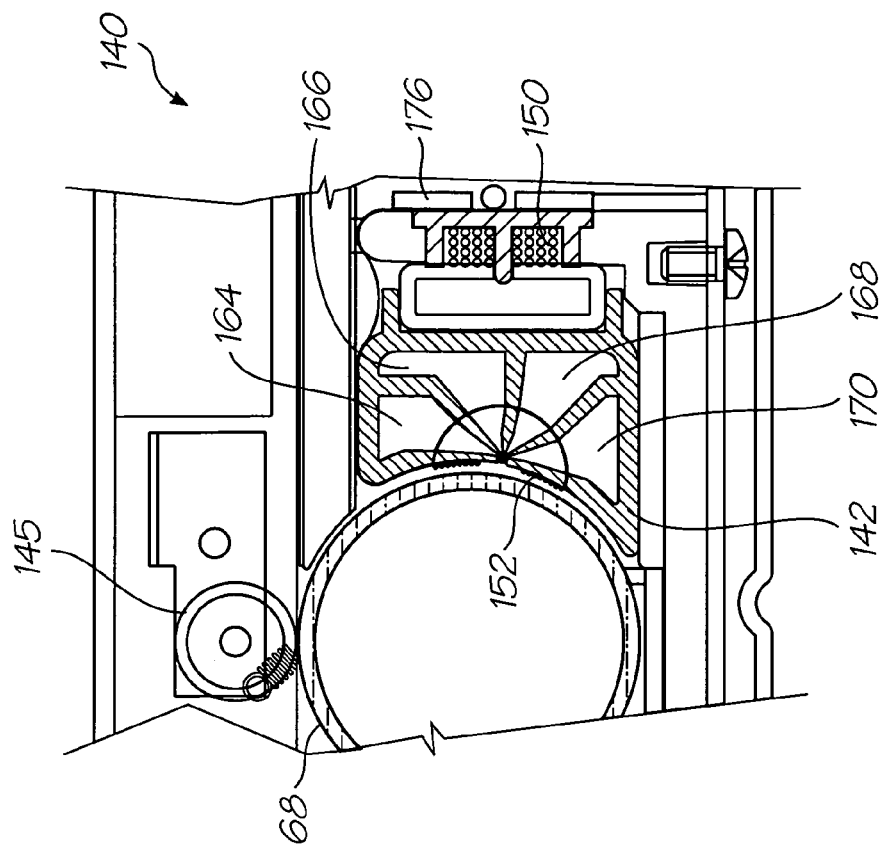
FIG. 12A shows a schematic side view of part of the devices of FIG. 11 showing the printhead in a parked, non-printing condition relative to the transfer mechanism.
Figure 12B:
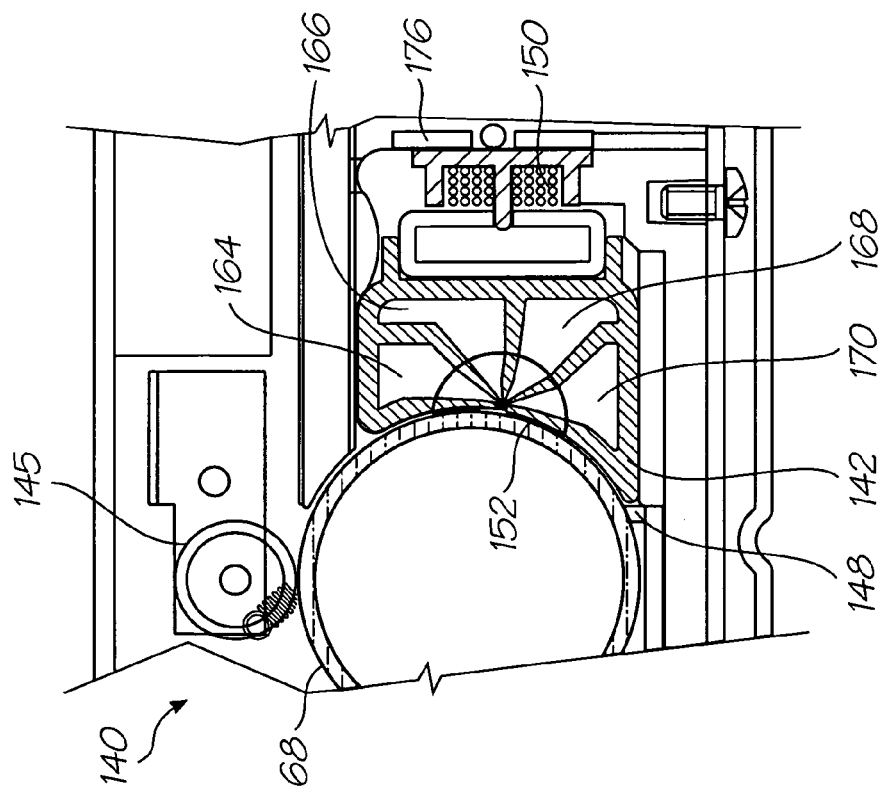
FIG. 12B shows a schematic side view of the part of the devices of FIG. 11 showing the printhead in a printing condition relative to the transfer mechanism.

While operational, the printhead assembly 142 is held off the transfer roller 68 by a solenoid 150 as shown in FIG. 12B. When not operational, the printhead assembly 142 is parked against the transfer roller 68 as shown in FIG. 12A. The printhead's integral elastomeric seal 152 seals the printhead assembly 142 and prevents the Memjet printhead 143 from drying out.

In the double-sided version of CePrint 10, there are dual print engines 140, each with its associated printhead assembly 142 and transfer roller 68, mounted in opposition as illustrated in FIG. 13. The lower print engine 140 is fixed while the upper print engine 140 pivots and is sprung to press against the paper 144. As previously described, the upper transfer roller 68 takes the place of the pinch roller 145 in the single-sided version.

Figure 15:
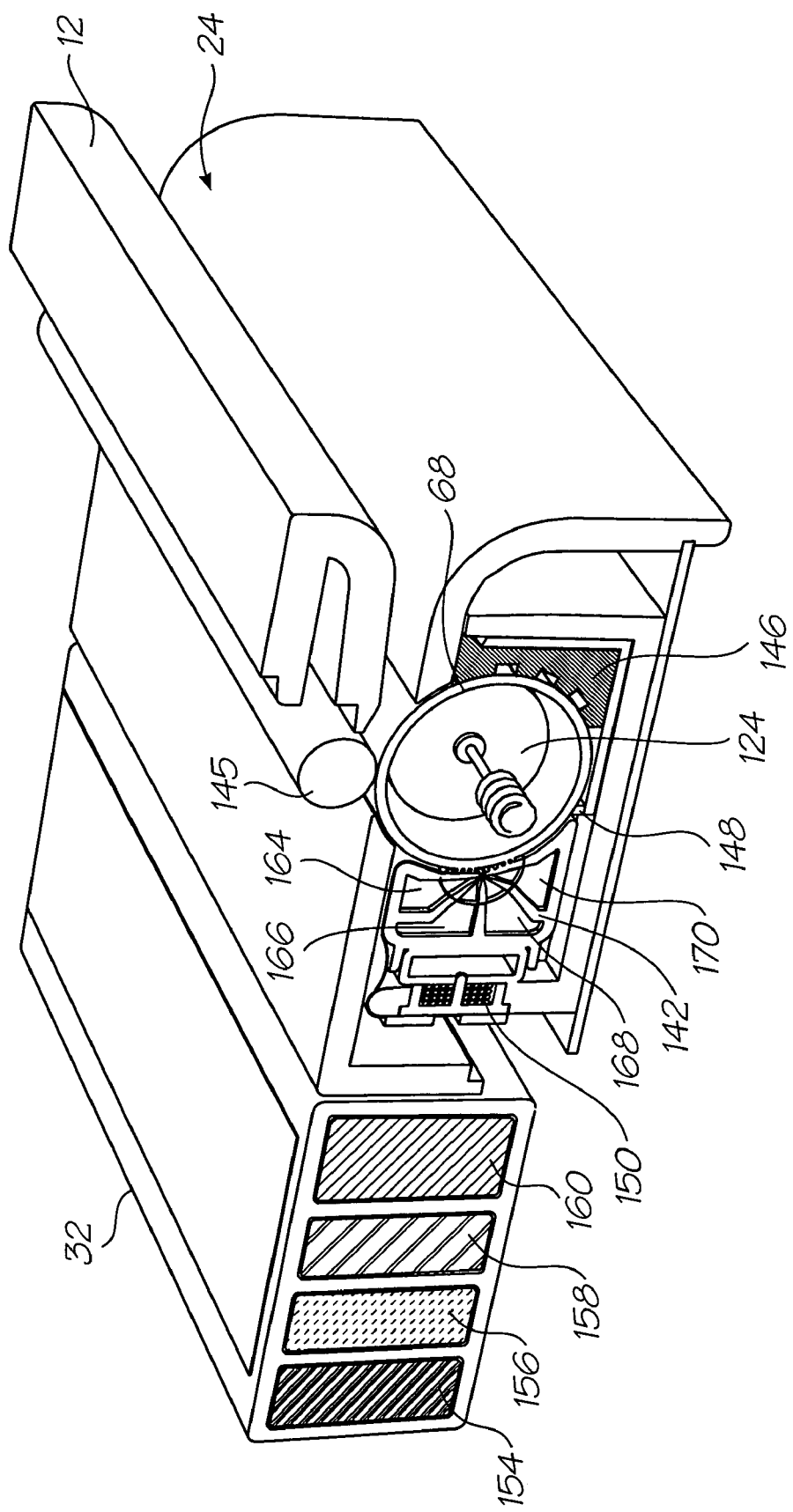
FIG. 15 shows a three-dimensional view of the printing system of the printer.
Figure 16:
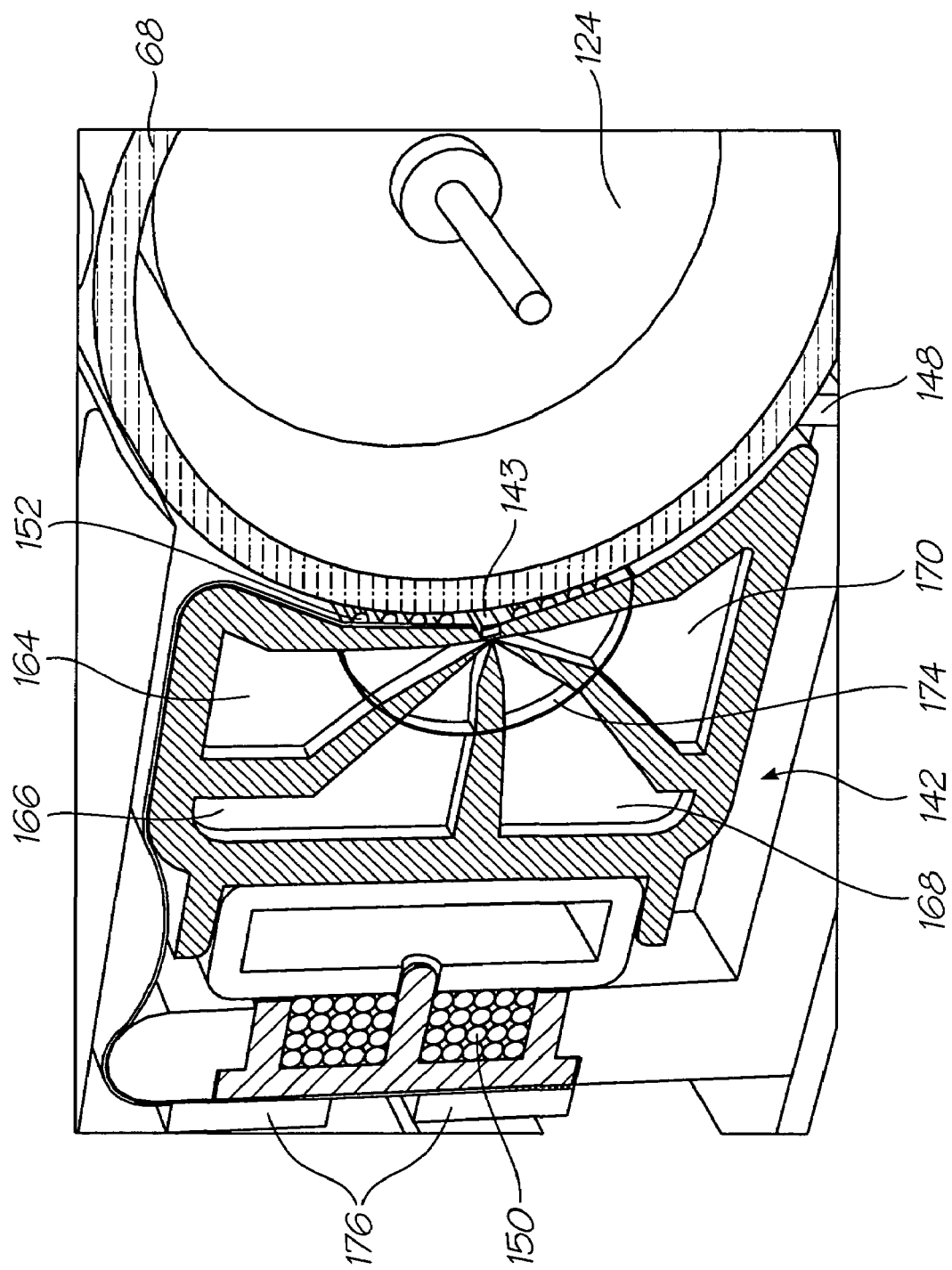
FIG. 16 shows an enlarged, three-dimensional view of part of the printing system of FIG. 15.

The relationship between the ink cartridge 32, printhead assembly 142 and the transfer roller 68 is shown in greater detail in FIGS. 15 and 16 of the drawings. The ink cartridge has four reservoirs 154, 156, 158 and 160 for cyan, magenta, yellow and black ink respectively.

Each reservoir 154-160 is in flow communication with a corresponding reservoir 164-170 in the printhead assembly 142. These reservoirs, in turn, supply ink to a Memjet printhead chip 143 (FIG. 16) via an ink filter 174. It is to be noted in FIG. 16 that the elastomeric capping seal 152 is arranged on both sides of the printhead chip 143 to assist in sealing when the printhead assembly 142 is parked against the transfer roller 68.

Power is supplied to the solenoid via busbars 176.

6 Printer Control Protocol

This section describes the printer control protocol used between a host and CePrint 10. It includes control and status handling as well as the actual page description.

6.1 Control and Status

The printer control protocol defines the format and meaning of messages exchanged by the host processor and the printer 10. The control protocol is defined independently of the transport protocol between the host processor and the printer 10, since the transport protocol depends on the exact nature of the connection.

Each message consists of a 16-bit message code, followed by message-specific data which may be of fixed or variable size.

All integers contained in messages are encoded in big-endian byte order.

Table 3 defines command messages sent by the host processor to the printer 10.

TABLE 3

Printer command messages

| command message | message code | description |
|---|---|---|
| reset printer | 1 | Resets the printer to an idle state (i.e. ready and not printing). |
| get printer status | 2 | Gets the current printer status. |
| start document | 3 | Starts a new document. |
| start page | 4 | Starts the description of a new output page. |
| page band | 5 | Describes a band of the current output page. |
| end page | 6 | Ends the description of the current output page. |
| end document | 7 | Ends the current document. |

The reset printer command can be used to reset the printer to clear an error condition, and to abort printing.

The start document command is used to indicate the start of a new document. This resets the printer's page count, which is used in the double-sided version to identify odd and even pages. The end document command is simply used to indicate the end of the document.

The description of an output page consists of a page header which describes the size and resolution of the page, followed by one or more page bands which describe the actual page content. The page header is transmitted to the printer in the start page command. Each page band is transmitted to the printer in a page band command. The last page band is followed by an end page command. The page description is described in detail in Table 4.2.

Table 4 defines response messages sent by the printer to the host processor.

TABLE 4

Printer response messages

| response message | message code | description |
|---|---|---|
| printer status | 8 | Contains the current printer status(as defined in Table 7). |
| page error | 9 | Contains the most recent page error code(as defined in Table 8). |

A printer status message is normally sent in response to a get printer status command. However, the nature of the connection between the host processor and the printer may allow the printer to send unsolicited status messages to the host processor. Unsolicited status messages allow timely reporting of printer exceptions to the host processor, and thereby to the user, without requiring the host processor to poll the printer on a frequent basis.

A page error message is sent in response to each start page, page band and end page command.

Table 5 defines the format of the 16-bit printer status contained in the printer status message.

TABLE 5

Printer status format

| field | bit | description |
|---|---|---|
| ready | 0 | The printer is ready to receive a page. |
| printing | 1 | The printer is printing. |
| error | 2 | The printer is in an error state. |
| paper tray missing | 3 | The paper tray is missing. |
| paper tray empty | 4 | The paper tray is empty. |
| ink cartridge missing | 5 | The ink cartridge is missing. |
| ink cartridge empty | 6 | The ink cartridge is empty. |
| ink cartridge error | 7 | The ink cartridge is in an error state. |
| (reserved) | 8-15 | Reserved for future use. |

Table 6 defines page error codes which may be returned in a page error message.

TABLE 6

Page error codes

| error code | value | description |
|---|---|---|
| no error | 0 | No error. |
| bad signature | 1 | The signature is not recognized. |
| bad version | 2 | The version is not supported. |
| bad parameter | 3 | A parameter is incorrect. |

6.2 Page Description

CePrint 10 reproduces black at full dot resolution (1600 dpi), but reproduces contone color at a somewhat lower resolution using halftoning. The page description is therefore divided into a black layer and a contone layer. The black layer is defined to composite over the contone layer.

The black layer consists of a bitmap containing a 1-bit opacity for each pixel. This black layer matte has a resolution which is an integer factor of the printer's dot resolution. The highest supported resolution is 1600 dpi, i.e. the printer's full dot resolution.

The contone layer consists of a bitmap containing a 32-bit CMYK color for each pixel. This contone image has a resolution which is an integer factor of the printer's dot resolution. The highest supported resolution is 267 ppi, i.e. one-sixth the printer's dot resolution.

The contone resolution is also typically an integer factor of the black resolution, to simplify calculations in the printer driver. This is not a requirement, however.

The black layer and the contone layer are both in compressed form for efficient transmission over the low-speed connection to the printer.

6.2.1 Page Structure

CePrint prints with full edge bleed using an 8.5" printhead. It imposes no margins and so has a printable page area which corresponds to the size of its paper (A4 or Letter).

The target page size is constrained by the printable page area, less the explicit (target) left and top margins specified in the page description.

6.2.2 Page Description Format

Apart from being implicitly defined in relation to the printable page area, each page description is complete and self-contained. There is no data transmitted to the printer separately from the page description to which the page description refers.

The page description consists of a page header which describes the size and resolution of the page, followed by one or more page bands which describe the actual page content.

Table 7 shows the format of the page header.

TABLE 7

Page header format

| field | format | description |
| --- | --- | --- |
| signature | 16-bit integer | Page header format signature. |
| version | 16-bit integer | Page header format version number. |
| structure size | 16-bit integer | Size of page header. |
| target resolution (dpi) | 16-bit integer | Resolution of target page. This is always 1600 for CePrint. |
| target page width | 16-bit integer | Width of target page, in dots. |
| target page height | 16-bit integer | Height of target page, in dots. |
| target left margin | 16-bit integer | Width of target left margin, in dots. |
| target top margin | 16-bit integer | Height of target top margin, in dots. |
| black scale factor | 16-bit integer | Scale factor from black resolution to target resolution (must be 2 or greater). |
| black page width | 16-bit integer | Width of black page, in black pixels. |
| black page height | 16-bit integer | Height of black page, in black pixels. |
| contone scale factor | 16-bit integer | Scale factor from contone resolution to target resolution (must be 6 or greater). |
| contone page width | 16-bit integer | Width of contone page, in contone pixels. |
| contone page height | 16-bit integer | Height of contone page, in contone pixels. |

The page header contains a signature and version which allow the printer to identify the page header format. If the signature and/or version are missing or incompatible with the printer, then the printer can reject the page.

The page header defines the resolution and size of the target page. The black and contone layers are clipped to the target page if necessary. This happens whenever the black or contone scale factors are not factors of the target page width or height.

The target left and top margins define the positioning of the target page within the printable page area.

The black layer parameters define the pixel size of the black layer, and its integer scale factor to the target resolution.

The contone layer parameters define the pixel size of the contone layer, and its integer scale factor to the target resolution.

Table 8 shows the format of the page band header.

TABLE 8

Page band header format

| field | format | description |
| --- | --- | --- |
| signature | 16-bit integer | Page band header format signature. |
| version | 16-bit integer | Page band header format version number. |
| structure size | 16-bit integer | Size of page band header. |
| black band height | 16-bit integer | Height of black band, in black pixels. |
| black band data size | 32-bit integer | Size of black band data, in bytes. |
| contone band height | 16-bit integer | Height of contone band, in contone pixels. |
| contone band data size | 32-bit integer | Size of contone band data, in bytes. |

The black layer parameters define the height of the black band, and the size of its compressed band data. The variable-size black band data follows the fixed-size parts of the page band header.

The contone layer parameters define the height of the contone band, and the size of its compressed page data. The variable-size contone band data follows the variable-size black band data.

Table 9 shows the format of the variable-size compressed band data which follows the page band header.

TABLE 9

Page band data format

| field | format | description |
| --- | --- | --- |
| black band data | EDRL bytestream | Compressed bi-level black band data. |
| contone band data | JPEG bytestream | Compressed contone CMYK band data. |

The variable-size black band data and the variable-size contone band data are aligned to 8-byte boundaries. The size of the required padding is included in the size of the fixed-size part of the page band header structure and the variable-size black band data.

The entire page description has a target size of less than 3 MB, and a maximum size of 6 MB, in accordance with page buffer memory in the printer.

The following sections describe the format of the compressed black layer and the compressed contone layer.

6.2.3 Bi-Level Black Layer Compression

6.2.3.1 Group 3 and 4 Facsimile Compression

The Group 3 Facsimile compression algorithm losslessly compresses bi-level data for transmission over slow and noisy telephone lines. The bi-level data represents scanned black text and graphics on a white background, and the algorithm is tuned for this class of images (it is explicitly not tuned, for example, for halftoned bi-level images). The 1D Group 3 algorithm runlength-encodes each scanline and then Huffman-encodes the resulting runlengths. Runlengths in the range 0 to 63 are coded with terminating codes. Runlengths in the range 64 to 2623 are coded with make-up codes, each representing a multiple of 64, followed by a terminating code. Runlengths exceeding 2623 are coded with multiple make-up codes followed by a terminating code. The Huffman tables are fixed, but are separately tuned for black and white runs (except for make-up codes above 1728, which are common). When possible, the 2D Group 3 algorithm encodes a scanline as a set of short edge deltas (0, ±1, ±2, ±3) with reference to the previous scanline. The delta symbols are entropy-encoded (so that the zero delta symbol is only one bit long etc.) Edges within a 2D-encoded line which can't be delta-encoded are runlength-encoded, and are identified by a prefix. 1D- and 2D-encoded lines are marked differently. 1D-encoded lines are generated at regular intervals, whether actually required or not, to ensure that the decoder can recover from line noise with minimal image degradation. 2D Group 3 achieves compression ratios of up to 6:1.

The Group 4 Facsimile algorithm losslessly compresses bi-level data for transmission over error-free communications lines (i.e. the lines are truly error-free, or error-correction is done at a lower protocol level). The Group 4 algorithm is based on the 2D Group 3 algorithm, with the essential modification that since transmission is assumed to be error-free, 1D-encoded lines are no longer generated at regular intervals as an aid to error-recovery. Group 4 achieves compression ratios ranging from 20:1 to 60:1 for the CCITT set of test images.

The design goals and performance of the Group 4 compression algorithm qualify it as a compression algorithm for the bi-level black layer. However, its Huffman tables are tuned to a lower scanning resolution (100-400 dpi), and it encodes runlengths exceeding 2623 awkwardly. At 800 dpi, our maximum runlength is currently 6400. Although a Group 4 decoder core might be available for use in the printer controller chip (Section 7), it might not handle runlengths exceeding those normally encountered in 400 dpi facsimile applications, and so would require modification.

Since most of the benefit of Group 4 comes from the delta-encoding, a simpler algorithm based on delta-encoding alone is likely to meet our requirements. This approach is described in detail below.

6.2.3.2 Bi-Level Edge Delta and Runlength (EDRL) Compression Format

The edge delta and runlength (EDRL) compression format is based loosely on the Group 4 compression format and its precursors.

EDRL uses three kinds of symbols, appropriately entropy-coded. These are create edge, kill edge, and edge delta. Each line is coded with reference to its predecessor. The predecessor of the first line is defined to a line of white. Each line is defined to start off white. If a line actually starts of black (the less likely situation), then it must define a black edge at offset zero. Each line must define an edge at its left-hand end, i.e. at offset page width.

An edge can be coded with reference to an edge in the previous line if there is an edge within the maximum delta range with the same sense (white-to-black or black-to-white). This uses one of the edge delta codes. The shorter and likelier deltas have the shorter codes. The maximum delta range (±2) is chosen to match the distribution of deltas for typical glyph edges. This distribution is mostly independent of point size. A typical example is given in Table 10.

TABLE 10

Edge delta distribution for 10 point Times at 800 dpi

| |delta| | probability |
|---|---|
| 0 | 65% |
| 1 | 23% |
| 2 | 7% |
| ≧3 | 5% |

An edge can also be coded using the length of the run from the previous edge in the same line. This uses one of the create edge codes for short (7-bit) and long (13-bit) runlengths. For simplicity, and unlike Group 4, runlengths are not entropy-coded. In order to keep edge deltas implicitly synchronized with edges in the previous line, each unused edge in the previous line is 'killed' when passed in the current line. This uses the kill edge code. The end-of-page code signals the end of the page to the decoder.

Note that 7-bit and 13-bit runlengths are specifically chosen to support 800 dpi A4/Letter pages. Longer runlengths could be supported without significant impact on compression performance. For example, if supporting 1600 dpi compression, the runlengths should be at least 8-bit and 14-bit respectively. A general-purpose choice might be 8-bit and 16-bit, thus supporting up to 40" wide 1600 dpi pages.

The fall set of codes is defined in Table 11. Note that there is no end-of-line code. The decoder uses the page width to detect the end of the line. The lengths of the codes are ordered by the relative probabilities of the codes' occurrence.

TABLE 11

EDRL codewords

| code | encoding | suffix | description |
|---|---|---|---|
| Δ0 | 1 | — | don't move corresponding edge |
| Δ+1 | 010 | — | move corresponding edge +1 |
| Δ−1 | 011 | — | move corresponding edge −1 |
| Δ+2 | 00010 | — | move corresponding edge +2 |
| Δ−2 | 00011 | — | move corresponding edge −2 |
| kill edge | 0010 | — | kill corresponding edge |
| create near edge | 0011 | 7-bit RL | create edge from short runlength (RL) |
| create far edge | 00001 | 13-bit RL | create edge from long runlength (RL) |
| end-of-page (EOP) | 000001 | — | end-of-page marker |

Figure 17:
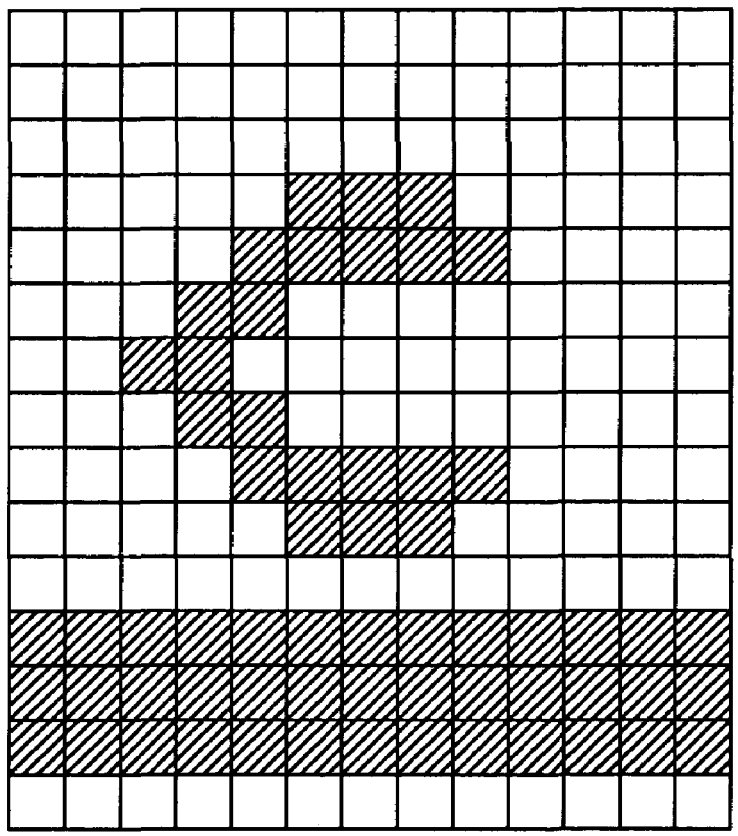
FIG. 17 shows a simple encoding sample.

FIG. 17 shows a simple encoding example. Note that the common situation of an all-white line following another all-white line is encoded using a single bit (Δ0), and an all-black line following another all-black line is encoded using two bits (Δ0, Δ0).

Note that the foregoing describes the compression format, not the compression algorithm per se. A variety of equivalent encodings can be produced for the same image, some more compact than others. For example, a pure runlength encoding conforms to the compression format. The goal of the compression algorithm is to discover a good, if not the best, encoding for a given image.

The following is a simple algorithm for producing the EDRL encoding of a line with reference to its predecessor.

```
#define                     // precision of short run
SHORT_RUN_PRECISION 7
#define                     // precision of long run
LONG_RUN_PRECISION 13
EDRL_CompressLine
(
  Byte prevLine[ ],         // previous (reference)
                            // bi-level line
  Byte currLine[ ],         // current (coding) bi-level line
  int lineLen,               // line length
  BITSTREAM s               // output (compressed) bitstream
)
  int prevEdge = 0          // current edge offset in
                            // previous line
  int currEdge = 0          // current edge offset in
                            // current line
  int codedEdge = currEdge  // most recent coded (output) edge
  int prevColor = 0         // current color in prev line
                            // (0 = white)
  int currColor = 0         // current color in current line
  int prevRun               // current run in previous line
  int currRun               // current run in current line
  bool bUpdatePrevEdge = true  // force first edge update
  bool bUpdateCurrEdge = true  // force first edge update
  while (codedEdge < lineLen)
    // possibly update current edge in previous line
    if (bUpdatePrevEdge)
      if (prevEdge < lineLen)
        prevRun = GetRun(prevLine,
                         prevEdge, lineLen, prevColor)
      else
        prevRun = 0
      prevEdge += prevRun
      prevColor = !prevColor
      bUpdatePrevEdge = false
    // possibly update current edge in current line
    if (bUpdateCurrEdge)
      if (currEdge < lineLen)
        currRun = GetRun(currLine,
                         currEdge, lineLen, currColor)
      else
        currRun = 0
      currEdge += currRun
      currColor = !currColor
      bUpdateCurrEdge = false
    // output delta whenever possible, i.e. when
    // edge senses match, and delta is small enough
    if (prevColor == currColor)
      delta = currEdge - prevEdge
      if (abs(delta) <= MAX_DELTA)
        PutCode(s, EDGE_DELTA0 + delta)
        codedEdge = currEdge
        bUpdatePrevEdge = true
        bUpdateCurrEdge = true
        continue
    // kill unmatched edge in previous line
    if (prevEdge <= currEdge)
      PutCode(s, KILL_EDGE)
      bUpdatePrevEdge = true
    // create unmatched edge in current line
    if (currEdge <= prevEdge)
      PutCode(s, CREATE_EDGE)
      if (currRun < 128)
        PutCode(s, CREATE_NEAR_EDGE)
```

-continued

```
        PutBits(currRun, SHORT_RUN_PRECISION)
      else
        PutCode(s, CREATE_FAR_EDGE)
        PutBits(currRun, LONG_RUN_PRECISION)
      codedEdge = currEdge
      bUpdateCurrEdge = true
```

Note that the algorithm is blind to actual edge continuity between lines, and may in fact match the "wrong" edges between two lines. Happily the compression format has nothing to say about this, since it decodes correctly, and it is difficult for a "wrong" match to have a detrimental effect on the compression ratio. For completeness the corresponding decompression algorithm is given below. It forms the core of the EDRL Expander unit in the printer controller chip (Section 7).

```
EDRL_DecompressLine
(
  BITSTREAM s,              // input (compressed) bitstream
  Byte prevLine[ ],         // previous (reference) bi-level line
  Byte currLine[ ],         // current (coding) bi-level line
  int lineLen    // line length
)
  int prevEdge = 0          // current edge offset in
                            // previous line
  int currEdge = 0          // current edge offset in current line
  int prevColor = 0         // current color in previous line
                            // (0 = white)
  int currColor = 0         // current color in current line
  while (currEdge < lineLen)
    code = GetCode(s)
    switch (code)
      case EDGE_DELTA_MINUS2:
      case EDGE_DELTA_MINUS1:
      case EDGE_DELTA_0:
      case EDGE_DELTA_PLUS1:
      case EDGE_DELTA_PLUS2:
        // create edge from delta
        int delta = code - EDGE_DELTA_0
        int run = prevEdge + delta - currEdge
        FillBitRun(currLine, currEdge, currColor, run)
        currEdge += run
        currColor = !currColor
        prevEdge += GetRun(prevLine,
                           prevEdge, lineLen, prevColor)
        prevColor = !prevColor
      case KILL_EDGE:
        // discard unused reference edge
        prevEdge += GetRun(prevLine,
                           prevEdge, lineLen, prevColor)
        prevColor = !prevColor
      case CREATE_NEAR_EDGE:
      case CREATE_FAR_EDGE:
        // create edge explicitly
        int run
        if (code == CREATE_NEAR_EDGE)
          run = GetBits(s, SHORT_RUN_PRECISION)
        else
          run = GetBits(s, LONG_RUN_PRECISION)
        FillBitRun(currLine, currEdge, currColor, run)
        currColor = !currColor
        currEdge += run
```

6.2.3.3 EDRL Compression Performance

Table 12 shows the compression performance of Group 4 and EDRL on the CCITT test documents used to select the Group 4 algorithm. Each document represents a single page scanned at 400 dpi. Group 4's superior performance is due to its entropy-coded runlengths, tuned to 400 dpi features.

TABLE 12

Group 4 and EDRL compression performance on standard CCITTT documents at 400 dpi

| CCITT document number | Group 4 compression ratio | EDRL compression ratio |
|---|---|---|
| 1 | 29.1 | 21.6 |
| 2 | 49.9 | 41.3 |
| 3 | 17.9 | 14.1 |
| 4 | 7.3 | 5.5 |
| 5 | 15.8 | 12.4 |
| 6 | 31.0 | 25.5 |
| 7 | 7.4 | 5.3 |
| 8 | 26.7 | 23.4 |

Magazine text is typically typeset in a typeface with serifs (such as Times) at a point size of 10. At this size an A4/Letter page holds up to 14,000 characters, though a typical magazine page holds only about 7,000 characters. Text is seldom typeset at a point size smaller than 5. At 800 dpi, text cannot be meaningfully rendered at a point size lower than 2 using a standard typeface. Table 13 illustrates the legibility of various point sizes.

TABLE 13

Text at different point sizes

| point size | sample text (in Times) |
|---|---|
| 2 | The quick brown fox jumps over the lazy dog. |
| 3 | The quick brown fox jumps over the lazy dog. |
| 4 | The quick brown fox jumps over the lazy dog. |
| 5 | The quick brown fox jumps over the lazy dog. |
| 6 | The quick brown fox jumps over the lazy dog. |
| 7 | The quick brown fox jumps over the lazy dog |
| 8 | The quick brown fox jumps over the lazy dog. |
| 9 | The quick brown fox jumps over the lazy dog. |
| 10 | The quick brown fox jumps over the lazy dog. |

Table 14 shows Group 4 and EDRL compression performance on pages of text of varying point sizes, rendered at 800 dpi. Note that EDRL achieves the required compression ratio of 2.5 for an entire page of text typeset at a point size of 3. The distribution of characters on the test pages is based on English-language statistics.

TABLE 14

Group 4 and EDRL compression performance on text at 800 dpi

| point size | characters/A4 page | Group 4 compression ratio | EDRL compression ratio |
|---|---|---|---|
| 2 | 340,000 | 2.3 | 1.7 |
| 3 | 170,000 | 3.2 | 2.5 |
| 4 | 86,000 | 4.7 | 3.8 |
| 5 | 59,000 | 5.5 | 4.9 |
| 6 | 41,000 | 6.5 | 6.1 |
| 7 | 28,000 | 7.7 | 7.4 |
| 8 | 21,000 | 9.1 | 9.0 |
| 9 | 17,000 | 10.2 | 10.4 |
| 10 | 14,000 | 10.9 | 11.3 |
| 11 | 12,000 | 11.5 | 12.4 |
| 12 | 8,900 | 13.5 | 14.8 |
| 13 | 8,200 | 13.5 | 15.0 |
| 14 | 7,000 | 14.6 | 16.6 |
| 15 | 5,800 | 16.1 | 18.5 |
| 20 | 3,400 | 19.8 | 23.9 |

For a point size of 9 or greater, EDRL slightly outperforms Group 4, simply because Group 4's runlength codes are tuned to 400 dpi.

These compression results bear out the observation that entropy-encoded runlengths contribute much less to compression than 2D encoding, unless the data is poorly correlated vertically, such as in the case of very small characters.

6.2.4 Contone Layer Compression

6.2.4.1 JPEG Compression

The JPEG compression algorithm lossily compresses a contone image at a specified quality level. It introduces imperceptible image degradation at compression ratios below 5:1, and negligible image degradation at compression ratios below 10:1.

JPEG typically first transforms the image into a color space which separates luminance and chrominance into seperate color channels. This allows the chrominance channels to be subsampled without appreciable loss because of the human visual system's relatively greater sensitivity to luminance than chrominance. After this first step, each color channel is compressed separately.

The image is divided into 8×8 pixel blocks. Each block is then transformed into the frequency domain via a discrete cosine transform (DCT). This transformation has the effect of concentrating image energy in relatively lower-frequency coefficients, which allows higher-frequency coefficients to be more crudely quantized. This quantization is the principal source of compression in JPEG. Further compression is achieved by ordering coefficients by frequency to maximize the likelihood of adjacent zero coefficients, and then run-length-encoding runs of zeroes. Finally, the runlengths and non-zero frequency coefficients are entropy coded. Decompression is the inverse process of compression.

6.2.4.2 CMYK Contone JPEG Compression Format

The CMYK contone layer is compressed to an interleaved color JPEG bytestream. The interleaving is required for space-efficient decompression in the printer, but may restrict the decoder to two sets of Huffman tables rather than four (i.e. one per color channel). If luminance and chrominance are separated, then the luminance channels can share one set of tables, and the chrominance channels the other set.

If luminance/chrominance separation is deemed necessary, either for the purposes of table sharing or for chrominance subsampling, then CMY is converted to YCrCb and Cr and Cb are duly subsampled. K is treated as a luminance channel and is not subsampled.

The JPEG bytestream is complete and self-contained. It contains all data required for decompression, including quantization and Huffman tables.

7 Printer Controller

7.1 Printer Controller Architecture

A printer controller 178 (FIG. 18) consists of the CePrint central processor (CCP) chip 180, a 64 MBit RDRAM 182, and a master QA chip 184.

The CCP 180 contains a general-purpose processor 181 and a set of purpose-specific functional units controlled by the processor via a processor bus 186. Only three functional units are non-standard—an EDRL expander 188, a halftoner/compositor 190, and a printhead interface 192 which controls the Memjet printhead 143.

Software running on the processor 181 coordinates the various functional units to receive, expand and print pages. This is described in the next section.

The various functional units of the CCP 180 are described in subsequent sections.

7.2 Page Expansion and Printing

Page expansion and printing proceeds as follows. A page description is received from the host via a host interface 194 and is stored in main memory 182. 6 MB of main memory 182 is dedicated to page storage. This can hold two pages each not exceeding 3 MB, or one page up to 6 MB. If the host generates pages not exceeding 3 MB, then the printer operates in streaming mode—i.e. it prints one page while receiving the next. If the host generates pages exceeding 3 MB, then the printer operates in single-page mode—i.e. it receives each page and prints it before receiving the next. If the host generates-pages exceeding 6 MB then they are rejected by the printer. In practice the printer driver prevents this from happening.

A page consists of two parts—the bi-level black layer, and the contone layer. These are compressed in distinct formats—the bi-level black layer in EDRL format, the contone layer in JPEG format. The first stage of page expansion consists of decompressing the two layers in parallel. The bi-level layer is decompressed by the EDRL expander unit 188, the contone layer by a JPEG decoder 196.

The second stage of page expansion consists of halftoning the contone CMYK data to bi-level CMYK, and then compositing the bi-level black layer over the bi-level CMYK layer. The halftoning and compositing is carried out by the halftoner/compositor unit 190.

Finally, the composited bi-level CMYK image is printed via the printhead interface unit 192, which controls the Memjet printhead 143.

Because the Memjet printhead 143 prints at high speed, the paper 144 must move past the printhead 143 at a constant velocity. If the paper 144 is stopped because data cannot be fed to the printhead 143 fast enough, then visible printing irregularities will occur. It is therefore important to transfer bi-level CMYK data to the printhead interface 192 at the required rate.

A fully-expanded 1600 dpi bi-level CMYK page has an image size of 119 MB. Because it is impractical to store an expanded page in printer memory, each page is expanded in real time during printing. Thus the various stages of page expansion and printing are pipelined. The page expansion and printing data flow is described in Table 15. The aggregate traffic to/from main memory via an interface 198 of 182 MB/s is well within the capabilities of current technologies such as Rambus.

TABLE 15

Page expansion and printing data flow

| process | input | input window | output | output window | input rate | output rate |
|---|---|---|---|---|---|---|
| Receive contone | — | — | JPEG stream | 1 | — | 1.5 MB/s 3.5 Mp/s |
| receive bi-level | — | — | EDRL stream | 1 | — | 1.5 MB/s 31 Mp/s |
| decompress contone | JPEG stream | — | 32-bit CMYK | 8 | 1.5 MB/s 3.5 Mp/s | 13 MB/s 3.5 Mp/s |
| decompress bi-level | EDRL stream | — | 1-bit K | 1 | 1.5 MB/s 31 Mp/s$^a$ | 15 MB/s 124 Mp/s |
| halftone | 32-bit CMYK | 1 | —$^b$ | — | 13 MB/s 3.5 Mp/s$^c$ | — — |
| composite | 1-bit K | 1 | 4-bit CMYK | 1 | 15 MB/s 124 Mp/s | 60 MB/s 124 Mp/s |
| print | 4-bit CMYK | 24, 1$^d$ | — | — | 60 MB/s 124 Mp/s 91 MB/s | — — 91 MB/S |
| | | | | | | 182 MB/S |

$^a$800 dpi → 1600 dpi (2 × 2 expansion)
$^b$halftone combines with composite, so there is no external data flow between them
$^c$267 dpi → 1600 dpi (6 × 6 expansion)
$^d$Needs a window of 24 lines, but only advances 1 line.

Each stage communicates with the next via a shared FIFO in main memory 182. Each FIFO is organized into lines, and the minimum size (in lines) of each FIFO is designed to accommodate the output window (in lines) of the producer and the input window (in lines) of the consumer. Inter-stage main memory buffers are described in Table 16. The aggregate buffer space usage of 6.3 MB leaves 1.7 MB free for program code and scratch memory (out of the 8 MB available).

TABLE 16

Page expansion and printing main memory buffers

| buffer | organization and line size | number of lines | buffer size |
|---|---|---|---|
| compressed page buffer | byte stream (one or two pages) | — | 6 MB |
| contone CMYK buffer | 32-bit interleaved CMYK (267 ppi × 8.5" × 32 = 8.9 KB) | 8 × 2 = 16 | 142 KB |
| bi-level K buffer | 1-bit K (1600 dpi × 8.5" × 1 = 1.7 B) | 1 × 2 = 2 | 3 KB |
| bi-level CMYK buffer | 4-bit planar odd/even CMYK (1600 dpi × 8.5" × 4 = 6.6 KB) | 24 + 1 = 25 | 166 KB |
| | | | 6.3 MB |

Figure 19:
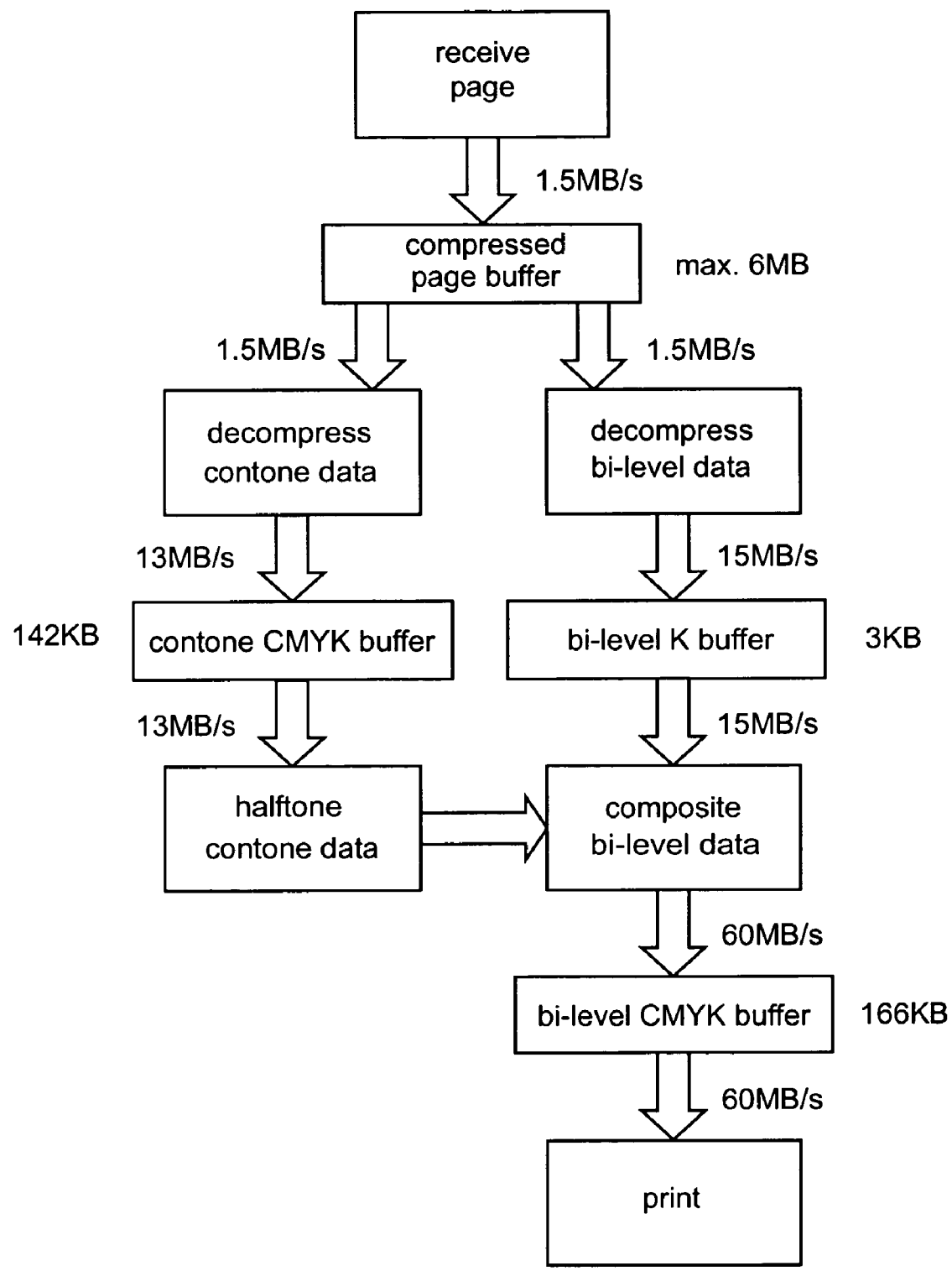
FIG. 19 shows a flowchart of page expansion and printing data flow.

The overall data flow, including FIFOs, is illustrated in FIG. 19.

Contone page decompression is carried out by the JPEG decoder 196. Bi-level page decompression is carried out by the EDRL expander 188. Halftoning and compositing is carried out by the halftoner/compositor unit 190. These functional units are described in the following sections.

7.2.1 DMA Approach

Each functional unit contains one or more on-chip input and/or output FIFOs. Each FIFO is allocated a separate channel in a multi-channel DMA controller 200. The DMA controller 200 handles single-address rather than double-address transfers, and so provides a separate request/acknowledge interface for each channel.

Each functional unit stalls gracefully whenever an input FIFO is exhausted or an output FIFO is filled.

The processor 181 programs each DMA transfer. The DMA controller 200 generates the address for each word of the transfer on request from the functional unit connected to the channel. The functional unit latches the word onto or off the data bus 186 when its request is acknowledged by the DMA controller 200. The DMA controller 200 interrupts the processor 181 when the transfer is complete, thus allowing the processor 181 to program another transfer on the same channel in a timely fashion.

In general the processor 181 will program another transfer on a channel as soon as the corresponding main memory FIFO is available (i.e. non-empty for a read, non-full for a write).

The granularity of channel servicing implemented in the DMA controller 200 depends somewhat on the latency of main memory 182.

7.2.2 EDRL Expander

Figure 20:
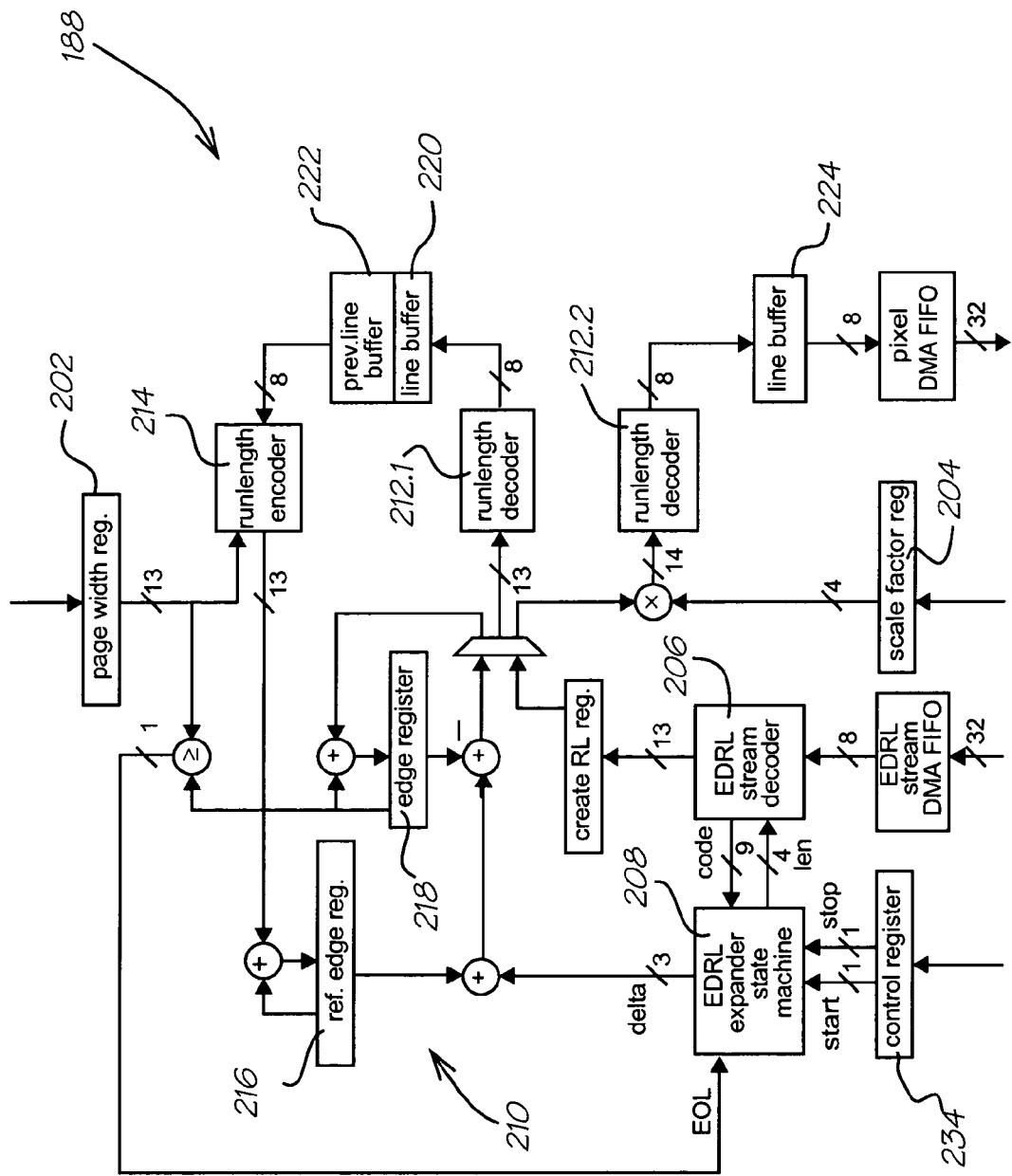
FIG. 20 shows a block diagram of an EDRL expander unit.

The EDRL expander unit (EEU) 188 is shown in greater detail in FIG. 20. The unit 188 decompresses an EDRL-compressed bi-level image.

The input to the EEU 188 is an EDRL bitstream. The output from the EEU is a set of bi-level image lines, scaled horizontally from the resolution of the expanded bi-level image by an integer scale factor to 1600 dpi.

Once started, the EEU 188 proceeds until it detects an end-of-page code in the EDRL bitstream, or until it is explicitly stopped via its control register.

The EEU 188 relies on an explicit page width to decode the bitstream. This must be written to a page width register 202 prior to starting the EEU 188.

The scaling of the expanded bi-level image relies on an explicit scale factor. This must be written to a scale factor register 204 prior to starting the EEU 188.

TABLE 17

EDRL expander control and configuration registers

| register | width | description |
|---|---|---|
| start | 1 | Start the EEU. |
| stop | 1 | Stop the EEU. |
| page width | 13 | Page width used during decoding to detect end-of-line. |
| scale factor | 4 | Scale factor used during scaling of expanded image. |

The EDRL compression format is described in Section 6.2.3.2. It represents a bi-level image in terms of its edges. Each edge in each line is coded relative to an edge in the previous line, or relative to the previous edge in the same line. No matter how it is coded, each edge is ultimately decoded to its distance from the previous edge in the same line. This distance, or runlength, is then decoded to the string of one bits or zero bits which represent the corresponding part of the image. The decompression algorithm is defined in Section 6.2.3.2.

The EEU 188 consists of a bitstream decoder 206, a state machine 208, edge calculation logic 210, two runlength decoders 212, and a runlength (re)encoder 214.

The bitstream decoder 206 decodes an entropy-coded codeword from the bitstream and passes it to the state machine 208. The state machine 208 returns the size of the codeword to the bitstream decoder 206, which allows the decoder 206 to advance to the next codeword. In the case of a create edge code, the state machine 208 uses the bitstream decoder 206 to extract the corresponding runlength from the bitstream. The state machine 208 controls the edge calculation logic 210 and runlength decoding/encoding as defined in Table 19.

The edge calculation logic 210 is quite simple. The current edge offset in the previous (reference) and current (coding) lines are maintained in a reference edge register 216 and edge register 218 respectively. The runlength associated with a create edge code is output directly to the runlength decoder 212.1, and is added to the current edge. A delta code is translated into a runlength by adding the associated delta to the reference edge and subtracting the current edge. The generated runlength is output to the runlength decoder 212.1, and is added to the current edge. The next runlength is extracted from the runlength encoder 214 and added to the reference edge. A kill edge code simply causes the current reference edge to be skipped. Again the next runlength is extracted from the runlength encoder 214 and added to the reference edge.

Each time the edge calculation logic 210 generates a runlength representing an edge, it is passed to the runlength decoder 212.1. While the runlength decoder 212.1 decodes the run it generates a stall signal to the state machine 208. Since the runlength decoder 212 is slower than the edge calculation logic 210, there is not much point in decoupling it. The expanded line accumulates in a line buffer 220 large enough to hold an 8.5" 800 dpi line (850 bytes).

The previously expanded line is also buffered in a buffer 222. It acts as a reference for the decoding of the current line. The previous line is re-encoded as runlengths on demand. This is less expensive than buffering the decoded runlengths of the previous line, since the worst case is one 13-bit runlength for each pixel (20 KB at 1600 dpi). While the runlength encoder 214 encodes the run it generates a stall signal to the state machine 208. The L runlength encoder 214 uses the page width to detect end-of-line. The (current) line buffer 220 and the previous line buffer 222 are concatenated and managed as a single FIFO to simplify the runlength encoder 214.

The second runlength decoder 212.2 decodes the output runlength to a line buffer 224 large enough to hold an 8.5" 1600 dpi line (1700 bytes). The runlength passed to this output runlength decoder 212.2 is multiplied by the scale factor from the register 204, so this decoder 212.2 produces 1600 dpi lines. The line is output scale factor times through the output pixel FIFO. This achieves the required vertical scaling by simple line replication. The EEU 188 could be designed with edge smoothing integrated into its image scaling. A simple smoothing scheme based on template-matching can be very effective. This would require a multi-line buffer between the low-resolution runlength decoder and the smooth scaling unit, but would eliminate the high-resolution runlength decoder.

7.2.2.1 EDRL Stream Decoder

Figure 21:
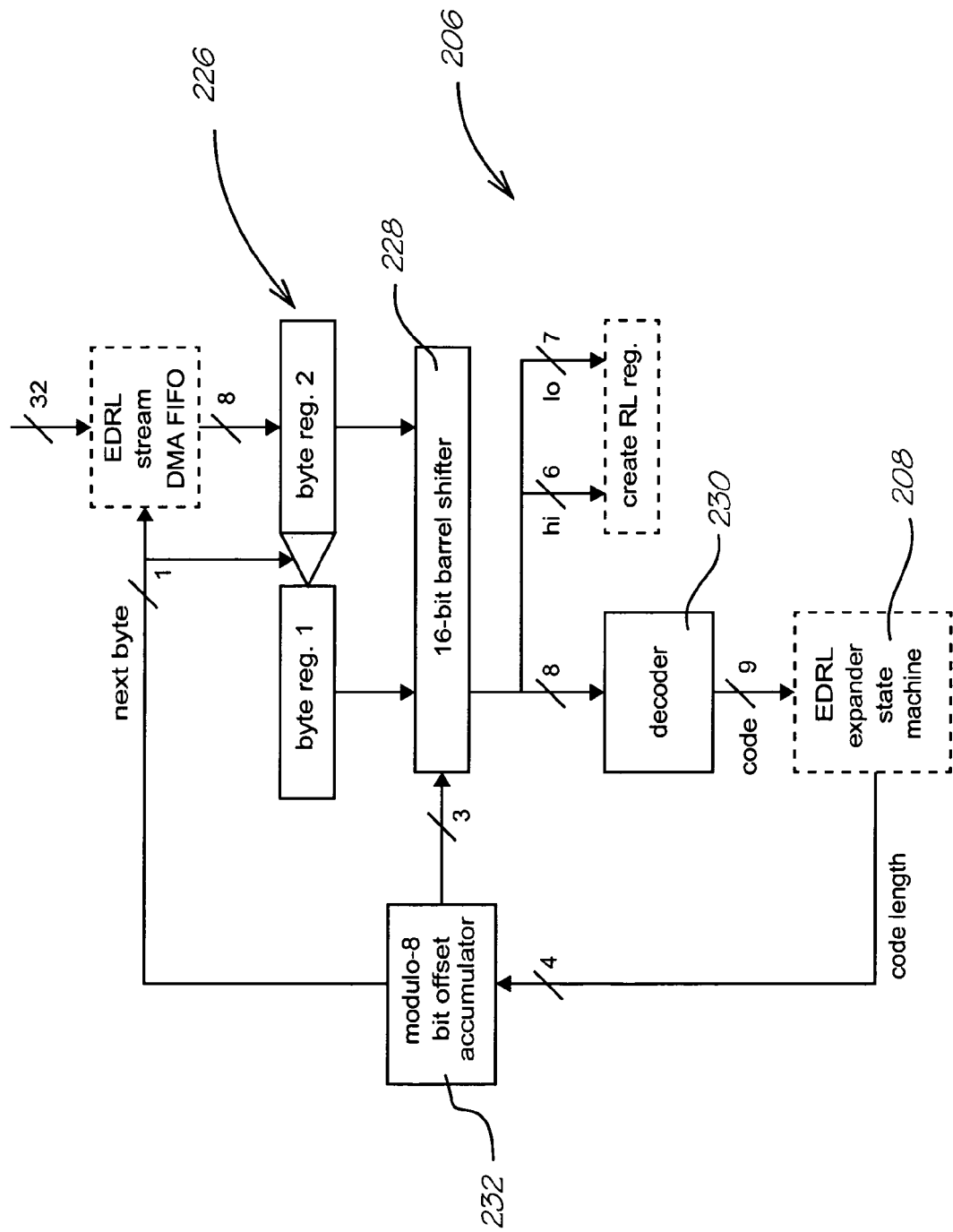
FIG. 21 shows a block diagram of an EDRL stream decoder.

The EDRL stream decoder 206 (FIG. 21) decodes entropy-coded EDRL codewords in the input bitstream. It uses a two-byte input buffer 226 viewed through a 16-bit barrel shifter 228 whose left (most significant) edge is always aligned to a codeword boundary in the bitstream. A decoder 230 connected to the barrel shifter 228 decodes a codeword according to Table 18, and supplies the state machine 208 with the corresponding code.

TABLE 18

EDRL stream codeword decoding table

| input codeword bit pattern[a] | output code | output code bit pattern |
|---|---|---|
| 1xxx xxxx | Δ0 | 1 0000 0000 |
| 010x xxxx | Δ+1 | 0 1000 0000 |
| 011x xxxx | Δ−1 | 0 0100 0000 |
| 0010 xxxx | kill edge | 0 0010 0000 |
| 0011 xxxx | create near edge | 0 0001 0000 |
| 0001 0xxx | Δ+2 | 0 0000 1000 |
| 0001 1xxx | Δ−2 | 0 0000 0100 |
| 0000 1xxx | create far edge | 0 0000 0010 |
| 0000 01xx | end-of-page (EOP) | 0 0000 0001 |

[a] x = don't care

The state machine 208 in turn outputs the length of the code. This is added, modulo-8, by an accumulator 232 to the current codeword bit offset to yield the next codeword bit offset. The bit offset in turn controls the barrel shifter 228. If the codeword bit offset wraps, then the carry bit controls the latching of the next byte from the input FIFO. At this time byte 2 is latched to byte 1, and the FIFO output is latched to byte 2. It takes two cycles of length 8 to fill the input buffer. This is handled by starting states in the state machine 208.

7.2.2.2 EDRL Expander State Machine

The EDRL expander state machine 208 controls the edge calculation and runlength expansion logic in response to codes supplied by the EDRL stream decoder 206. It supplies the EDRL stream decoder 206 with the length of the current codeword and supplies the edge calculation logic 210 with the delta value associated with the current delta code. The state machine 206 also responds to start and stop control signals from a control register 234 (FIG. 20), and the end-of-line (EOL) signal from the edge calculation logic 210.

The state machine 208 also controls the multi-cycle fetch of the runlength associated with a create edge code.

TABLE 19

EDRL expander state machine

| input signal | input code | current state | next state | code len | delta | actions |
|---|---|---|---|---|---|---|
| start | — | stopped | starting | 8 | — | — |
| — | — | starting | idle | 8 | — | — |
| stop | — | — | stopped | 0 | — | reset RL decoders and FIFOs |
| EOL | — | — | EOL 1 | 0 | — | reset RL encoder; reset RL decoders; reset ref. edge and edge |
| — | — | EOL 1 | idle | | | RL encoder → ref. RL; ref. edge + ref. RL → ref. edge |
| — | Δ0 | idle | idle | 1 | 0 | edge − ref. edge + delta → RL; edge + RL → edge; RL → RL decoder; RL encoder → ref. RL; ref. edge + ref. RL → ref. edge |
| — | Δ+1 | idle | idle | 2 | +1 | edge − ref. edge + delta → RL; edge + RL → edge; RL → RL decoder; RL encoder → ref. RL; ref. edge + ref. RL → ref. edge |
| — | Δ−1 | idle | idle | 3 | −1 | edge − ref. edge + delta → RL; edge + RL → edge; RL → RL decoder; RL encoder → ref. RL; ref. edge + ref. RL → ref. edge |
| — | Δ+2 | idle | idle | 4 | +2 | edge − ref. edge + delta → RL; edge + RL → edge; RL → RL decoder; RL encoder → ref. RL; ref. edge + ref. RL → ref. edge |

TABLE 19-continued

EDRL expander state machine

| input signal | input code | current state | next state | code len | delta | actions |
|---|---|---|---|---|---|---|
| — | Δ−2 | idle | idle | 5 | −2 | edge − ref. edge + delta → RL; edge + RL → edge; RL → RL decoder; RL encoder → ref. RL; ref. edge + ref. RL → ref. edge |
| — | kill edge | idle | idle | 6 | — | RL encoder → ref. RL; ref. edge + ref. RL → ref. edge |
| — | create near edge | idle | create RL lo 7 | 7 | — | reset create RL |
| — | create far edge | idle | create RL hi 6 | 8 | — | — |
| — | EOP | idle | stopped | 8 | — | — |
| — | — | create RL hi 6 | create RL lo 7 | 6 | — | latch create RL hi 6 |
| — | — | create RL lo 7 | create edge | 7 | — | latch create RL lo 7 |
| — | — | create edge | idle | 0 | — | create RL → RL; edge + RL → edge; RL → RL encoder |

7.2.2.3 Runlength Decoder

The runlength decoder 212 expands a runlength into a sequence of zero bits or one bits of the corresponding length in the output stream. The first run in a line is assumed to be white (color 0). Each run is assumed to be of the opposite color to its predecessor. If the first run is actually black (color 1), then it must be preceded by a zero-length white run. The runlength decoder 212 keeps track of the current color internally.

Figure 22:
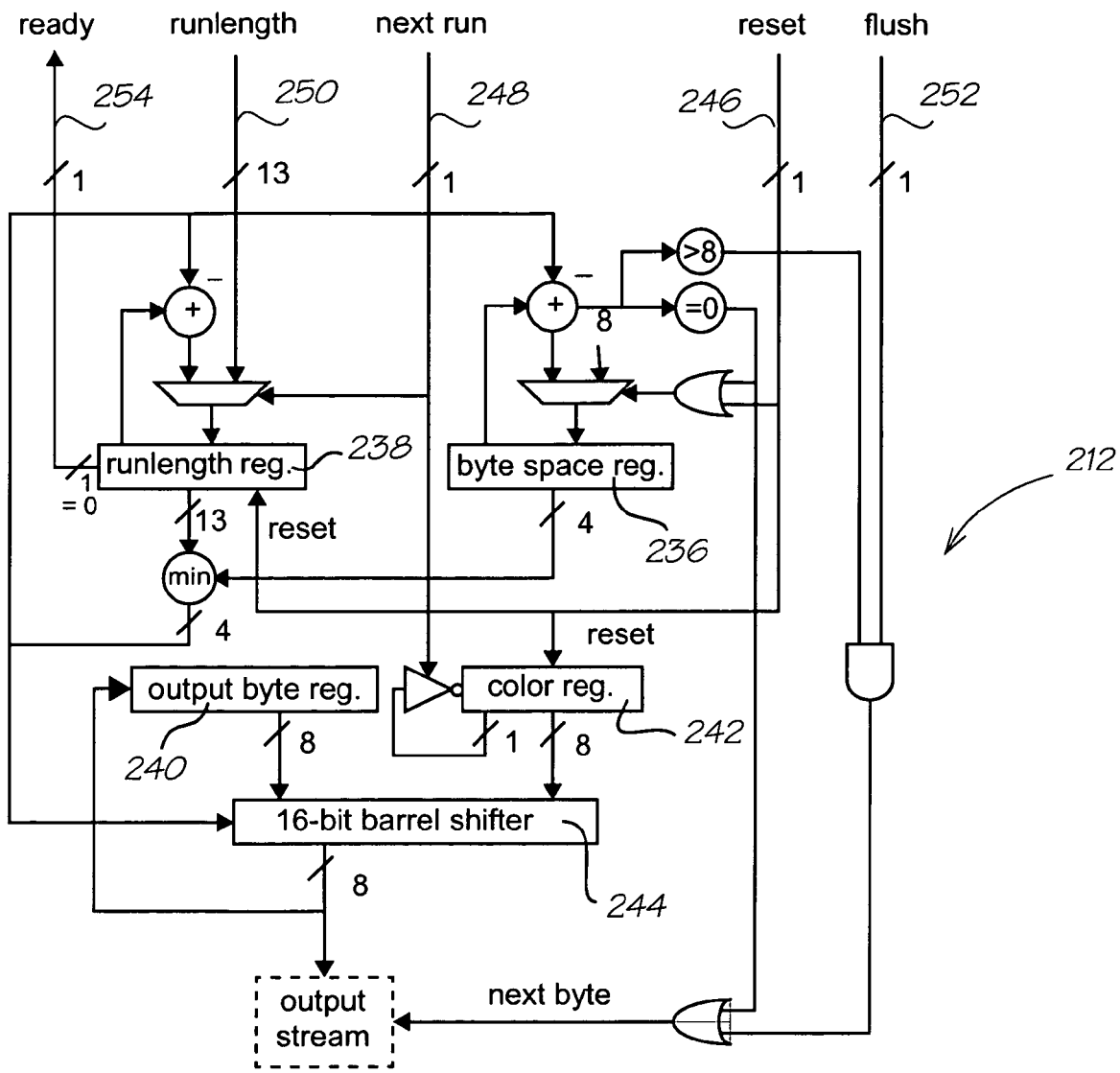
FIG. 22 shows a block diagram of a runlength decoder.

The runlength decoder 212 appends a maximum of 8 bits to the output stream every clock. Runlengths are typically not an integer multiple of 8, and so runs other than the first in an image are typically not byte-aligned. The runlength decoder 212 maintains, in a byte space register 236 (FIG. 22), the number of bits available in the byte currently being built. This is initialized to 8 at the beginning of decoding, and on the output of every byte.

The decoder 212 starts outputting a run of bits as soon as the next run line 248 latches a non-zero value into a runlength register 238. The decoder 212 effectively stalls when the runlength register 238 goes to zero.

A number of bits of the current color are shifted into an output byte register 240 each clock. The current color is maintained in a 1-bit color register 242. The number of bits actually output is limited by the number of bits left in the runlength, and by the number of spare bits left in the output byte. The number of bits output is subtracted from the runlength and the byte space. When the runlength goes to zero it has been completely decoded, although the trailing bits of the run may still be in the output byte register 240, pending output. When the byte space goes to zero the output byte is full and is appended to the output stream.

A 16-bit barrel shifter 244, the output byte register 240 and the color register 242 together implement an 8-bit shift register which can be shifted multiple bit positions every clock, with the color as the serial input.

An external reset line 246 is used to reset the runlength decoder 212 at the start of a line. An external next run line 248 is used to request the decoding of a new runlength. It is accompanied by a runlength on an external runlength line 250. The next run line 248 should not be set on the same clock as the reset line 246. Because next run inverts the current color, the reset of the color sets it to one, not zero. An external flush line 252 is used to flush the last byte of the run, if incomplete. It can be used on a line-by-line basis to yield byte-aligned lines, or on an image basis to yield a byte-aligned image.

An external ready line 254 indicates whether the runlength decoder 212 is ready to decode a runlength. It can be used to stall the external logic.

7.2.2.4 Runlength Encoder

The runlength encoder 214 detects a run of zero or one bits in the input stream. The first run in a line is assumed to be white (color 0). Each run is assumed to be of the opposite color to its predecessor. If the first run is actually black (color 1), then the runlength encoder 214 generates a zero-length white run at the start of the line. The runlength decoder keeps track of the current color internally.

Figure 23:
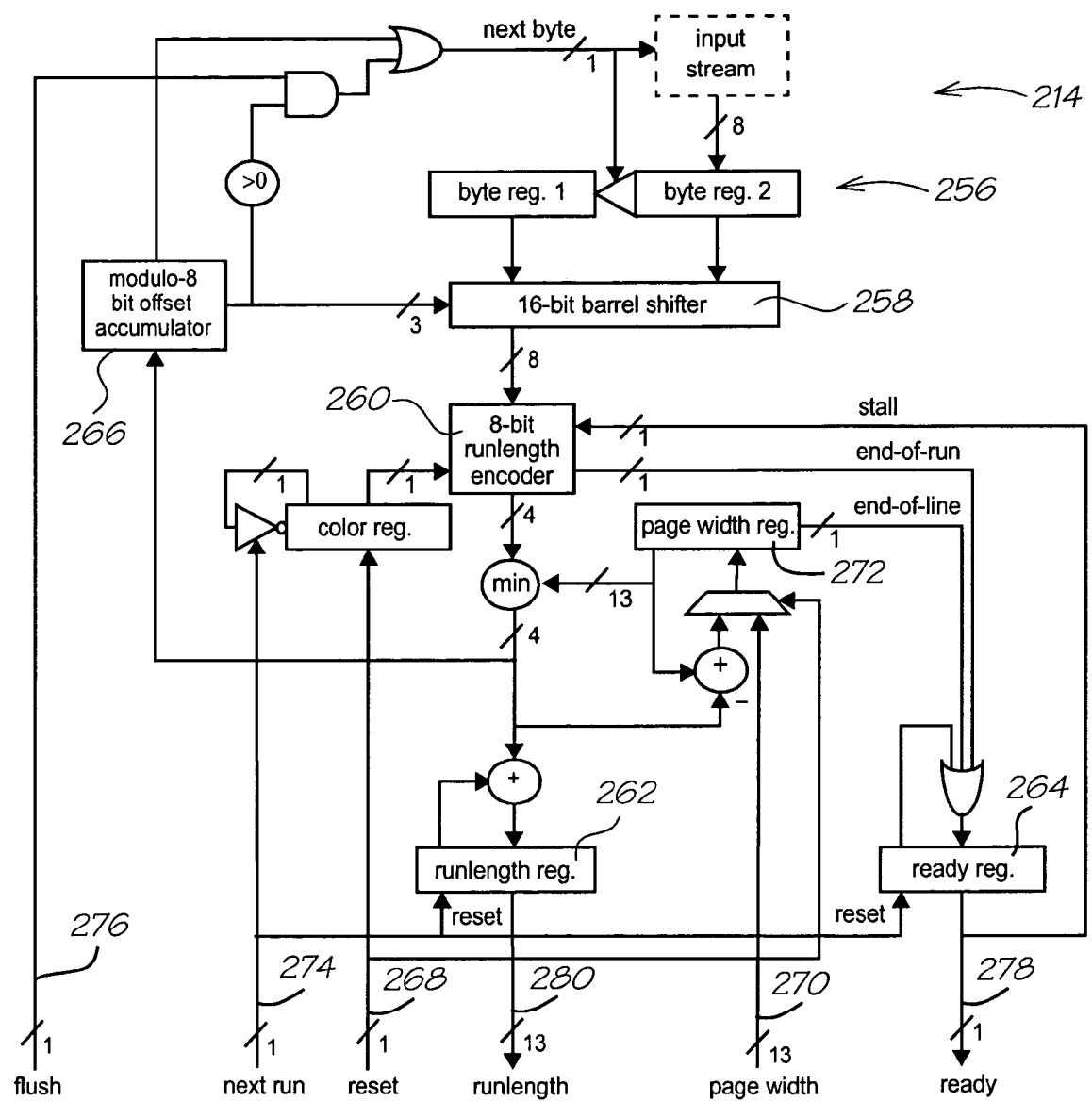
FIG. 23 shows a block diagram of a runlength encoder.

The runlength encoder 214 reads a maximum of 8 bits from the input stream every clock. It uses a two-byte input buffer 256 (FIG. 23) viewed through a 16-bit barrel shifter 258 whose left (most significant) edge is always aligned to the current position in the bitstream. An encoder 260 connected to the barrel shifter 258 encodes an 8-bit (partial) runlength according to Table 20. The 8-bit runlength encoder 260 uses the current color to recognize runs of the appropriate color.

The 8-bit runlength generated by the 8-bit runlength encoder 260 is added to the value in a runlength register 262. When the 8-bit runlength encoder 260 recognizes the end of the current run it generates an end-of-run signal which is latched by a ready register 264. The output of the ready register 264 indicates that the encoder 214 has completed encoding the current runlength, accumulated in the runlength register 262. The output of the ready register 264 is also used to stall the 8-bit runlength encoder 260. When stalled the 8-bit runlength encoder 260 outputs a zero-length run and a zero end-of-run signal, effectively stalling the entire runlength encoder 214.

TABLE 20

8-bit runlength encoder table

| Color | input | length | end-of-run |
|---|---|---|---|
| 0 | 0000 0000 | 8 | 0 |
| 0 | 0000 0001 | 7 | 1 |
| 0 | 0000 001x | 6 | 1 |
| 0 | 0000 01xx | 5 | 1 |
| 0 | 0000 1xxx | 4 | 1 |
| 0 | 0001 xxxx | 3 | 1 |
| 0 | 001x xxxx | 2 | 1 |
| 0 | 01xx xxxx | 1 | 1 |
| 0 | 1xxx xxxx | 0 | 1 |
| 1 | 1111 1111 | 8 | 0 |
| 1 | 1111 1110 | 7 | 1 |
| 1 | 1111 110x | 6 | 1 |
| 1 | 1111 10xx | 5 | 1 |
| 1 | 1111 0xxx | 4 | 1 |
| 1 | 1110 xxxx | 3 | 1 |
| 1 | 110x xxxx | 2 | 1 |
| 1 | 10xx xxxx | 1 | 1 |
| 1 | 0xxx xxxx | 0 | 1 |

The output of the 8-bit runlength encoder 260 is limited by the remaining page width. The actual 8-bit runlength is subtracted from the remaining page width, and is added to a modulo-8 bit position accumulator 266 used to control the barrel shifter 258 and clock the byte stream input.

An external reset line 268 is used to reset the runlength encoder 214 at the start of a line. It resets the current color and latches a page width signal on line 270 into a page width register 272. An external next run line 274 is used to request another runlength from the runlength encoder 214. It inverts the current color, and resets the runlength register 262 and ready register 264. An external flush line 276 is used to flush the last byte of the run, if incomplete. It can be used on a line-by-line basis to process byte-aligned lines, or on an image basis to process a byte-aligned image.

An external ready line 278 indicates that the runlength encoder 214 is ready to encode a runlength, and that the current runlength is available on a runlength line 280. It can be used to stall the external logic.

7.2.2.5 Timing

The EEU 188 has an output rate of 124M 1-bit black pixels/s. The core logic generates one runlength every clock. The runlength decoders 212 and the runlength encoder 214 generate/consume up to 8 pixels (bits) per clock. One runlength decoder 212.1 and the runlength encoder 214 operate at quarter resolution (800 dpi). The other runlength decoder 212.2 operates at full resolution (1600 dpi).

A worst-case bi-level image consisting of a full page of 3 point text converts to approximately 6M runlengths at 800 dpi (the rendering resolution). At 1600 dpi (the horizontal output resolution) this gives an average runlength of about 20. Consequently about 40% of 8-pixel output bytes span two runs and so require two clocks instead of one. Output lines are replicated vertically to achieve a vertical resolution of 1600 dpi. When a line is being replicated rather than generated it has a perfect efficiency of 8 pixels per clock, thus the overhead is halved to 20%.

The full-resolution runlength decoder in the output stage of the EEU 188 is the slowest component in the EEU 188. The minimum clock speed of the EEU 188 is therefore dictated by the output pixel rate of the EEU (124 Mpixels/s), divided by the width of the runlength decoder (8), adjusted for its worst-case overhead (20%). This gives a minimum speed of about 22 MHz.

7.2.3 JPEG Decoder

The JPEG decoder 196 (FIG. 24) decompresses a JPEG-compressed CMYK contone image.

The input to the JPEG decoder 196 is a JPEG bitstream. The output from the JPEG decoder 196 is a set of contone CMYK image lines.

Figure 24:
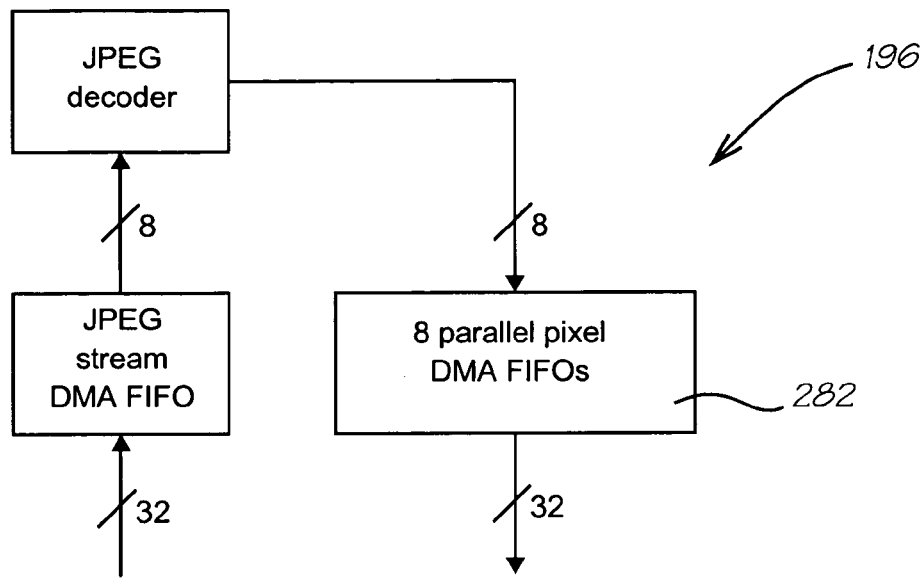
FIG. 24 shows a block diagram of a JPEG decoder.

When decompressing, the JPEG decoder 196 writes its output in the form of 8×8 pixel blocks. These are sometimes converted to full-width lines via an page width×8 strip buffer closely coupled with the codec. This would require a 67 KB buffer. We instead use 8 parallel pixel FIFOs 282 with shared bus access and 8 corresponding DMA channels, as shown in FIG. 24.

7.2.3.1 Timing

The JPEG decoder 196 has an output rate of 3.5M 32-bit CMYK pixels/s. The required clock speed of the decoder depends on the design of the decoder.

7.2.4 Halftoner/Compositor

Figure 25:
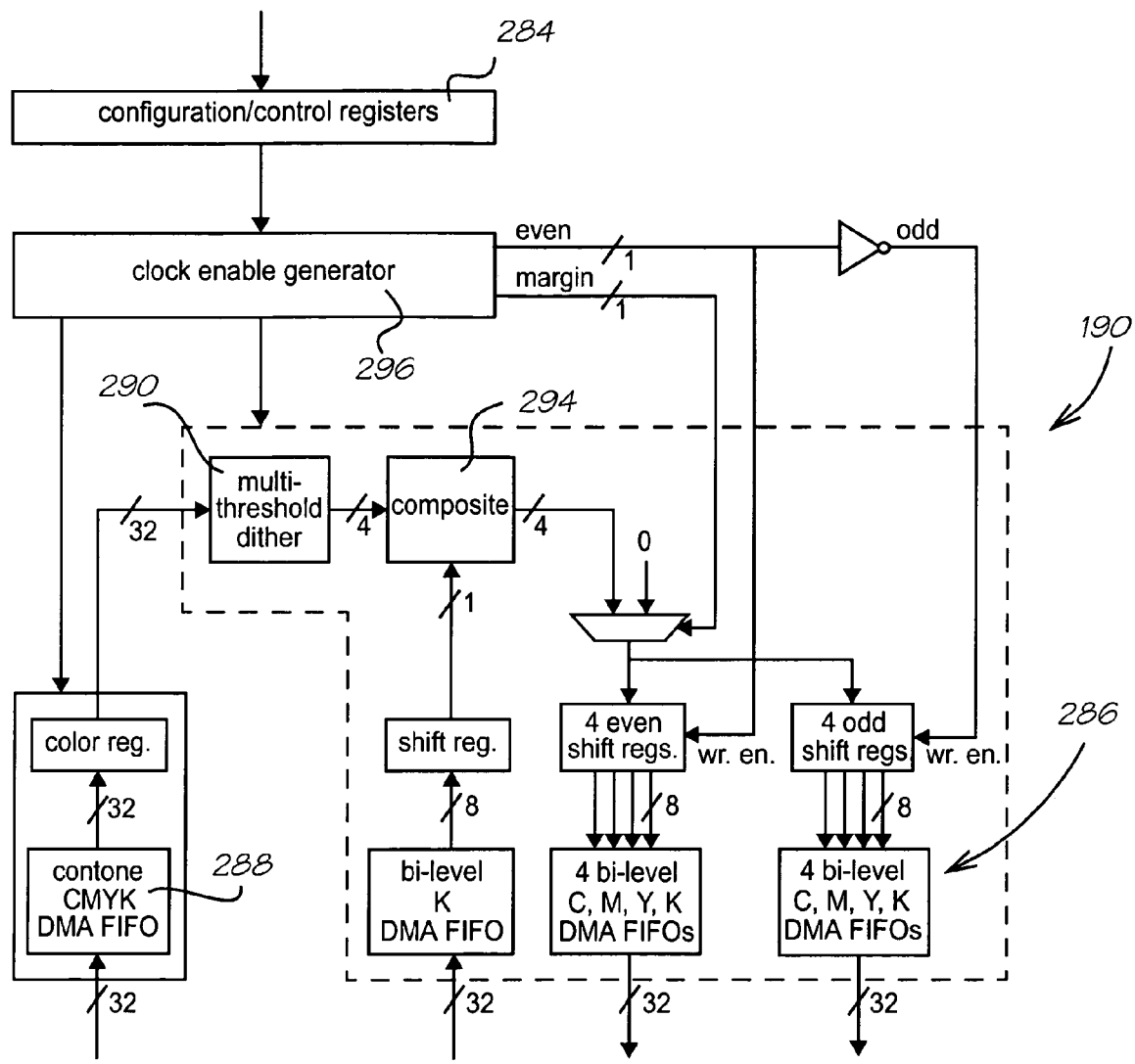
FIG. 25 shows a block diagram of a halftoner/compositor unit.

The halftoner/compositor unit (HCU) 190 (FIG. 25) combines the functions of halftoning the contone CMYK layer to bi-level CMYK, and compositing the black layer over the halftoned contone layer.

The input to the HCU 190 is an expanded 267 ppi CMYK contone layer, and an expanded 1600 dpi black layer. The output from the HCU 190 is a set of 1600 dpi bi-level CMYK image lines.

Once started, the HCU 190 proceeds until it detects an end-of-page condition, or until it is explicitly stopped via its control register 284.

The HCU 190 generates a page of dots of a specified width and length. The width and length must be written to page width and page length registers of the control registers 284 prior to starting the HCU 190. The page width corresponds to the width of the printhead. The page length corresponds to the length of the target page.

The HCU 190 generates target page data between specified left and right margins relative to the page width. The positions of the left and right margins must be written to left margin and right margin registers of the control registers 284 prior to starting the HCU 190. The distance from the left margin to the right margin corresponds to the target page width.

The HCU 190 consumes black and contone data according to specified black and contone page widths. These page widths must be written to black page width and contone page width registers of the control registers 284 prior to starting the HCU 190. The HCU 190 clips black and contone data to the target page width. This allows the black and contone page widths to exceed the target page width without requiring any special end-of-line logic at the input FIFO level.

Figure 26:
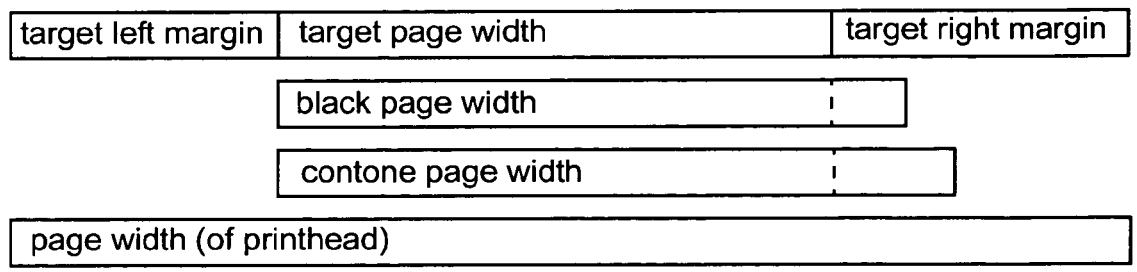
FIG. 26 shows a diagram of the relationship between page widths and margins.

The relationships between the page width, the black and contone page widths, and the margins are illustrated in FIG. 26.

The HCU 190 scales contone data to printer resolution both horizontally and vertically based on a specified scale factor. This scale factor must be written to a contone scale factor register of the control registers 284 prior to starting the HCU 190.

TABLE 21

Halftoner/compositor control and configuration registers

| register | width | description |
|---|---|---|
| start | 1 | Start the HCU. |
| stop | 1 | Stop the HCU. |
| page width | 14 | Page width of printed page, in dots. This is the number of dots which have to be generated for each line. |
| left margin | 14 | Position of left margin, in dots. |
| right margin | 14 | Position of right margin, in dots. |
| page length | 15 | Page length of printed page, in dots. This is the number of lines which have to be generated for each page. |
| black page width | 14 | Page width of black layer, in dots. Used to detect the end of a black line. |
| contone page width | 14 | Page width of contone layer, in dots. Used to detect the end of a contone line. |
| contone scale factor | 4 | Scale factor used to scale contone data to bi-level resolution. |

The consumer of the data produced by the HCU 190 is the printhead interface 192. The printhead interface 192 requires bi-level CMYK image data in planar format, i.e. with the color planes separated. Further, it also requires that even and odd pixels are separated. The output stage of the HCU 190 therefore uses 8 parallel pixel FIFOs 286, one each for even cyan, odd cyan, even magenta, odd magenta, even yellow, odd yellow, even black, and odd black.

An input contone CMYK FIFO 288 is a full 9 KB line buffer. The line is used contone scale factor times to effect vertical up-scaling via line replication. FIFO write address wrapping is disabled until the start of the last use of the line. An alternative is to read the line from main memory contone scale factor times, increasing memory traffic by 44 MB/s, but avoiding the need for the on-chip 9 KB line buffer.

7.2.4.1 Multi-Threshold Dither

Figure 27:
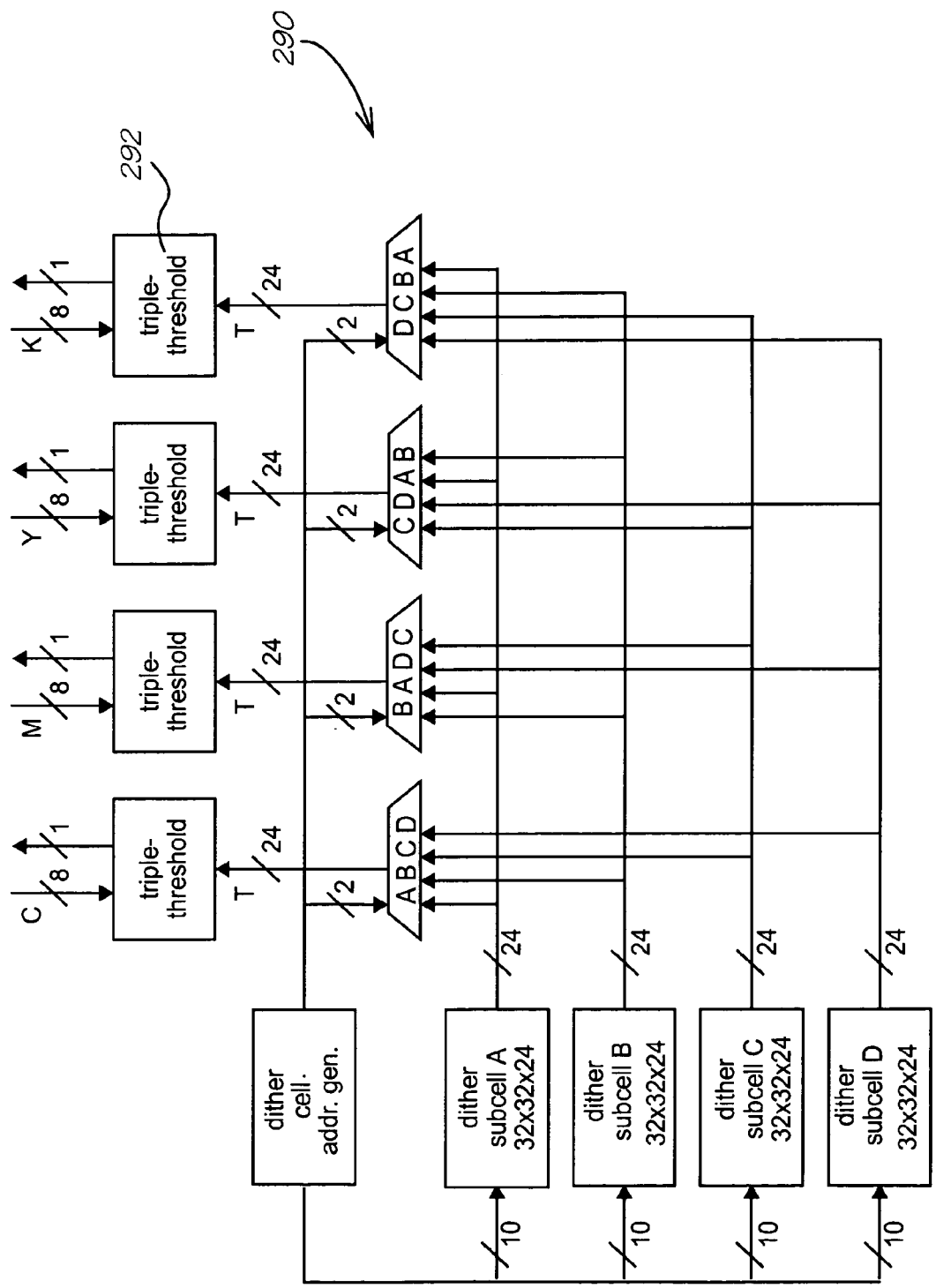
FIG. 27 shows a block diagram of a multi-threshold dither unit.

A multi-threshold dither unit 290 is shown in FIG. 27 of the drawings. A general 256-layer dither volume provides great flexibility in dither cell design, by decoupling different intensity levels. General dither volumes can be large—a 64×64×256 dither volume, for example, has a size of 128 KB. They are also inefficient to access since color component requires the retrieval of a different bit from the volume. In practice, there is no need to fully decouple each layer of the dither volume. Each dot column of the volume can be implemented as a fixed set of thresholds rather than 256 separate bits. Using three 8-bit thresholds, for example, only consumes 24 bits. Now, n thresholds define n+1 intensity intervals, within which the corresponding dither cell location is alternately not set or set. The contone pixel value being dithered uniquely selects one of the n+1 intervals, and this determines the value of the corresponding output dot.

We dither the contone data using a triple-threshold 64×64×3×8-bit (12 KB) dither volume. The three thresholds form a convenient 24-bit value which can be retrieved from the dither cell ROM in one cycle. If dither cell registration is desired between color planes, then the same triple-threshold value can be retrieved once and used to dither each color component. If dither cell registration is not desired, then the dither cell can be split into four subcells and stored in four separately addressable ROMs from which four different triple-threshold values can be retrieved in parallel in one cycle. Using the addressing scheme shown below, the four color planes share the same dither cell at vertical and/or horizontal offsets of 32 dots from each other.

Figure 28:
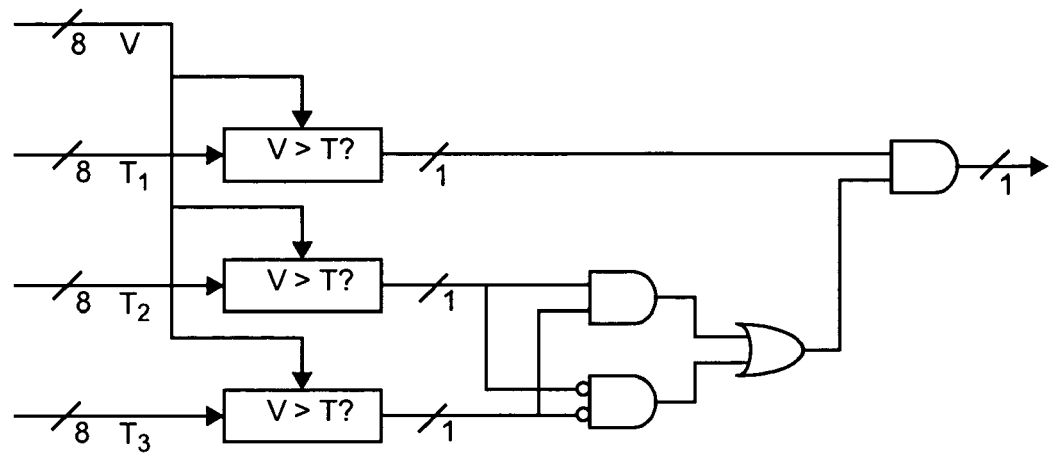
FIG. 28 shows a block diagram of logic of the triple-threshold dither.

Each triple-threshold unit 292 converts a triple-threshold value and an intensity value into an interval and thence a one or zero bit. The triple-thresholding rules are shown in Table 22. The corresponding logic is shown in FIG. 28.

TABLE 22

Triple-thresholding rules

| interval | output |
|---|---|
| $V \leq T_1$ | 0 |
| $T_1 < V \leq T_2$ | 1 |
| $T_2 < V \leq T_3$ | 0 |
| $T_3 < V$ | 1 |

7.2.4.2 Composite

A composite unit 294 of the HCU 190 composites a black layer dot over a halftoned CMYK layer dot. If the black layer opacity is one, then the halftoned CMY is set to zero.

Given a 4-bit halftoned color $C_c M_c Y_c K_c$ and a 1-bit black layer opacity $K_b$, the composite logic is as defined in Table 23.

TABLE 23

Composite logic

| color channel | condition |
|---|---|
| C | $C_c \wedge \neg K_b$ |
| M | $M_c \wedge \neg K_b$ |
| Y | $Y_c \wedge \neg K_b$ |
| K | $K_c \vee K_b$ |

7.2.4.3 Clock Enable Generator

A clock enable generator 296 of the HCU 190 generates enable signals for clocking the contone CMYK pixel input, the black dot input, and the CMYK dot output.

As described earlier, the contone pixel input buffer is used as both a line buffer and a FIFO. Each line is read once and then used contone scale factor times. FIFO write address wrapping is disabled until the start of the final replicated use of the line, at which time the clock enable generator 296 generates a contone line advance enable signal which enables wrapping.

The clock enable generator 296 also generates an even signal which is used to select the even or odd set of output dot FIFOs, and a margin signal which is used to generate white dots when the current dot position is in the left or right margin of the page.

The clock enable generator 296 uses a set of counters. The internal logic of the counters is defined in Table 24. The logic of the clock enable signals is defined in Table 25.

TABLE 24

Clock enable generator counter logic

| counter | abbr. | w. | data | load condition | decrement condition |
|---|---|---|---|---|---|
| dot | D | 14 | page width | $RP^a \vee EOL^b$ | $(D>0) \wedge clk$ |
| line | L | 15 | page length | RP | $(L>0) \wedge EOL$ |
| left margin | LM | 14 | left margin | $RP \vee EOL$ | $(LM>0) \wedge clk$ |
| right margin | RM | 14 | right margin | $RP \vee EOL$ | $(RM>0) \wedge clk$ |
| even/odd dot | E | 1 | 0 | $RP \vee EOL$ | clk |
| black dot | BD | 14 | black width | $RP \vee EOL$ | $(LM=0) \wedge (BD>0) \wedge clk$ |
| contone dot | CD | 14 | contone width | $RP \vee EOL$ | $(LM=0) \wedge (CD>0) \wedge clk$ |

TABLE 24-continued

Clock enable generator counter logic

| counter | abbr. | w. | data | load condition | decrement condition |
|---|---|---|---|---|---|
| contone sub-pixel | CSP | 4 | contone scale factor | RP ∨EOL∨ (CSP=0) | (LM=0) ∧clk |
| contone sub-line | CSL | 4 | contone scale factor | RP ∨(CSL=0) | EOL ∧clk |

<sup>a</sup>RP (reset page) condition: external signal
<sup>b</sup>EOL (end-of-line) condition: (D=0) ∧(BD=0) ∧(CD=0)

TABLE 25

Clock enable generator output signal logic

| output signal | condition |
|---|---|
| output dot clock enable | (D>0) ∧♦EOP |
| black dot clock enable | (LM=0) ∧(BD>0) ∧♦EOP |
| contone pixel clock enable | (LM=0) ∧(CD>0)∧ (CSP=0) ∧♦EOP |
| contone line advance enable | (CSL=0) ∧♦EOP |
| even | E=0 |
| margin | (LM=0) ∨(RM=0) |

<sup>a</sup>EOP (end-of-page) condition: L=0

7.2.4.4 Timing

The HCU 190 has an output rate of 124M 4-bit CMYK pixels/s. Since it generates one pixel per clock, it must be clocked at at least 124 MHz.

7.3 Printhead Interface

CePrint 10 uses an 8.5" CMYK Memjet printhead 143, as described in Section 9. The printhead consists of 17 segments arranged in 2 segment groups. The first segment group contains 9 segments, and the second group contains 8 segments. There are 13,600 nozzles of each color in the printhead 143, making a total of 54,400 nozzles. The printhead interface 192 is a standard Memjet printhead interface, as described in Section 10, configured with the following operating parameters:
MaxColors=4
SegmentsPerXfer=9
SegmentGroups=2

Although the printhead interface 192 has a number of external connections, not all are used for an 8.5" printhead, so not all are connected to external pins on the CCP 180. Specifically, the value for SegmentGroups implies that there are only 2 SRClock pins and 2 SenseSegSelect pins. All 36 ColorData pins, however, are required.

7.3.1 Timing

CePrint 10 prints an 8.3"×11.7" page in 2 seconds. The printhead 143 must therefore print 18,720 lines (11.7"×1600 dpi) in 2 seconds, which yields a line time of about 107 µs. Within the printhead interface 192, a single Print Cycle and a single Load Cycle must both complete within this time. In addition, the paper 144 must advance by about 16 µm in the same time.

In high-speed print mode the Memjet printhead 143 can print an entire line in 100 µs. Since all segments fire at the same time 544 nozzles are fired simultaneously with each firing pulse. This leaves 7 µs for other tasks between each line.

The 1600 SRClock pulses (800 each of SRClock1 and SRClock2) to the printhead 143 (SRClock1 has 36 bits of valid data, and SRClock2 has 32 bits of valid data) must also take place within the 107 µs line time. Restricting the timing to 100 µs, the length of an SRClock pulse cannot exceed 100 µs/1600=62.5 ns. The printhead 143 must therefore be clocked at 16 MHz.

The printhead interface 192 has a nominal pixel rate of 124M 4-bit CMYK pixels/s. However, because it is only active for 100 µs out of every 107 µs, it must be clocked at at least 140 MHz. This can be increased to 144 MHz to make it an integer multiple of the printhead speed.

7.4 Processor and Memory 7.4.1 Processor

The processor 181 runs the control program which synchronizes the other functional units during page reception, expansion and printing. It also runs the device drivers for the various external interfaces, and responds to user actions through the user interface.

It must have low interrupt latency, to provide efficient DMA management, but otherwise does not need to be particularly high-performance.

7.4.2 DMA Controller

The DMA controller 200 supports single-address transfers on 29 channels (see Table 26). It generates vectored interrupts to the processor 181 on transfer completion.

TABLE 26

DMA channel usage

| functional unit | input channels | output |
|---|---|---|
| channels | | |
| host interface | — | 1 |
| inter-CCP interface | 1 | 1 |
| EDRL expander | 1 | 1 |
| JPEG decoder | 1 | 8 |
| halftoner/compositor | 2 | 8 |
| speaker interface | 1 | — |
| printhead interface | 4 | — |
| | 10 | 19 |
| | | 29 |

7.4.3 Program ROM

A program ROM 298 holds the CCP 180 control program which is loaded into main memory 182 during system boot.

7.4.4 Rambus Interface

The Rambus interface 198 provides the high-speed interface to the external 8 MB (64 Mbit) Rambus DRAM (RDRAM) 182.

7.5 External Interfaces 7.5.1 Host Interface

The host interface 194 provides a connection to the host processor with a speed of at least 1.5 MB/s (or 3 MB/s for the double-sided version of CePrint).

7.5.2 Speaker Interface

Figure 18:
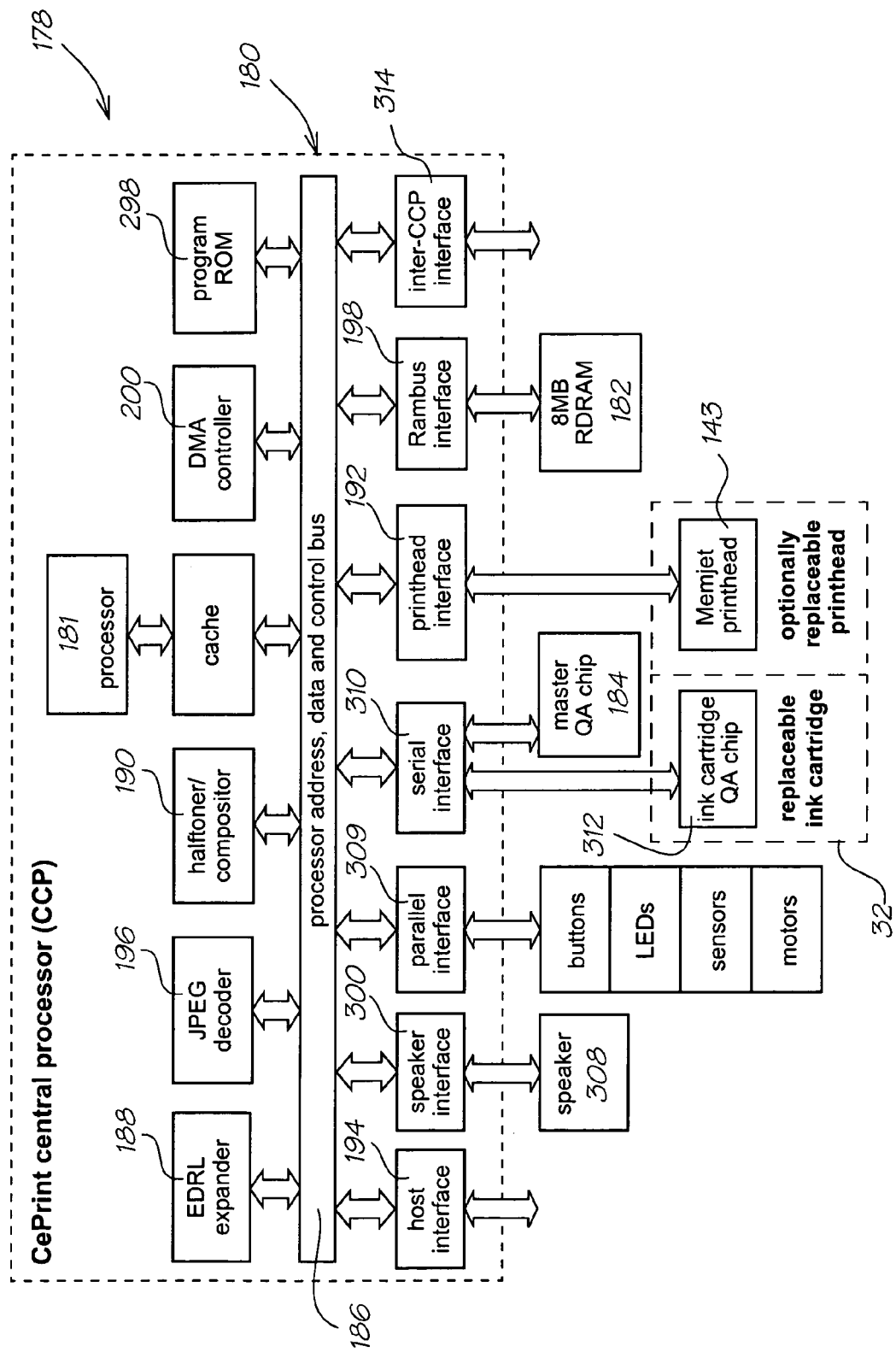
FIG. 18 shows a block diagram of printer controller architecture.
Figure 29:
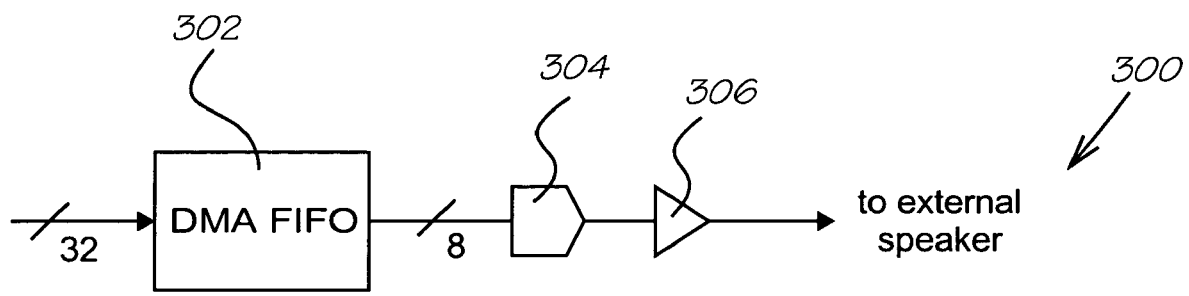
FIG. 29 shows a block diagram of a speaker interface.

A speaker interface 300 (FIG. 29) contains a small FIFO 302 used for DMA-mediated transfers of sound clips from main memory 182, an 8-bit digital-to-analog converter (DAC) 304 which converts each 8-bit sample value to a voltage, and an amplifier 306 which feeds an external speaker 308 (FIG. 18). When the FIFO 302 is empty it outputs a zero value.

The speaker interface 300 is clocked at the frequency of the sound clips.

The processor 181 outputs a sound clip to the speaker 308 simply by programming the DMA channel of the speaker interface 300.

7.5.3 Parallel Interface

A parallel interface 309 provides I/O on a number of parallel external signal lines.

It allows the processor 181 to sense or control the devices listed in Table 27.

TABLE 27

| Parallel Interface devices |
|---|
| parallel interface devices |
| power button |
| power LED |
| out-of-paper LED |
| out-of-ink LED |
| media sensor |
| paper pick-up roller position sensor |
| paper tray drive position sensor |
| paper pick-up motor |
| paper tray ejector motor |
| transfer roller stepper motor |

7.5.4 Serial Interface

A serial interface 310 provides two standard low-speed serial ports.

One port is used to connect to the master QA chip 184. The other is used to connect to a QA chip 312 in the ink cartridge. The processor-mediated protocol between the two is used to authenticate the ink cartridge. The processor 181 can then retrieve ink characteristics from the QA chip 312, as well as the remaining volume of each ink. The processor 181 uses the ink characteristics to properly configure the Memjet printhead 143. It uses the remaining ink volumes, updated on a page-by-page basis with ink consumption information accumulated by the printhead interface 192, to ensure that it never allows the printhead 143 to be damaged by running dry.

7.5.4.1 Ink Cartridge QA Chip

The QA chip 312 in the ink cartridge 32 contains information required for maintaining the best possible print quality, and is implemented using an authentication chip. The 256 bits of data in the authentication chip are allocated as follows:

TABLE 28

| Ink cartridge's 256 bits (16 entries of 16-bits) | | | |
|---|---|---|---|
| M[n] | access | width | description |
| 0 | RO[a] | 16 | Basic header, flags etc. |
| 1 | RO | 16 | Serial number. |
| 2 | RO | 16 | Batch number. |
| 3 | RO | 16 | Reserved for future expansion. Must be 0. |
| 4 | RO | 16 | Cyan ink properties. |
| 5 | RO | 16 | Magenta ink properties. |
| 6 | RO | 16 | Yellow ink properties. |
| 7 | RO | 16 | Black ink properties. |
| 8-9 | DO[b] | 32 | Cyan ink remaining, in nanolitres. |
| 10-11 | DO | 32 | Magenta ink remaining, in nanolitres. |
| 12-13 | DO | 32 | Yellow ink remaining, in nanolitres. |
| 14-15 | DO | 32 | Black ink remaining, in nanolitres. |

[a]read only (RO)
[b]decrement only

Before each page is printed, the processor 181 must check the amount of ink remaining to ensure there is enough for an entire worst-case page. Once the page has been printed, the processor 181 multiplies the total number of drops of each color (obtained from the printhead interface 192) by the drop volume. The amount of printed ink is subtracted from the amount of ink remaining. The unit of measurement for ink remaining is nanolitres, so 32 bits can represent over 4 liters of ink. The amount of ink used for a page must be rounded up to the nearest nanolitre (i.e. approximately 1000 printed dots).

7.5.5 Inter-CCP Interface

An inter-CCP interface 314 provides a bi-directional high-speed serial communications link to a second CCP, and is used in multi-CCP configurations such as the double-sided version of the printer which contains two CCPs.

The link has a minimum speed of 30 MB/s, to support timely distribution of page data, and may be implemented using a technology such as IEEE 1394 or Rambus.

7.5.6 JTAG Interface

A standard JTAG (Joint Test Action Group) interface (not shown) is included for testing purposes. Due to the complexity of the chip, a variety of testing techniques are required, including BIST (Built In Self Test) and functional block isolation. An overhead of 10% in chip area is assumed for overall chip testing circuitry.

8 Double-Sided Printing

The double-sided version of CePrint contains two complete print engines or printing units 140—one for the front of the paper, one for the back. Each printing unit 140 consists of a printer controller 178, a printhead assembly 142 containing a Memjet printhead 143, and a transfer roller 68. Both printing units 140 share the same ink supply. The back side, or lower, printing unit 140 acts as the master unit. It is responsible for global printer functions, such as communicating with the host, handling the ink cartridge 32, handling the user interface, and controlling the paper transport. The front side, or upper, printing unit 140 acts as a slave unit. It obtains pages from the host processor via the master unit, and is synchronized by the master unit during printing.

Both printer controllers 178 consist of a CePrint central processor (CCP) 180 and a local 8 MB RDRAM 182. The external interfaces of the master unit are used in the same way as in the single-sided version of CePrint, but only the memory interface 198 and the printhead interface 192 of the slave unit are used. An external master/slave pin on the CCP 180 selects the mode of operation.

Figure 30:
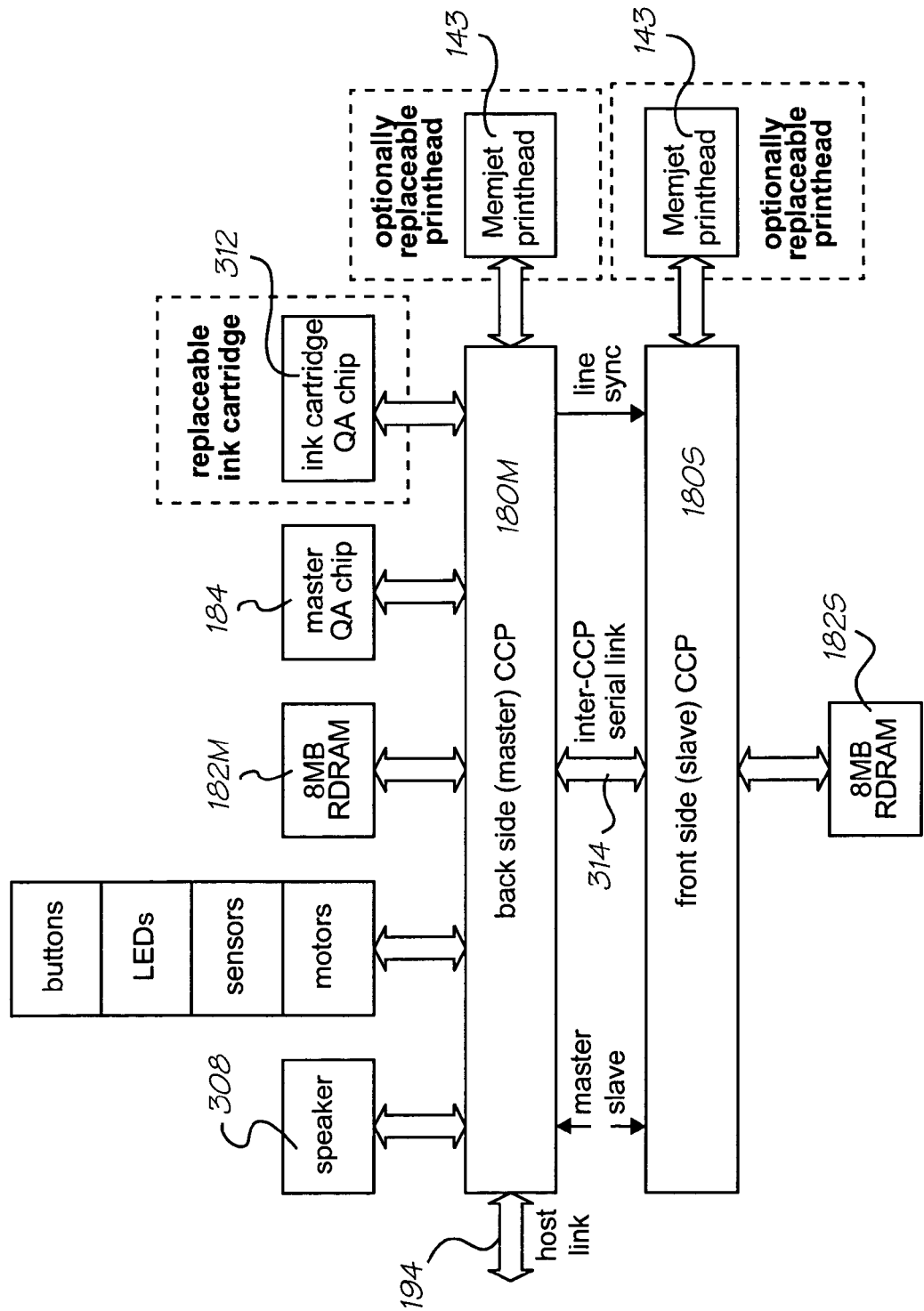
FIG. 30 shows a block diagram of a dual printer controller configuration.

This dual printer controller configuration is illustrated in FIG. 30.

8.1 Page Delivery and Distribution

The master CCP 180M (FIG. 30) presents a unified view of the printer 10 to the host processor. It hides the presence of the slave CCP 180S.

Pages are transmitted from the host processor to the printer 10 in page order. The first page of a document is always a front side page, and front side and back side pages are always interleaved. Thus odd-numbered pages are front side pages, and even-numbered pages are back side pages. To print in single-sided mode on either the front side or back side of the paper, the host must send appropriate blank pages to the printer 10. The printer 10 expects a page description for every page.

When the master CCP 180M receives a page command from the host processor relating to an odd-numbered page it routes the command to the slave CCP 180S via the inter-CCP serial link 314. To avoid imposing undue restrictions on the host link and its protocol, each command is received in its entirety and stored in the master's local memory 182M before being forwarded to the memory 182S of the slave. This introduces only a small delay because the inter-CCP link 314 is fast. To ensure that the master CCP 180M always has a page buffer available for a page destined for the slave, the master is deliberately made the back side CCP, so that it receives the front side odd-numbered page before it receives the matching back side even-numbered page.

8.2 Synchronized Printing

Once the master CCP 180M and the slave CCP 180S have received their pages, the master CCP 180M initiates actual printing. This consists of starting the page expansion and printing processes in the master CCP 180M, and initiating the same processes in the slave CCP 180S via a command sent over the inter-CCP serial link 314.

To achieve perfect registration between the front side and back side printed pages, the printhead interfaces 192 of both CCPs are synchronized to a common line synchronization signal. The synchronization signal is generated by the master CCP 180M.

Once the printing pipelines in both CCPs are sufficiently primed, as indicated by the stall status of the line loader/format unit (LLFU) of the printhead interface (Section 10.4), the master CCP 180M starts the line synchronization generator unit (LSGU) of the printhead interface 192 (Section 10.2). The master CCP 180M obtains the status of the slave CCP 180S LLFU via a poll sent over the inter-CCP serial link 314.

After the printing of a page, or more frequently, the master 180M obtains ink consumption information from the slave 180S over the inter-CCP link 314. It uses this to update the remaining ink volume in the ink cartridge 32, as described in Section 7.5.4.1.

The master and slave CCPs 180M, 180S also exchange error events and host-initiated printer reset commands over the inter-CCP link 314.

9 Memjet Printhead

The Memjet printhead 143 is a drop-on-demand 1600 dpi inkjet printer that produces bi-level dots in up to 4 colors to produce a printed page of a particular width. Since the printhead prints dots at 1600 dpi, each dot is approximately 22.5 mm in diameter, and spaced 15.875 mm apart. Because the printing is bi-level, the input image should be dithered or error-diffused for best results.

Figure 31:
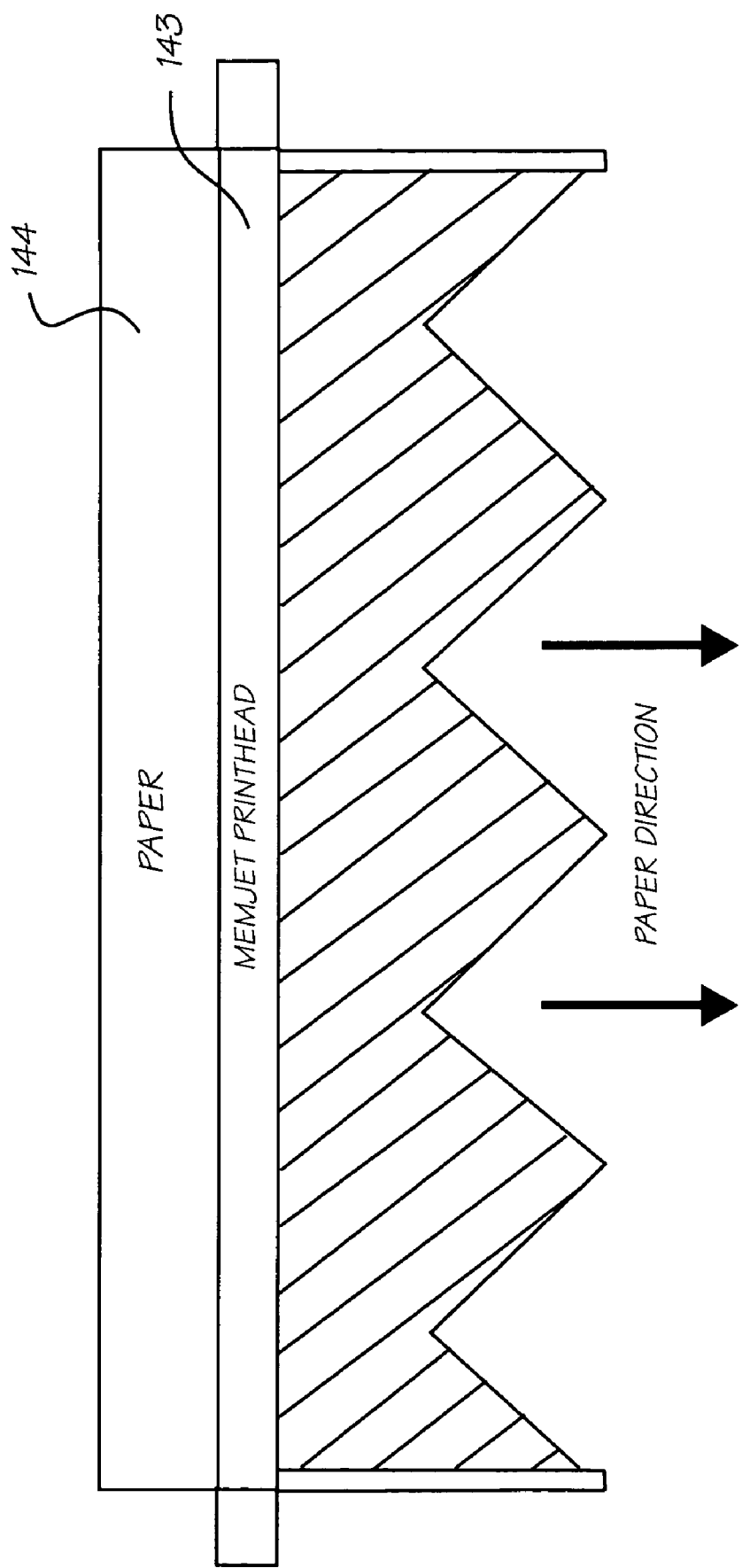
FIG. 31 shows a schematic representation of a Memjet page width printhead.

Typically a Memjet printhead for a particular application is page-width. This enables the printhead 143 to be stationary and allows the paper 144 to move past the printhead 143. FIG. 31 illustrates a typical configuration.

The Memjet printhead 143 is composed of a number of identical ½ inch Memjet segments. The segment is therefore the basic building block for constructing the printhead 143.

9.1 The Structure of a Memjet Segment

This section examines the structure of a single segment, the basic building block for constructing the Memjet printhead 143.

9.1.1 Grouping of Nozzles Within a Segment

The nozzles within a single segment are grouped for reasons of physical stability as well as minimization of power consumption during printing. In terms of physical stability, a total of 10 nozzles share the same ink reservoir. In terms of power consumption, groupings are made to enable a low-speed and a high-speed printing mode. Memjet segments support two printing speeds to allow speed/power consumption trade-offs to be made in different product configurations.

In the low-speed printing mode, 4 nozzles of each color are fired from the segment at a time. The exact number of nozzles fired depends on how many colors are present in the printhead. In a four color (e.g. CMYK) printing environment this equates to 16 nozzles firing simultaneously. In a three color (e.g. CMY) printing environment this equates to 12 nozzles firing simultaneously. To fire all the nozzles in a segment, 200 different sets of nozzles must be fired.

In the high-speed printing mode, 8 nozzles of each color are fired from the segment at a time. The exact number of nozzles fired depends on how many colors are present in the printhead. In a four color (e.g. CMYK) printing environment this equates to 32 nozzles firing simultaneously. In a three color (e.g. CMY) printing environment this equates to 24 nozzles firing simultaneously. To fire all the nozzles in a segment, 100 different sets of nozzles must be fired.

The power consumption in the low-speed mode is half that of the high-speed mode. Note, however, that the energy consumed to print a page is the same in both cases.

9.1.1.1 Ten Nozzles Make a Pod

Figure 32:
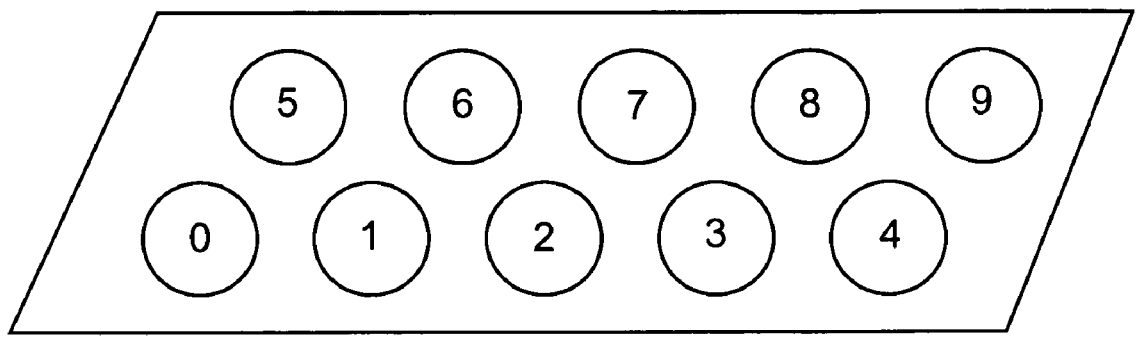
FIG. 32 shows a schematic representation of a pod of twelve printing nozzles numbered in firing order.

A single pod consists of 10 nozzles sharing a common ink reservoir. 5 nozzles are in one row, and 5 are in another. Each nozzle produces dots 22.5 mm in diameter spaced on a 15.875 mm grid to print at 1600 dpi. FIG. 32 shows the arrangement of a single pod, with the nozzles numbered according to the order in which they must be fired.

Figure 33:
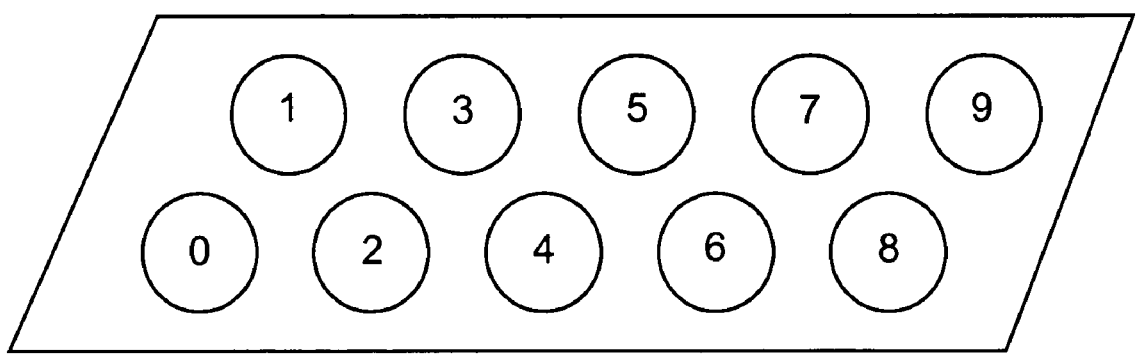
FIG. 33 shows a schematic representation of the same pod with the nozzles numbered in load order.

Although the nozzles are fired in this order, the relationship of nozzles and physical placement of dots on the printed page is different. The nozzles from one row represent the even dots from one line on the page, and the nozzles on the other row represent the odd dots from the adjacent line on the page. FIG. 33 shows the same pod with the nozzles numbered according to the order in which they must be loaded.

The nozzles within a pod are therefore logically separated by the width of 1 dot. The exact distance between the nozzles will depend on the properties of the Memjet firing mechanism. The printhead 143 is designed with staggered nozzles designed to match the flow of paper.

9.1.1.2 One Pod of Each Color Makes a Chromapod

One pod of each color are grouped together into a chromapod. The number of pods in a chromapod will depend on the particular application. In a monochrome printing system (such as one that prints only black), there is only a single color and hence a single pod. Photo printing application printheads require 3 colors (cyan, magenta, yellow), so Memjet segments used for these applications will have 3 pods per chromapod (one pod of each color). The expected maximum number of pods in a chromapod is 4, as used in a CMYK (cyan, magenta, yellow, black) printing system (such as a desktop printer). This maximum of 4 colors is not imposed by any physical constraints—it is merely an expected maximum from the expected applications (of course, as the number of colors increases the cost of the segment increases and the number of these larger segments that can be produced from a single silicon wafer decreases).

Figure 34:
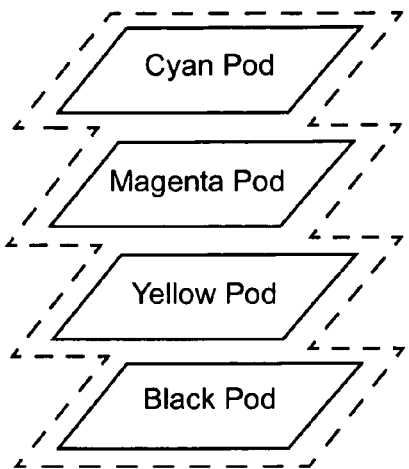
FIG. 34 shows a schematic representation of a chromapod comprising one pod of each color.

A chromapod represents different color components of the same horizontal set of 10 dots on different lines. The exact distance between different color pods depends on the Memjet operating parameters, and may vary from one Memjet design to another. The distance is considered to be a constant number of dot-widths, and must therefore be taken into account when printing: the dots printed by the cyan nozzles will be for different lines than those printed by the magenta, yellow or black nozzles. The printing algorithm must allow for a variable distance up to about 8 dot-widths between colors. FIG. 34 illustrates a single chromapod for a CMYK printing application.

9.1.1.3 Five Chromapods Make a Podgroup

Figure 35:
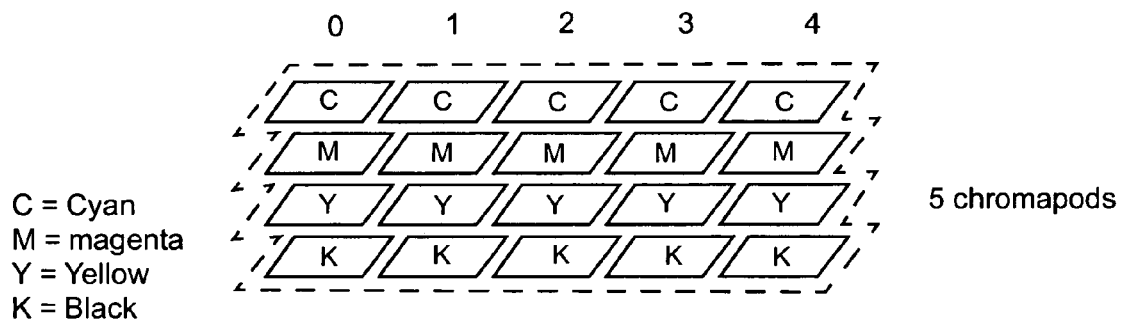
FIG. 35 shows a schematic representation of a podgroup comprising five chromapods.

Five chromapods are organized into a single podgroup. A podgroup therefore contains 50 nozzles for each color. The arrangement is shown in FIG. 35, with chromapods numbered 0-4 and using a CMYK chromapod as the example. Note that the distance between adjacent chromapods is exaggerated for clarity.

9.1.1.4 Two Podgroups Make a Phasegroup

Two podgroups are organized into a single phasegroup. The phasegroup is so named because groups of nozzles within a phasegroup are fired simultaneously during a given firing phase (this is explained in more detail below). The formation of a phasegroup from 2 podgroups is entirely for the purposes of low-speed and high-speed printing via 2 PodgroupEnable lines.

During low-speed printing, only one of the two PodgroupEnable lines is set in a given firing pulse, so only one podgroup of the two fires nozzles. During high-speed printing, both PodgroupEnable lines are set, so both podgroups fire nozzles. Consequently a low-speed print takes twice as long as a high-speed print, since the high-speed print fires twice as many nozzles at once.

Figure 36:
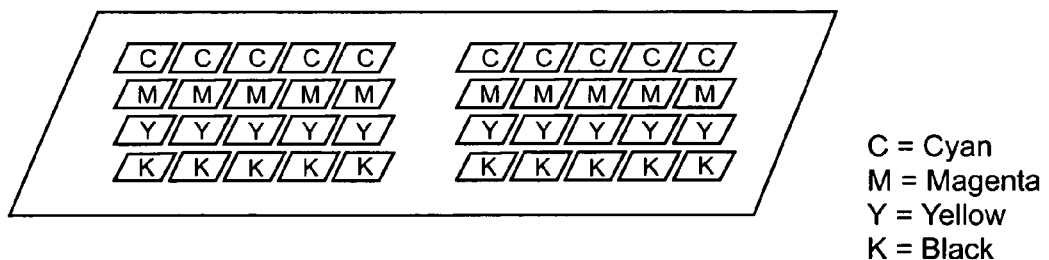
FIG. 36 shows a schematic representation of a phasegroup comprising two podgroups.

FIG. 36 illustrates the composition of a phasegroup. The distance between adjacent podgroups is exaggerated for clarity.

9.1.1.5 Two Phasegroups Make a Firegroup

Figure 37:
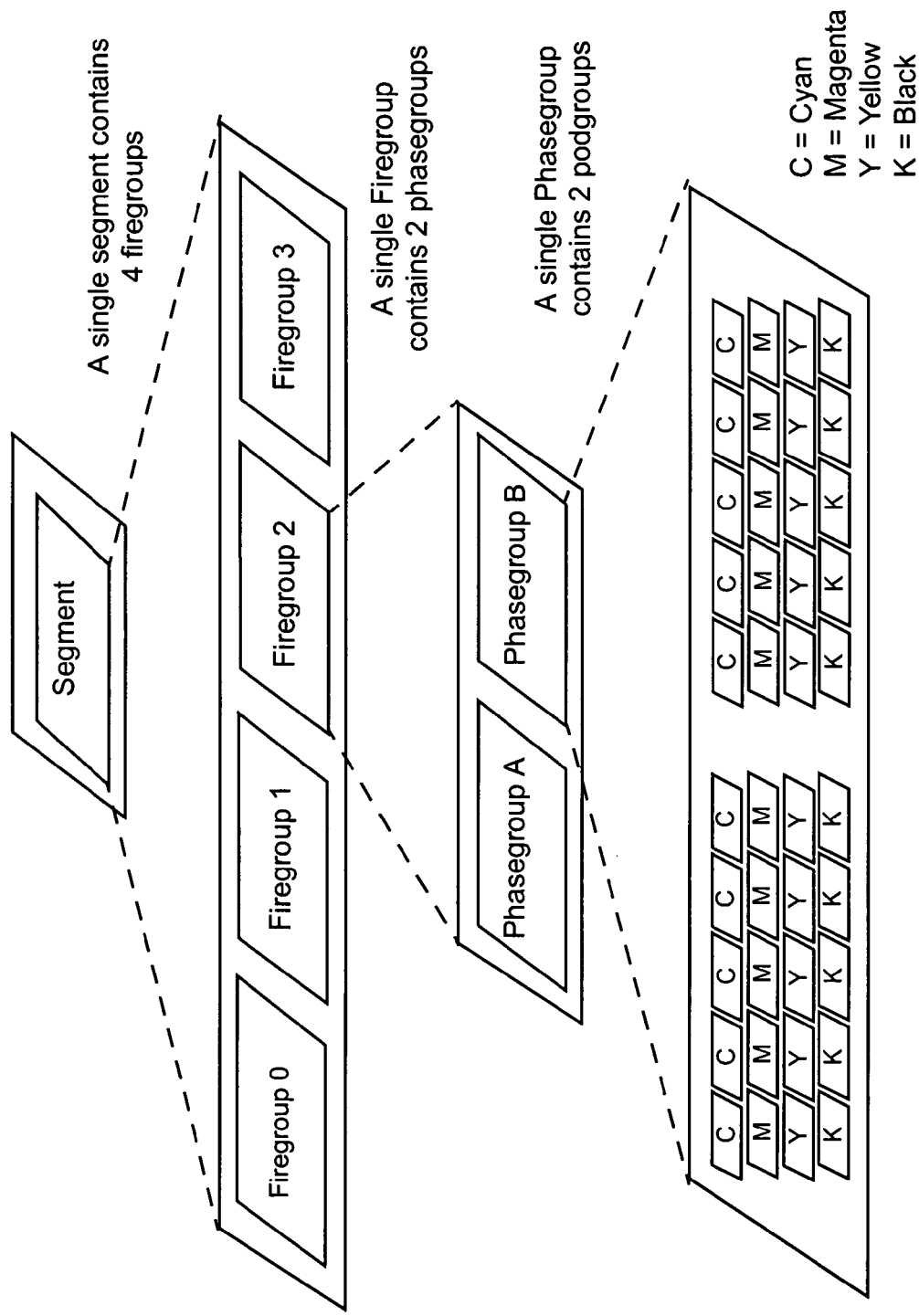
FIG. 37 shows a schematic representation of the relationship between segments, firegroups, phasegroups, podgroups and chromapods.

Two phasegroups (PhasegroupA and PhasegroupB) are organized into a single firegroup, with 4 firegroups in each segment. Firegroups are so named because they all fire the same nozzles simultaneously. Two enable lines, AEnable and BEnable, allow the firing of PhasegroupA nozzles and PhasegroupB nozzles independently as different firing phases. The arrangement is shown in FIG. 37. The distance between adjacent groupings is exaggerated for clarity.

9.1.1.6 Nozzle Grouping Summary

Table 29 is a summary of the nozzle groupings in a segment assuming a CMYK chromapod.

TABLE 29

Nozzle Groupings for a single segment

| Name of Grouping | Composition | Replication Ratio | Nozzle Count |
|---|---|---|---|
| Nozzle | Base unit | 1:1 | 1 |
| Pod | Nozzles per pod | 10:1 | 10 |
| Chromapod | Pods per chromapod | C:1 | 10C |
| Podgroup | Chromapods per podgroup | 5:1 | 50C |
| Phasegroup | Podgroups per phasegroup | 2:1 | 100C |
| Firegroup | Phasegroups per firegroup | 2:1 | 200C |
| Segment | Firegroups per segment | 4:1 | 800C |

The value of C, the number of colors contained in the segment, determines the total number of nozzles.

With a 4 color segment, such as CMYK, the number of nozzles per segment is 3,200.

With a 3 color segment, such as CMY, the number of nozzles per segment is 2,400.

In a monochrome environment, the number of nozzles per segment is 800.

9.1.2 Load and Print Cycles

A single segment contains a total of 800 C nozzles, where C is the number of colors in the segment. A Print Cycle involves the firing of up to all of these nozzles, dependent on the information to be printed. A Load Cycle involves the loading up of the segment with the information to be printed during the subsequent Print Cycle.

Each nozzle has an associated NozzleEnable bit that determines whether or not the nozzle will fire during the Print Cycle. The NozzleEnable bits (one per nozzle) are loaded via a set of shift registers.

Logically there are C shift registers per segment (one per color), each 800 deep. As bits are shifted into the shift register for a given color they are directed to the lower and upper nozzles on alternate pulses. Internally, each 800-deep shift register is comprised of two 400-deep shift registers: one for the upper nozzles, and one for the lower nozzles. Alternate bits are shifted into the alternate internal registers. As far as the external interface is concerned however, there is a single 800 deep shift register.

Once all the shift registers have been fully loaded (800 load pulses), all of the bits are transferred in parallel to the appropriate NozzleEnable bits. This equates to a single parallel transfer of 800C bits. Once the transfer has taken place, the Print Cycle can begin. The Print Cycle and the Load Cycle can occur simultaneously as long as the parallel load of all NozzleEnable bits occurs at the end of the Print Cycle.

9.1.2.1 Load Cycle

The Load Cycle is concerned with loading the segment's shift registers with the next Print Cycle's NozzleEnable bits.

Each segment has C inputs directly related to the C shift registers (where C is the number of colors in the segment). These inputs are named ColorNData, where N is 1 to C (for example, a 4 color segment would have 4 inputs labeled Color1Data, Color2Data, Color3Data and Color4Data). A single pulse on the SRClock line transfers C bits into the appropriate shift registers. Alternate pulses transfer bits to the lower and upper nozzles respectively. A total of 800 pulses are required for the complete transfer of data. Once all 800 C bits have been transferred, a single pulse on the PTransfer line causes the parallel transfer of data from the shift registers to the appropriate NozzleEnable bits.

The parallel transfer via a pulse on PTransfer must take place after the Print Cycle has finished. Otherwise the NozzleEnable bits for the line being printed will be incorrect.

It is important to note that the odd and even dot outputs, although printed during the same Print Cycle, do not appear on the same physical output line. The physical separation of odd and even nozzles within the printhead, as well as separation between nozzles of different colors ensures that they will produce dots on different lines of the page. This relative difference must be accounted for when loading the data into the printhead 143. The actual difference in lines depends on the characteristics of the inkjet mechanism used in the printhead 143. The differences can be defined by variables $D_1$ and $D_2$ where $D_1$ is the distance between nozzles of different colors, and $D_2$ is the distance between nozzles of the same color. Table 30 shows the dots transferred to a C color segment on the first 4 pulses.

TABLE 30

Order of Dots Transferred to a Segment

| Pulse | Dot | Color1 Line | Color2 Line | Color3 Line | ColorC Line |
|---|---|---|---|---|---|
| 1 | 0 | N | $N + D_1$[a] | $N + 2D_1$ | $N + (C-1)D_1$ |
| 2 | 1 | $N + D_2$[b] | $N + D_1 + D_2$ | $N + 2D_1 + D_2$ | $N + (C-1)D_1 + D_2$ |
| 3 | 2 | N | $N + D_1$ | $N + 2D_1$ | $N + (C-1)D_1$ |
| 4 | 3 | $N + D_2$ | $N + D_1 + D_2$ | $N + 2D_1 + D_2$ | $N + (C-1)D_1 + D_2$ |

[a] $D_1$ = number of lines between the nozzles of one color and the next (likely = 4–8)
[b] $D_2$ = number of lines between two rows of nozzles of the same color (likely = 1)

And so on for all 800 pulses.

Data can be clocked into a segment at a maximum rate of 20 MHz, which will load the entire 800 C bits of data in 40 µs.

9.1.2.2 Print Cycle

A single Memjet printhead segment contains 800 nozzles. To fire them all at once would consume too much power and be problematic in terms of ink refill and nozzle interference. This problem is made more apparent when we consider that a Memjet printhead is composed of multiple ½ inch segments, each with 800 nozzles. Consequently two firing modes are defined: a low-speed printing mode and a high-speed printing mode:

- In the low-speed print mode, there are 200 phases, with each phase firing 4 C nozzles (C per firegroup, where C is the number of colors).
- In the high-speed print mode, there are 100 phases, with each phase firing 8 C nozzles, (2 C per firegroup, where C is the number of colors).

The nozzles to be fired in a given firing pulse are determined by

- 3 bits ChromapodSelect (select 1 of 5 chromapods from a firegroup)
- 4 bits NozzleSelect (select 1 of 10 nozzles from a pod)
- 2 bits of PodgroupEnable lines (select 0, 1, or 2 podgroups to fire)

When one of the PodgroupEnable lines is set, only the specified Podgroup's 4 nozzles will fire as determined by ChromapodSelect and NozzleSelect. When both of the PodgroupEnable lines are set, both of the podgroups will fire their nozzles. For the low-speed mode, two fire pulses are required, with PodgroupEnable=10 and 01 respectively. For the high-speed mode, only one fire pulse is required, with PodgroupEnable=11.

The duration of the firing pulse is given by the AEnable and BEnable lines, which fire the PhasegroupA and PhasegroupB nozzles from all firegroups respectively. The typical duration of a firing pulse is 1.3-1.8 ms. The duration of a pulse depends on the viscosity of the ink (dependent on temperature and ink characteristics) and the amount of power available to the printhead 143. See Section 9.1.3 for details on feedback from the printhead 143 in order to compensate for temperature change.

The AEnable and BEnable are separate lines in order that the firing pulses can overlap. Thus the 200 phases of a low-speed Print Cycle consist of 100 A phases and 100 B phases, effectively giving 100 sets of Phase A and Phase B. Likewise, the 100 phases of a high-speed print cycle consist of 50 A phases and 50 B phases, effectively giving 50 phases of phase A and phase B.

Figure 38:
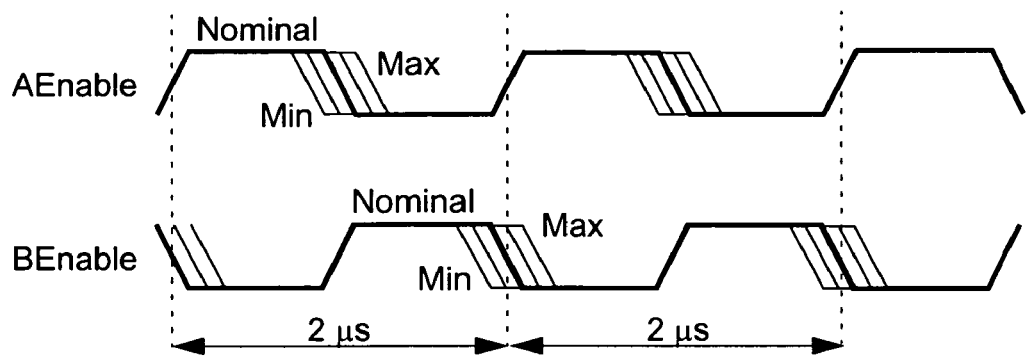
FIG. 38 shows a phase diagram of AEnable and BEnable lines during a typical printing cycle.

FIG. 38 shows the AEnable and BEnable lines during a typical Print Cycle. In a high-speed print there are 50 2 ms cycles, while in a low-speed print there are 100 2 µs cycles.

For the high-speed printing mode, the firing order is:

ChromapodSelect 0, NozzleSelect 0, PodgroupEnable 11 (Phases A and B)
ChromapodSelect 1, NozzleSelect 0, PodgroupEnable 11 (Phases A and B)
ChromapodSelect 2, NozzleSelect 0, PodgroupEnable 11 (Phases A and B)
ChromapodSelect 3, NozzleSelect 0, PodgroupEnable 11 (Phases A and B)
ChromapodSelect 4, NozzleSelect 0, PodgroupEnable 11 (Phases A and B)
ChromapodSelect 0, NozzleSelect 1, PodgroupEnable 11 (Phases A and B)
. . .
ChromapodSelect 3, NozzleSelect 9, PodgroupEnable 11 (Phases A and B)
ChromapodSelect 4, NozzleSelect 9, PodgroupEnable 11 (Phases A and B)

For the low-speed printing mode, the firing order is similar. For each phase of the high speed mode where PodgroupEnable was 11, two phases of PodgroupEnable=01 and 10 are substituted as follows:

ChromapodSelect 0, NozzleSelect 0, PodgroupEnable 01 (Phases A and B)
ChromapodSelect 0, NozzleSelect 0, PodgroupEnable 10 (Phases A and B)
ChromapodSelect 1, NozzleSelect 0, PodgroupEnable 01 (Phases A and B)
ChromapodSelect 1, NozzleSelect 0, PodgroupEnable 10 (Phases A and B)
. . .
ChromapodSelect 3, NozzleSelect 9, PodgroupEnable 01 (Phases A and B)
ChromapodSelect 3, NozzleSelect 9, PodgroupEnable 10 (Phases A and B)
ChromapodSelect 4, NozzleSelect 9, PodgroupEnable 01 (Phases A and B)
ChromapodSelect 4, NozzleSelect 9, PodgroupEnable 10 (Phases A and B)

When a nozzle fires, it takes approximately 100 µs to refill. The nozzle cannot be fired before this refill time has elapsed. This limits the fastest printing speed to 100 µs per line. In the high-speed print mode, the time to print a line is 100 µs, so the time between firing a nozzle from one line to the next matches the refill time. The low-speed print mode is slower than this, so is also acceptable.

The firing of a nozzle also causes acoustic perturbations for a limited time within the common ink reservoir of that nozzle's pod. The perturbations can interfere with the firing of another nozzle within the same pod. Consequently, the firing of nozzles within a pod should be offset from each other as long as possible. We therefore fire four nozzles from a chromapod (one nozzle per color) and then move onto the next chromapod within the podgroup.

- In the low-speed printing mode the podgroups are fired separately. Thus the 5 chromapods within both podgroups must all fire before the first chromapod fires again, totalling 10×2 µs cycles. Consequently each pod is fired once per 20 µs.
- In the high-speed printing mode, the podgroups are fired together. Thus the 5 chromapods within a single podgroups must all fire before the first chromapod fires again, totalling 5×2 µs cycles. Consequently each pod is fired once per 10 µs.

As the ink channel is 300 mm long and the velocity of sound in the ink is around 1500 m/s, the resonant frequency of the ink channel is 2.5 MHz. Thus the low-speed mode allows 50 resonant cycles for the acoustic pulse to dampen, and the high-speed mode allows 25 resonant cycles. Consequently any acoustic interference is minimal in both cases.

9.1.3 Feedback from a Segment

A segment produces several lines of feedback. The feedback lines are used to adjust the timing of the firing pulses. Since multiple segments are collected together into a printhead, it is effective to share the feedback lines as a tri-state bus, with only one of the segments placing the feedback information on the feedback lines.

A pulse on the segment's SenseSegSelect line ANDed with data on Color1Data selects if the particular segment will provide the feedback. The feedback sense lines will come from that segment until the next SenseSegSelect pulse. The feedback sense lines are as follows:

Tsense informs the controller how hot the printhead is. This allows the controller to adjust timing of firing pulses, since temperature affects the viscosity of the ink.

Vsense informs the controller how much voltage is available to the actuator. This allows the controller to compensate for a flat battery or high voltage source by adjusting the pulse width.

Rsense informs the controller of the resistivity (Ohms per square) of the actuator heater. This allows the controller to adjust the pulse widths to maintain a constant energy irrespective of the heater resistivity.

Wsense informs the controller of the width of the critical part of the heater, which may vary up to ±5% due to lithographic and etching variations. This allows the controller to adjust the pulse width appropriately.

9.1.4 Preheat Cycle

The printing process has a strong tendency to stay at the equilibrium temperature. To ensure that the first section of a printed image, such as a photograph, has a consistent dot size, the equilibrium temperature must be met before printing any dots. This is accomplished via a preheat cycle.

The Preheat cycle involves a single Load Cycle to all nozzles of a segment with 1 s (i.e. setting all nozzles to fire), and a number of short firing pulses to each nozzle. The duration of the pulse must be insufficient to fire the drops, but enough to heat up the ink. Altogether about 200 pulses for each nozzle are required, cycling through in the same sequence as a standard Print Cycle.

Feedback during the Preheat mode is provided by Tsense, and continues until equilibrium temperature is reached (about 30° C. above ambient). The duration of the Preheat mode is around 50 milliseconds, and depends on the ink composition.

Preheat is performed before each print job. This does not affect performance as it is done while the data is being transferred to the printer.

9.1.5 Cleaning Cycle

In order to reduce the chances of nozzles becoming clogged, a cleaning cycle can be undertaken before each print job. Each nozzle is fired a number of times into an absorbent sponge.

The cleaning cycle involves a single Load Cycle to all nozzles of a segment with 1 s (i.e. setting all nozzles to fire), and a number of firing pulses to each nozzle. The nozzles are cleaned via the same nozzle firing sequence as a standard Print Cycle. The number of times that each nozzle is fired depends upon the ink composition and the time that the printer has been idle. As with preheat, the cleaning cycle has no effect on printer performance.

9.1.6 Printhead Interface Summary

Each segment has the following connections to the bond pads:

TABLE 31

Segment Interface Connections

| Name | Lines | Description |
|---|---|---|
| Chromapod Select | 3 | Select which chromapod will fire (0-4) |
| NozzleSelect | 4 | Select which nozzle from the pod will fire (0-9) |
| PodgroupEnable | 2 | Enable the podgroups to fire (choice of: 01, 10, 11) |
| AEnable | 1 | Firing pulse for podgroup A |
| BEnable | 1 | Firing pulse for podgroup B |
| ColorNData | C | Input to shift registers (1 bit for each of C colors in the segment) |
| SRClock | 1 | A pulse on SRClock (ShiftRegisterClock) loads C bits from ColorData into the C shift registers. |
| PTransfer | 1 | Parallel transfer of data from the shift registers to the internal NozzleEnable bits (one per nozzle). |
| SenseSegSelect | 1 | A pulse on SenseSegSelect ANDed with data on Color1Data selects the sense lines for this segment. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | 21 | Actuator Ground |
| V+ | 21 | Actuator Power |
| TOTAL | 62 + C | (if C is 4, Total = 66) |

9.2 Making Memjet Printheads out of Segments

A Memjet printhead is composed of a number of identical ½ inch printhead segments. These ½ inch segments are manufactured together or placed together after manufacture to produce a printhead of the desired length. Each ½ inch segments prints 800 1600 dpi bi-level dots in up to 4 colors over a different part of the page to produce the final image. Although each segment produces 800 dots of the final image, each dot is represented by a combination of colored inks.

A 4-inch printhead, for example, consists of 8 segments, typically manufactured as a monolithic printhead. In a typical 4-color printing application (cyan, magenta, yellow, black), each of the segments prints bi-level cyan, magenta, yellow and black dots over a different part of the page to produce the final image.

An 8-inch printhead can be constructed from two 4-inch printheads or from a single 8-inch printhead consisting of 16 segments. Regardless of the construction mechanism, the effective printhead is still 8 inches in length.

A 2-inch printhead has a similar arrangement, but only uses 4 segments. Likewise, a full-bleed A4/Letter printer uses 17 segments for an effective 8.5 inch printing area.

Since the total number of nozzles in a segment is 800 C (see Table 29), the total number of nozzles in a given printhead with S segments is 800 CS. Thus segment N is responsible for printing dots 800 N to 800 N+799.

A number of considerations must be made when wiring up a printhead. As the width of the printhead increases, the number of segments increases, and the number of connections also increases. Each segment has its own ColorData connections (C of them), as well as SRClock and other connections for loading and printing.

9.2.1 Loading Considerations

When the number of segments S is small it is reasonable to load all the segments simultaneously by using a common SRClock line and placing C bits of data on each of the ColorData inputs for the segments. In a 4-inch printer, S=8, and therefore the total number of bits to transfer to the printhead in a single SRClock pulse is 32. However for an 8-inch printer, S=16, and it is unlikely to be reasonable to have 64 data lines running from the print data generator to the printhead.

Instead, it is convenient to group a number of segments together for loading purposes. Each group of segments is small enough to be loaded simultaneously, and share an SRClock. For example, an 8-inch printhead can have 2 segment groups, each segment group containing 8 segments. 32 ColorData lines can be shared for both groups, with 2 SRClock lines, one per segment group.

When the number of segment groups is not easily divisible, it is still convenient to group the segments. One example is a 8.5 inch printer for producing A4/Letter pages. There are 17 segments, and these can be grouped as two groups of 9 (9 C bits of data going to each segment, with all 9 C bits used in the first group, and only 8 C bits used for the second group), or as 3 groups of 6 (again, C bits are unused in the last group).

As the number of segment groups increases, the time taken to load the printhead increases. When there is only one group, 800 load pulses are required (each pulse transfers C data bits). When there are G groups, 800 G load pulses are required. The bandwidth of the connection between the data generator and the printhead must be able to cope and be within the allowable timing parameters for the particular application.

If G is the number of segment groups, and L is the largest number of segments in a group, the printhead requires LC ColorData lines and G SRClock lines. Regardless of G, only a single PTransfer line is required—it can be shared across all segments.

Since L segments in each segment group are loaded with a single SRClock pulse, any printing process must produce the data in the correct sequence for the printhead. As an example, when G=2 and L=4, the first SRClock1 pulse will transfer the ColorData bits for the next Print Cycle's dot 0, 800, 1600, and 2400. The first SRClock2 pulse will transfer the ColorData bits for the next Print Cycle's dot 3200, 4000, 4800, and 5600. The second SRClock1 pulse will transfer the ColorData bits for the next Print Cycle's dot 1, 801, 1601, and 2401. The second SRClock2 pulse will transfer the ColorData bits for the next Print Cycle's dot 3201, 4001, 4801 and 5601.

After 800 G SRClock pulses (800 to each of SRClock1 and SRClock2), the entire line has been loaded into the printhead, and the common PTransfer pulse can be given.

It is important to note that the odd and even color outputs, although printed during the same Print Cycle, do not appear on the same physical output line. The physical separation of odd and even nozzles within the printhead, as well as separation between nozzles of different colors ensures that they will produce dots on different lines of the page. This relative difference must be accounted for when loading the data into the printhead. The actual difference in lines depends on the characteristics of the inkjet mechanism used in the printhead. The differences can be defined by variables $D_1$ and $D_2$ where $D_1$ is the distance between nozzles of different colors, and $D_2$ is the distance between nozzles of the same color. Considering only a single segment group, Table 32 shows the dots transferred to segment n of a printhead during the first 4 pulses of the shared SRClock.

TABLE 32

Order of Dots Transferred to a Segment in a Printhead

| Pulse | Dot | Color1 Line | Color2 Line | ColorC Line |
|---|---|---|---|---|
| 1 | 800S[a] | N | $N + D_1$[b] | $N + (C - 1)D_1$ |
| 2 | 800S + 1 | $N + D_2$[c] | $N + D_1 + D_2$ | $N + (C - 1)D_1 + D_2$ |
| 3 | 800S + 2 | N | $N + D_1$ | $N + (C - 1)D_1$ |
| 4 | 800S + 3 | $N + D_2$ | $N + D_1 + D_2$ | $N + (C - 1)D_1 + D_2$ |

[a] S = segment number
[b] $D_1$ = number of lines between the nozzles of one color and the next (likely = 4-8)
[c] $D_2$ = number of lines between two rows of nozzles of the same color (likely = 1)

And so on for all 800 SRClock pulses to the particular segment group.

9.2.2 Printing Considerations

With regards to printing, we print 4 C nozzles from each segment in the low-speed printing mode, and 8 C nozzles from each segment in the high speed printing mode.

While it is certainly possible to wire up segments in any way, we only consider the situation where all segments fire simultaneously. This is because the low-speed printing mode allows low-power printing for small printheads (e.g. 2-inch and 4-inch), and the controller chip design assumes there is sufficient power available for the large print sizes (such as 8-18 inches). It is a simple matter to alter the connections in the printhead 143 to allow grouping of firing should a particular application require it.

When all segments are fired at the same time 4 CS nozzles are fired in the low-speed printing mode and 8 CS nozzles are fired in the high-speed printing mode. Since all segments print simultaneously, the printing logic is the same as defined in Section 9.1.2.2.

The timing for the two printing modes is therefore:
- 200 μs to print a line at low speed (comprised of 100 2 μs cycles)
- 100 μs to print a line at high speed (comprised of 50 2 μs cycles)

9.2.3 Feedback Considerations

A segment produces several lines of feedback, as defined in Section 9.1.3. The feedback lines are used to adjust the timing of the firing pulses. Since multiple segments are collected together into a printhead, it is effective to share the feedback lines as a tri-state bus, with only one of the segments placing the feedback information on the feedback lines at a time.

Since the selection of which segment will place the feedback information on the shared Tsense, Vsense, Rsense, and Wsense lines uses the Color1Data line, the groupings of segments for loading data can be used for selecting the segment for feedback.

Just as there are G SRClock lines (a single line is shared between segments of the same segment group), there are G SenseSegSelect lines shared in the same way. When the correct SenseSegSelect line is pulsed, the segment of that group whose Color1Data bit is set will start to place data on the shared feedback lines. The segment previously active in terms of feedback must also be disabled by having a 0 on its Color1Data bit, and this segment may be in a different segment group. Therefore when there is more than one segment group. changing the feedback segment requires two steps: disabling the old segment, and enabling the new segment.

9.2.4 Printhead Connection Summary

This section assumes that the printhead 143 has been constructed from a number of segments as described in the previous sections. It assumes that for data loading purposes, the segments have been grouped into G segment groups, with L segments in the largest segment group. It assumes there are C colors in the printhead. It assumes that the firing mechanism for the printhead 143 is that all segments fire simultaneously, and only one segment at a time places feedback information on a common tri-state bus. Assuming all these things, Table 33 lists the external connections that are available from a printhead:

TABLE 33

Printhead Connections

| Name | #Pins | Description |
|---|---|---|
| ChromapodSelect | 3 | Select which chromapod will fire (0-4) |
| NozzleSelect | 4 | Select which nozzle from the pod will fire (0-9) |
| PodgroupEnable | 2 | Enable the podgroups to fire (choice of: 01, 10, 11) |
| AEnable | 1 | Firing pulse for phasegroup A |
| BEnable | 1 | Firing pulse for phasegroup B |
| ColorData | CL | Inputs to C shift registers of segments 0 to L − 1 |
| SRClock | G | A pulse on SRClock[N] (ShiftRegisterClock N) loads the current values from ColorData lines into the L segments in segment group N. |
| PTransfer | 1 | Parallel transfer of data from the shift registers to the internal NozzleEnable bits (one per nozzle). |
| SenseSegSelect | G | A pulse on SenseSegSelect N ANDed with data on Color1Data[n] selects the sense lines for segment n in segment group N. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | Bus bars | Actuator Ground |
| V+ | | Actuator Power |
| TOTAL | 18 + 2G + CL | |

10 Memjet Printhead Interface

The printhead interface (PHI) 192 is the means by which the processor 181 loads the Memjet printhead 143 with the dots to be printed, and controls the actual dot printing process. The PHI 192 contains:

- a LineSyncGen unit (LSGU), which provides synchronization signals for multiple chips (allows side-by-side printing and front/back printing) as well as stepper motors.
- a Memjet interface (MJI), which transfers data to the Memjet printhead, and controls the nozzle firing sequences during a print.
- a line loader/format unit (LLFU) which loads the dots for a given print line into local buffer storage and formats them into the order required for the Memjet printhead.

The units within the PHI 192 are controlled by a number of registers that are programmed by the processor 181. In addition, the processor 181 is responsible for setting up the appropriate parameters in the DMA controller 200 for the transfers from memory to the LLFU. This includes loading white (all 0's) into appropriate colors during the start and end of a page so that the page has clean edges.

The PHI 192 is capable of dealing with a variety of printhead lengths and formats. In terms of broad operating customizations, the PHI 192 is parameterized as follows:

TABLE 34

Basic Printing Parameters

| Name | Description | Range |
|---|---|---|
| MaxColors | No of Colors in printhead | 1-4 |
| SegmentsPerXfer | No of segments written to per transfer. Is equal to the number of segments in the largest segment group | 1-9 |
| SegmentGroups | No of segment groups in printhead | 1-4 |

The internal structure of the PHI allows for a maximum of 4 colors, 9 segments per transfer, and 4 transfers. Transferring 4 colors to 9 segments is 36 bits per transfer, and 4 transfers to 9 segments equates to a maximum printed line length of 18 inches. The total number of dots per line printed by an 18-inch 4 color printhead is 115,200 (18×1600×4).

Other example settings are shown in Table 35:

TABLE 35

Example Settings for Basic Printing Parameters

| Printer Length | Printer Type | MaxColors | SegmentsPerXfer | SegmentGroups | Bits | Comments |
|---|---|---|---|---|---|---|
| 4-inch CMY | Photo | 3 | 8 | 1 | 24 | |
| 8-inch CMYK | A4/Letter | 4 | 8 | 2 | 32 | |
| 8.5 inch CMYK | A4/Letter full bleed | 4 | 9 | 2 | 36 | Last xfer not fully used |
| 12 inch CMYK | A4 long/A3 short | 4 | 8 | 3 | 32 | |
| 16 inch CMYK | | 4 | 8 | 4 | 32 | |
| 17 inch CMYK | A3 long full bleed | 4 | 9 | 4 | 36 | Last xfer not fully used |
| 18 inch CMYK | | 4 | 9 | 4 | 36 | |

10.1 Block Diagram of Printhead Interface

Figure 39:
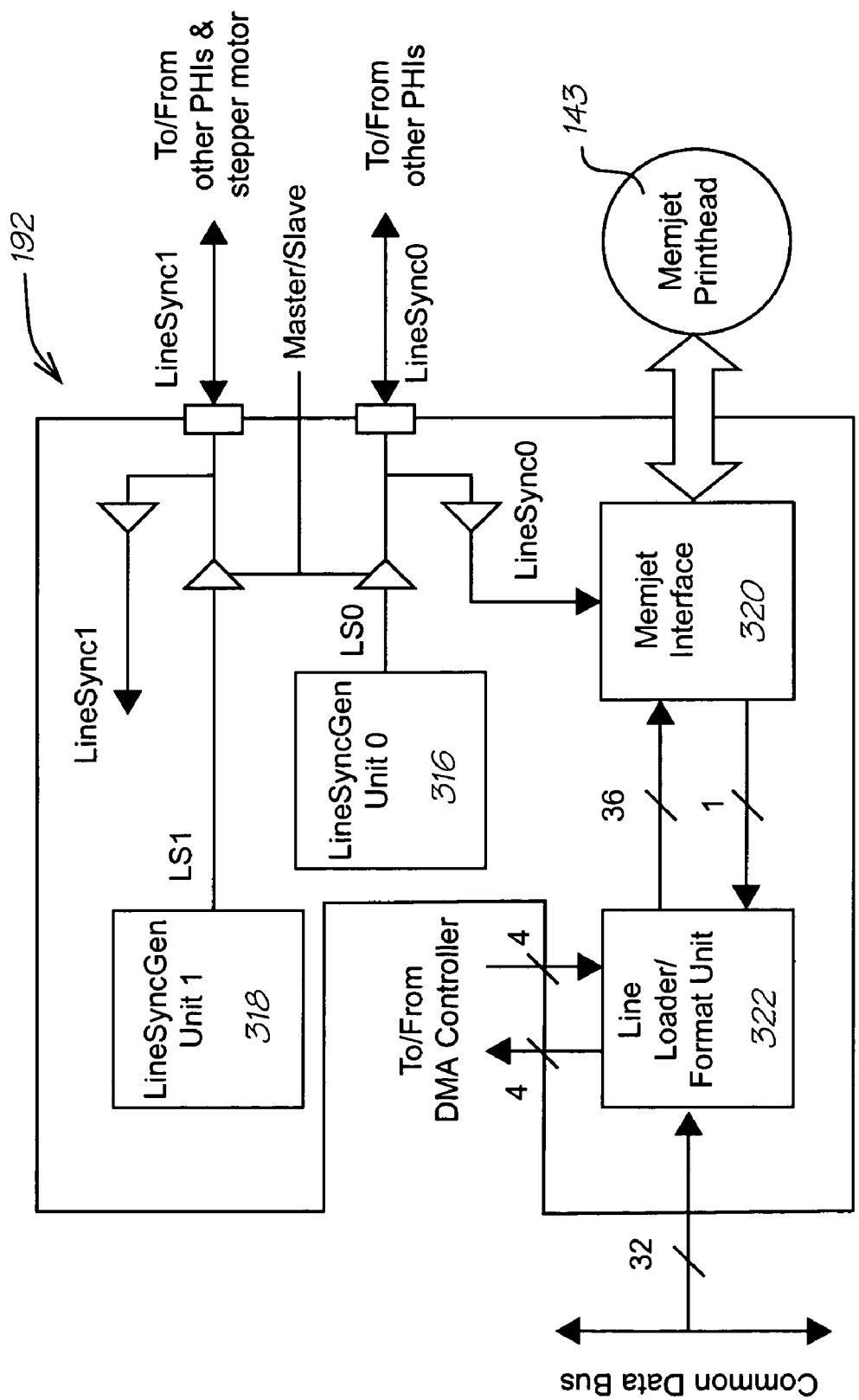
FIG. 39 shows a block diagram of a printhead interface.

The internal structure of the Printhead Interface 192 is shown in FIG. 39.

In the PHI 192 there are two LSGUs 316, 318. The first LSGU 316 produces LineSync0, which is used to control the Memjet Interface 320 in all synchronized chips. The second LSGU 318 produces LineSync1 which is used to pulse the paper drive stepper motor.

The Master/Slave pin on the chip allows multiple chips to be connected together for side-by-side printing, front/back printing etc. via a Master/Slave relationship. When the Master/Slave pin is attached to VDD, the chip is considered to be the Master, and LineSync pulses generated by the two LineSyncGen units 316, 318 are enabled onto the two tri-state LineSync common lines (LineSync0 and LineSync1, shared by all the chips). When the Master/Slave pin is attached to GND, the chip is considered to be the Slave, and LineSync pulses generated by the two LineSyncGen units 316, 318 are not enabled onto the common LineSync lines. In this way, the Master chip's LineSync pulses are used by all PHIs 192 on all the connected chips.

The following sections detail the LineSyncGen Unit 316, 318, the Line Loader/Format Unit 322 and Memjet Interface 320 respectively.

10.2 LineSyncGen Unit

The LineSyncGen units (LSGU) 316, 318 are responsible for generating the synchronization pulses required for printing a page. Each LSGU 316, 318 produces an external LineSync signal to enable line synchronization. The generator inside the LGSU 316, 318 generates a LineSync pulse when told to 'go', and then every so many cycles until told to stop. The LineSync pulse defines the start of the next line.

The exact number of cycles between LineSync pulses is determined by the CyclesBetweenPulses register, one per generator. It must be at least long enough to allow one line to print (100 μs or 200 ms depending on whether the speed is low or high) and another line to load, but can be longer as desired (for example, to accommodate special requirements of paper transport circuitry). If the CyclesBetweenPulses register is set to a number less than a line print time, the page will not print properly since each LineSync pulse will arrive before the particular line has finished printing.

The following interface registers are contained in each LSGU 316, 318:

TABLE 36

LineSyncGen Unit Registers

| Register Name | Description |
| --- | --- |
| CyclesBetweenPulses | The number of cycles to wait between generating one LineSync pulse and the next. |
| Go | Controls whether the LSGU is currently generating LineSync pulses or not.<br>A write of 1 to this register generates a LineSync pulse, transfers CyclesBetweenPulses to CyclesRemaining, and starts the countdown. When CyclesRemaining hits 0, another LineSync pulse is generated, CyclesBetweenPulses is transferred to CyclesRemaining and the countdown is started again.<br>A write of 0 to this register stops the countdown and no more LineSync pulses are generated. |
| CyclesRemaining | A status register containing the number of cycles remaining until the next LineSync pulse is generated. |

The LineSync pulse is not used directly from the LGSU 316, 318. The LineSync pulse is enabled onto a tri-state LineSync line only if the Master/Slave pin is set to Master. Consequently the LineSync pulse is only used in the form as generated by the Master chip (pulses generated by Slave chips are ignored).

10.3 Memjet Interface

The Memjet interface (MJI) 320 transfers data to the Memjet printhead 143, and controls the nozzle firing sequences during a print.

Figure 40:
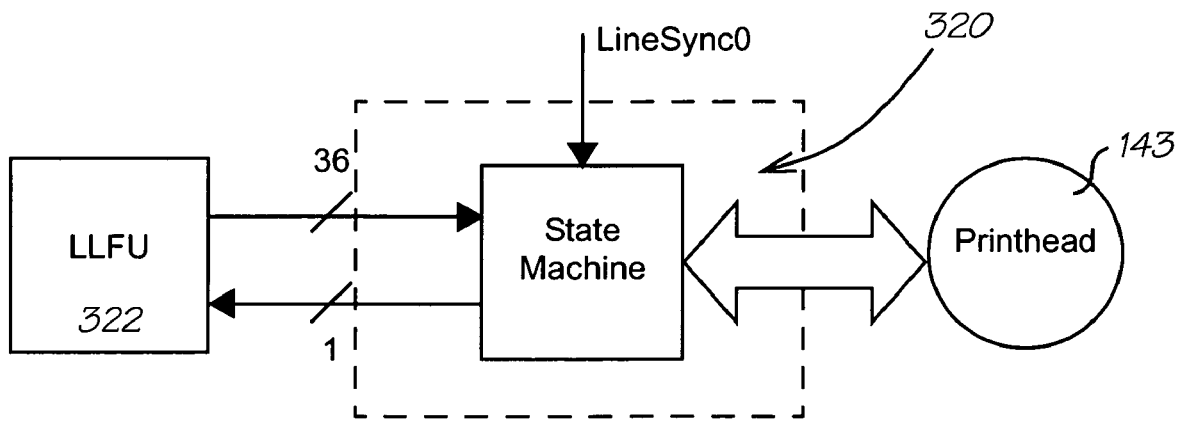
FIG. 40 shows a block diagram of a Memjet interface.

The MJI 320 is simply a State Machine (see FIG. 40) which follows the printhead loading and firing order described in Section 9.2.1, Section 9.2.2, and includes the functionality of the Preheat Cycle and Cleaning Cycle as described in Section 9.1.4 and Section 9.1.5. Both high-speed and low-speed printing modes are available, although the MJI 320 always fires a given nozzle from all segments in a printhead simultaneously (there is no separate firing of nozzles from one segment and then others). Dot counts for each color are also kept by the MJI 320.

The MJI loads data into the printhead from a choice of 2 data sources:

All 1s. This means that all nozzles will fire during a subsequent Print cycle, and is the standard mechanism for loading the printhead for a preheat or cleaning cycle.

From the 36-bit input held in the Transfer register of the LLFU 322. This is the standard means of printing an image. The 36-bit value from the LLFU 322 is directly sent to the printhead and a 1-bit 'Advance' control pulse is sent to the LLFU 322.

The MJI 320 knows how many lines it has to print for the page. When the MJI 320 is told to 'go', it waits for a LineSync pulse before it starts the first line. Once it has finished loading/printing a line, it waits until the next LineSync pulse before starting the next line. The MJI 320 stops once the specified number of lines has been loaded/printed, and ignores any further LineSync pulses.

The MJI 320 is therefore directly connected to the LLFU 322, LineSync0 (shared between all synchronized chips), and the external Memjet printhead 143.

The MJI 320 accepts 36 bits of data from the LLFU 322. Of these 36 bits, only the bits corresponding to the number of segments and number of colors will be valid. For example, if there are only 2 colors and 9 segments, bits 0-1 will be valid for segment 0, bits 2-3 will be invalid, bits 4-5 will be valid for segment 1, bits 6-7 will be invalid etc. The state machine does not care which bits are valid and which bits are not valid—it merely passes the bits out to the printhead 143. The data lines and control signals coming out of the MJI 320 can be wired appropriately to the pinouts of the chip, using as few pins as required by the application range of the chip (see Section 10.3.1 for more information).

10.3.1 Connections to Printhead

The MJI 320 has a number of connections to the printhead 143, including a maximum of 4 colors, clocked in to a maximum of 9 segments per transfer to a maximum of 4 segment groups. The lines coming from the MJI 320 can be directly connected to pins on the chip, although not all lines will always be pins. For example, if the chip is specifically designed for only connecting to 8 inch CMYK printers, only 32 bits of data need to be transferred each transfer pulse. Consequently 32 pins of data out (8 pins per color), and not 36 pins are required. In the same way, only 2 SRClock pulses are required, so only 2 pins instead of 4 pins are required to cater for the different SRClocks. And so on.

If the chip must be completely generic, then all connections from the MJI 320 must be connected to pins on the chip (and thence to the Memjet printhead 143).

Table 37 lists the maximum connections from the MJI 320, many of which are always connected to pins on the chip. Where the number of pins is variable, a footnote explains what the number of pins depends upon. The sense of input and output is with respect to the MJI 320. The names correspond to the pin connections on the printhead 143.

TABLE 37

Memjet Interface Connections

| Name | #Pins | I/O | Description |
|---|---|---|---|
| Chromapod Select | 3 | O | Select which chromapod will fire (0-4) |
| NozzleSelect | 4 | O | Select which nozzle from the pod will fire (0-9) |
| PodgroupEnable | 2 | O | Enable the podgroups to fire (choice of: 01, 10, 11) |
| AEnable | 1 | O | Firing pulse for podgroup A. In the current design all segments fire simultaneously, although multiple AEnable lines could be added for dividing the firing sequence over multiple segment groups for reasons of power and speed. |
| BEnable | 1 | O | Firing pulse for podgroup B. In the current design all segments fire simultaneously, although multiple BEnable lines could be added for dividing the firing sequence over multiple segment groups for reasons of power and speed. |
| Color1Data[0-8] | 9[a] | O | Output to Color1Data shift register of segments 0-8 |
| Color2Data[0-8] | 9[b] | O | Output to Color2Data shift register of segments 0-8 |
| Color3Data[0-8] | 9[c] | O | Output to Color3Data shift register of segments 0-8 |
| Color4Data[0-8] | 9[d] | O | Output to Color4Data shift register of segments 0-8 |
| SRClock[1-4] | 4[e] | O | A pulse on SRClock[N] (ShiftRegisterClock) loads the current values from Color1Data[0-8], Color2Data[0-8], Color3Data[0-8] and Color4Data[0-8] into the segment group N on the printhead. |
| PTransfer | 1 | O | Parallel transfer of data from the shift registers to the printhead's internal NozzleEnable bits (one per nozzle). |
| SenseSegSelect[1-4] | 4[f] | O | A pulse on SenseSegSelect[N] ANDed with data on Color1Data[n] enables the sense lines for segment n in segment group N of the printhead. |
| Tsense | 1 | I | Temperature sense |
| Vsense | 1 | I | Voltage sense |
| Rsense | 1 | I | Resistivity sense |
| Wsense | 1 | I | Width sense |
| TOTAL | 52 | | |

[a]Although 9 lines are available from the MJI, the number of pins coming from the chip will only reflect the actual number of segments in a segment group. The pins for Color1Data are mandatory, since each printhead must print in at least 1 color.
[b]These lines are only translated into pins if the chip is to control a printhead with at least 2 colors. Although 9 lines are available from the MJI, the number of pins coming from the chip for Color2Data will only reflect the actual number of segments in a segment group.
[c]These lines are only translated into pins if the chip is to control a printhead with at least 3 colors. Although 9 lines are available from the MJI, the number of pins coming from the chip for Color3Data will only reflect the actual number of segments in a segment group.
[d]These lines are only translated into pins if the chip is to control a printhead with 4 colors. Although 9 lines are available from the MJI, the number of pins coming from the chip for Color4Data will only reflect the actual number of segments in a segment group.
[e]Although 4 lines are available from the MJI, the number of pins coming from the chip will only reflect the actual number of segment groups. A minimum of 1 pin is required since there is at least 1 segment group (the entire printhead).
[f]Although 4 lines are available from the MJI, the number of pins coming from the chip will only reflect the actual number of segment groups. A minimum of 1 pin is required since there is at least 1 segment group (the entire printhead).

10.3.2 Firing Pulse Duration

The duration of firing pulses on the AEnable and BEnable lines depend on the viscosity of the ink (which is dependant on temperature and ink characteristics) and the amount of power available to the printhead 143. The typical pulse duration range is 1.3 to 1.8 μs. The MJI 320 therefore contains a programmable pulse duration table 324 (FIG. 41), indexed by feedback from the printhead 143. The table 324 of pulse durations allows the use of a lower cost power supply, and aids in maintaining more accurate drop ejection.

Figure 41:
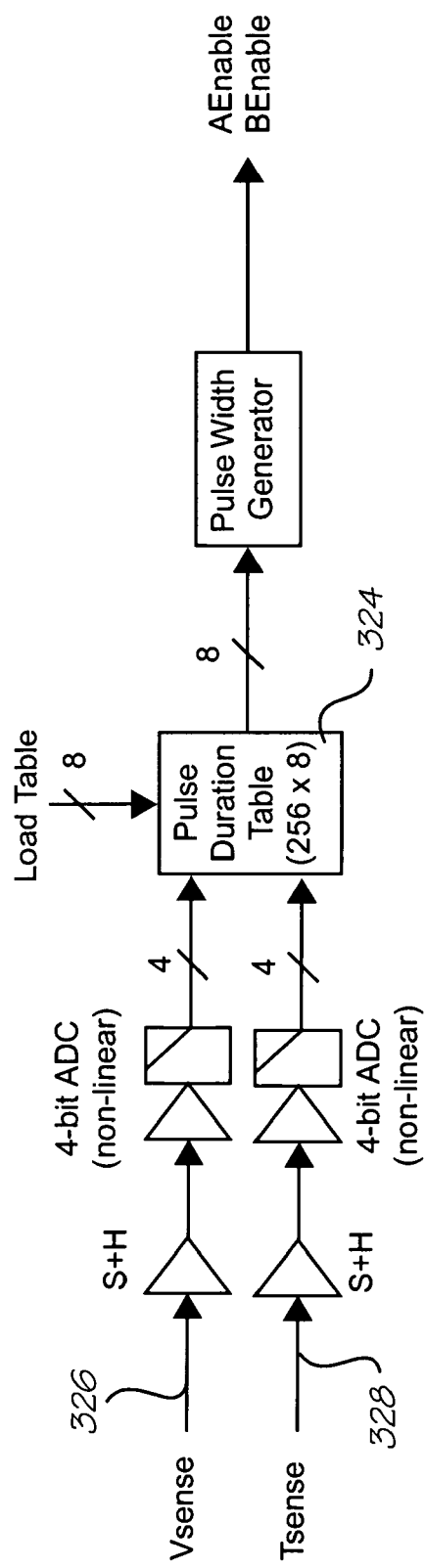
FIG. 41 shows a flow diagram of the generation of AEnable and BEnable pulse widths.

The Pulse Duration table 324 has 256 entries, and is indexed by the current Vsense and Tsense settings on lines 326 and 328, respectively. The upper 4-bits of address come from Vsense, and the lower 4-bits of address come from Tsense. Each entry is 8 bits, and represents a fixed point value in the range of 0-4 ms. The process of generating the AEnable and BEnable lines is shown in FIG. 41.

The 256-byte table 324 is written by the processor 181 before printing the first page. The table 324 may be updated in between pages if desired. Each 8-bit pulse duration entry in the table 324 combines:

User brightness settings (from the page description)
Viscosity curve of ink (from the QA Chip)
Rsense
Wsense
Vsense
Tsense

10.3.3 Dot Counts

The MJI 320 maintains a count of the number of dots of each color fired from the printhead 143. The dot count for each color is a 32-bit value, individually cleared under processor control. At 32-bits length, each dot count can hold a maximum coverage dot count of 17 8-inch×12-inch pages, although in typical usage, the dot count will be read and cleared after each page or half-page.

The dot counts are used by the processor 181 to update the QA chip 312 (see Section 7.5.4) in order to predict when the ink cartridge 32 runs out of ink. The processor 181 knows the volume of ink in the cartridge 32 for each of the colors from the QA chip 312. Counting the number of drops eliminates the need for ink sensors, and prevents the ink channels from running dry. An updated drop count is written to the QA chip 312 after each page. A new page will not be printed unless there is enough ink left, and allows the user to change the ink without getting a dud half-printed page which must be reprinted.

Figure 42:
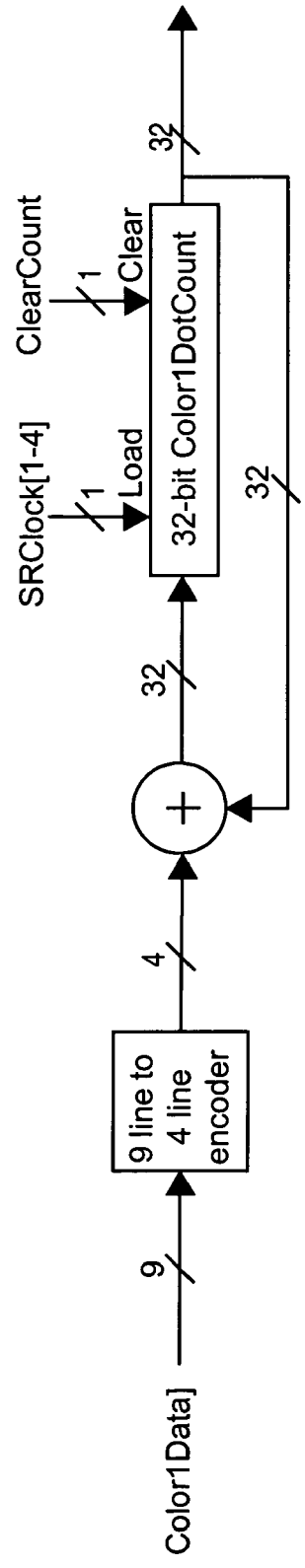
FIG. 42 shows a block diagram of dot count logic.

The layout of the dot counter for Color1 is shown in FIG. 42. The remaining 3 dot counters (Color1DotCount, Color2DotCount, and Color3DotCount) are identical in structure.

10.3.4 Registers

The processor 181 communicates with the MJI 320 via a register set. The registers allow the processor 181 to parameterize a print as well as receive feedback about print progress.

The following registers are contained in the MJI 320:

TABLE 38

Memjet Interface Registers

| Register Name | Description |
|---|---|
| *Print Parameters* | |
| SegmentsPerXfer | The number of segments to write to each transfer. This also equals the number of cycles to wait between each transfer (before generating the next Advance pulse). Each transfer has MaxColors × SegmentsPerXfer valid bits. |
| SegmentGroups | The number of segment groups in the printhead. This equals the number of times that SegmentsPerXfer cycles must elapse before a single dot has been written to each segment of the printhead. The MJI does this 800 times to completely transfer all the data for the line to the printhead. |
| PrintSpeed | Whether to print at low or high speed (determines the value on the PodgroupEnable lines during the print). |
| NumLines | The number of Load/Print cycles to perform. |
| *Monitoring the Print (read only from point of view of processor)* | |
| Status | The Memjet Interface's Status Register |
| LinesRemaining | The number of lines remaining to be printed. Only valid while Go=1. Starting value is NumLines and counts down to 0. |
| TransfersRemaining | The number of sets of SegmentGroups transfers remaining before the Printhead is considered loaded for the current line. Starts at 800 and counts down to 0. Only valid while Go=1. |
| SegGroupsRemaining | The number of segment groups remaining in the current set of transfers of 1 dot to each segment. Starts at SegmentGroups and counts down to 0. Only valid while Go=1. |
| SenseSegment | The 9-bit value to place on the Color1Data lines during a subsequent feedback SenseSegSelect pulse. Only 1 of the 9 bits should be set, corresponding to one of the (maximum) 9 segments. See SenseSelect for how to determine which of the segment groups to sense. |
| SetAllNozzles | If non-zero, the 36-bit value written to the printhead during the LoadDots process is all 1s, so that all nozzles will be fired during the subsequent PrintDots process. This is used during the preheat and cleaning cycles. If 0, the 36-bit value written to the printhead comes from the LLFU. This is the case during the actual printing of regular images. |
| *Actions* | |
| Reset | A write to this register resets the MJI, stops any loading or printing processes, and loads all registers with 0. |
| SenseSelect | A write to this register with any value clears the FeedbackValid bit of the Status register, and the remaining action depends on the values in the LoadingDots and PrintingDots status bits.<br>If either of the status bits are set, the Feedback bit is cleared and nothing more is done.<br>If both status bits are clear, a pulse is given simultaneously on all 4 SenseSegSelect lines with all ColorData bits 0. This stops any existing feedback. Depending on the two low-order bits written to SenseSelect register, a pulse is given on SenseSegSelect1, SenseSegSelect2, SenseSegSelect3, or SenseSegSelect4 line, with the Color1Data bits set |

TABLE 38-continued

Memjet Interface Registers

| Register Name | Description |
|---|---|
| | according to the SenseSegment register. Once the various sense lines have been tested, the values are placed in the Tsense, Vsense, Rsense, and Wsense registers, and the Feedback bit of the Status register is set. |
| Go | A write of 1 to this bit starts the LoadDots/PrintDots cycles, which commences with a wait for the first LineSync pulse. A total of NumLines lines are printed, each line being loaded/printed after the receipt of a LineSync pulse. The loading of each line consists of SegmentGroups 36-bit transfers. As each line is printed, LinesRemaining decrements, and TransfersRemaining is reloaded with SegmentGroups again. The status register contains print status infomation. Upon completion of NumLines, the loading/printing process stops, the Go bit is cleared, and any further LineSync pulses are ignored. During the final print cycle, nothing is loaded into the printhead.<br>A write of 0 to this bit stops the print process, but does not clear any other registers. |
| ClearCounts | A write to this register clears the Color1DotCount, Color2DotCount, Color3DotCount, and Color4DotCount registers if bits 0, 1, 2, or 3 respectively are set. Consequently a write of 0 has no effect. |
| | Feedback |
| Tsense | Read only feedback of Tsense from the last SenseSegSelect pulse sent to segment SenseSegment. Is only valid if the FeedbackValid bit of the Status register is set. |
| Vsense | Read only feedback of Vsense from the last SenseSegSelect pulse sent to segment SenseSegment. Is only valid if the FeedbackValid bit of the Status register is set. |
| Rsense | Read only feedback of Rsense from the last SenseSegSelect pulse sent to segment SenseSegment. Is only valid if the FeedbackValid bit of the Status register is set. |
| Wsense | Read only feedback of Wsense from the last SenseSegSelect pulse sent to segment SenseSegment. Is only valid if the FeedbackValid bit of the Status register is set. |
| Color1DotCount | Read only 32-bit count of color1 dots sent to the printhead. |
| Color2DotCount | Read only 32-bit count of color2 dots sent to the printhead. |
| Color3DotCount | Read only 32-bit count of color3 dots sent to the printhead |
| Color4DotCount | Read only 32-bit count of color4 dots sent to the printhead |

The MJI's Status Register is a 16-bit register with bit interpretations as follows:

The following pseudocode illustrates the logic required to load a printhead for a single line. Note that loading com-

TABLE 39

MJI Status Register

| Name | Bits | Description |
|---|---|---|
| LoadingDots | 1 | If set, the MJI is currently loading dots, with the number of dots remaining to be transferred in TransfersRemaining.<br>If clear, the MJI is not currently loading dots |
| PrintingDots | 1 | If set, the MJI is currently printing dots.<br>If clear, the MJI is not currently printing dots. |
| PrintingA | 1 | This bit is set while there is a pulse on the AEnable line |
| PrintingB | 1 | This bit is set while there is a pulse on the BEnable line |
| FeedbackValid | 1 | This bit is set while the feedback values Tsense, Vsense, Rsense, and Wsense are valid. |
| Reserved | 3 | — |
| PrintingChromapod | 4 | This holds the current chromapod being fired while the PrintingDots status bit is set. |
| PrintingNozzles | 4 | This holds the current nozzle being fired while the PrintingDots status bit is set. | mences only after the LineSync pulse arrives. This is to ensure the data for the line has been prepared by the LLFU 322 and is valid for the first transfer to the printhead 143.

```
Wait for LineSync
For TransfersRemaining = 800 to 0
    For I = 0 to SegmentGroups
        If (SetAllNozzles)
            Set all ColorData lines to be 1
        Else
            Place 36 bit input on 36 ColorData lines
        EndIf
        Pulse SRClock[I]
        Wait SegmentsPerXfer cycles
        Send ADVANCE signal
    EndFor
EndFor
```

10.3.5 Preheat and Cleaning Cycles

The Cleaning and Preheat cycles are simply accomplished by setting appropriate registers in the MJI 320:

SetAllNozzles=1

Set the PulseDuration register to either a low duration (in the case of the preheat mode) or to an appropriate drop ejection duration for cleaning mode.

Set NumLines to be the number of times the nozzles should be fired

Set the Go bit and then wait for the Go bit to be cleared when the print cycles have completed.

The LSGU 316, 318 must also be programmed to send LineSync pulses at the correct frequency.

10.4 Line Loader/Format Unit

The line loader/format unit (LLFU) 322 loads the dots for a given print line into local buffer storage and formats them into the order required for the Memjet printhead 143. It is responsible for supplying the pre-calculated nozzleEnable bits to the Memjet interface 320 for the eventual printing of the page.

Figure 43:
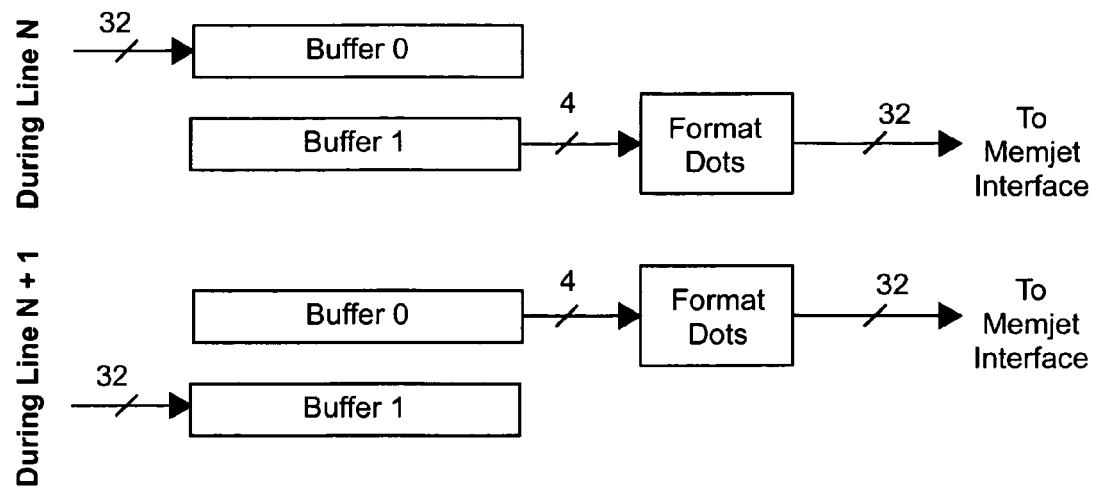
FIG. 43 shows a conceptual overview of double buffering during printing of lines N and N+1.

The printing uses a double buffering scheme for preparing and accessing the dot-bit information. While one line is being loaded into the first buffer, the pre-loaded line in the second buffer is being read in Memjet dot order. Once the entire line has been transferred from the second buffer to the printhead 143 via the Memjet interface 320, the reading and writing processes swap buffers. The first buffer is now read and the second buffer is loaded up with the new line of data. This is repeated throughout the printing process, as can be seen in the conceptual overview of FIG. 43.

Figure 44:
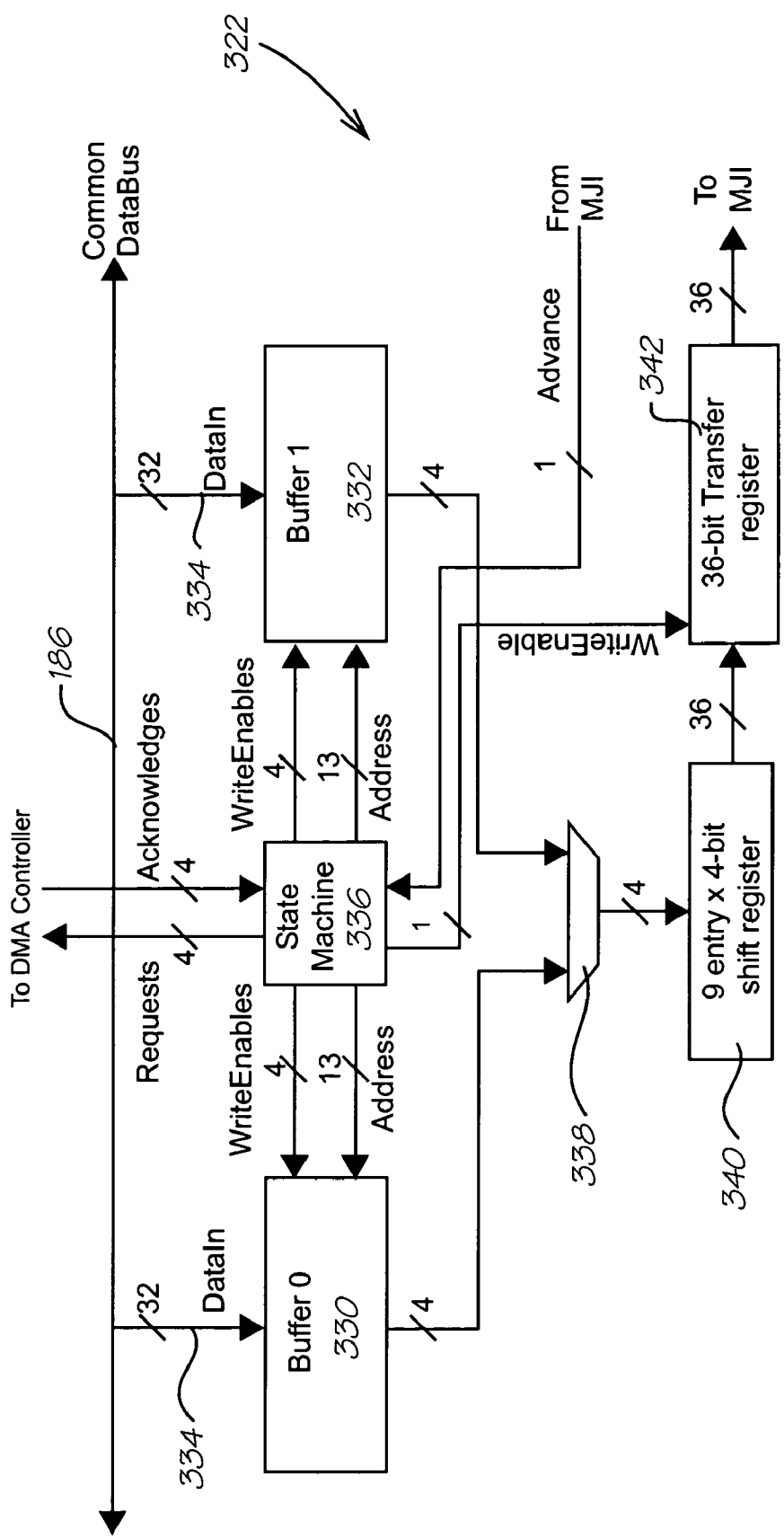
FIG. 44 shows a block diagram of the structure of a line loader/format unit.

The size of each buffer is 14 KBytes to cater for the maximum line length of 18 inches in 4 colors (18×1600×4 bits=115,200 bits=14,400 bytes). The size for both Buffer 0 (330-FIG. 44) and Buffer 1 (332) is 28.128 KBytes. While this design allows for a maximum print length of 18 inches, it is trivial to reduce the buffer size to target a specific application.

Since one buffer 330, 332 is being read from while the other is being written to, two sets of address lines must be used. The 32-bits DataIn 334 from the common data bus 186 are loaded depending on the WriteEnables, which are generated by State Machine 336 in response to the DMA Acknowledges.

A multiplexor 338 chooses between the two 4-bit outputs of Buffer 0 and Buffer 1, and sends the result to a 9-entry by 4-bit shift register 340. After a maximum of 9 read cycles (the number depends on the number of segments written to per transfer), and whenever an Advance pulse comes from the MJI 320, the current 36-bit value from the shift register 340 is gated into a 36-bit Transfer register 342, where it can be used by the MJI 320.

Note that not all the 36 bits are necessarily valid. The number of valid bits of 36 depends on the number of colors in the printhead 143, the number of segments, and the breakup of segment groups (if more than one segment group). For more information, see Section 9.2.

A single line in an L-inch C-color printhead consists of 1600 L C-color dots. At 1 bit per colored dot, a single printline consists of 1600 LC bits. The LLFU 322 is capable of addressing a maximum line size of 18 inches in 4 colors, which equates to 108,800 bits (14 KBytes) per line. These bits must be supplied to the MJI 320 in the correct order for being sent on to the printhead 143. See Section 9.2.1 for more information concerning the Load Cycle dot loading order, but in summary, 2 LC bits are transferred to the printhead 143 in SegmentGroups transfers, with a maximum of 36 bits per transfer. Each transfer to a particular segment of the printhead 143 must load all colors simultaneously.

10.4.1 Buffers

Each of the two buffers 330, 332 is broken into 4 subbuffers, 1 per color. The size of each sub-buffer is 3600 bytes, enough to hold 18-inches of single color dots at 1600 dpi. The memory is accessed 32-bits at a time, so there are 900 addresses for each buffer (requiring 10 bits of address).

Figure 45:
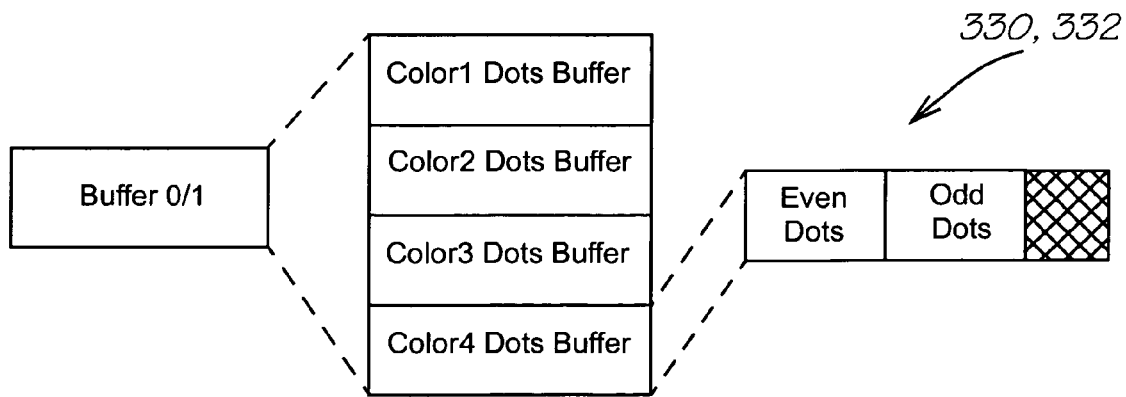
FIG. 45 shows a conceptual structure of a buffer.

All the even dots are placed before the odd dots in each color's buffer, as shown in FIG. 45. If there is any unused space it is placed at the end of each color's buffer.

The amount of memory actually used is directly related to the printhead length. If the printhead is 18 inches, there are 1800 bytes of even dots followed by 1800 bytes of odd dots, with no unused space. If the printhead is 12 inches, there are 1200 bytes of even dots followed by 1200 odd dots, and 1200 bytes unused.

The number of sub-buffers gainfully used is directly related to the number of colors in the printhead. This number is typically 3 or 4, although it is quite feasible for this system to be used in a 1 or 2 color system (with som small memory wastage). In a desktop printing environment, the number of colors would be 4: Color1=Cyan, Color2=Magenta, Color3=Yellow, Color4=Black.

Figure 46:
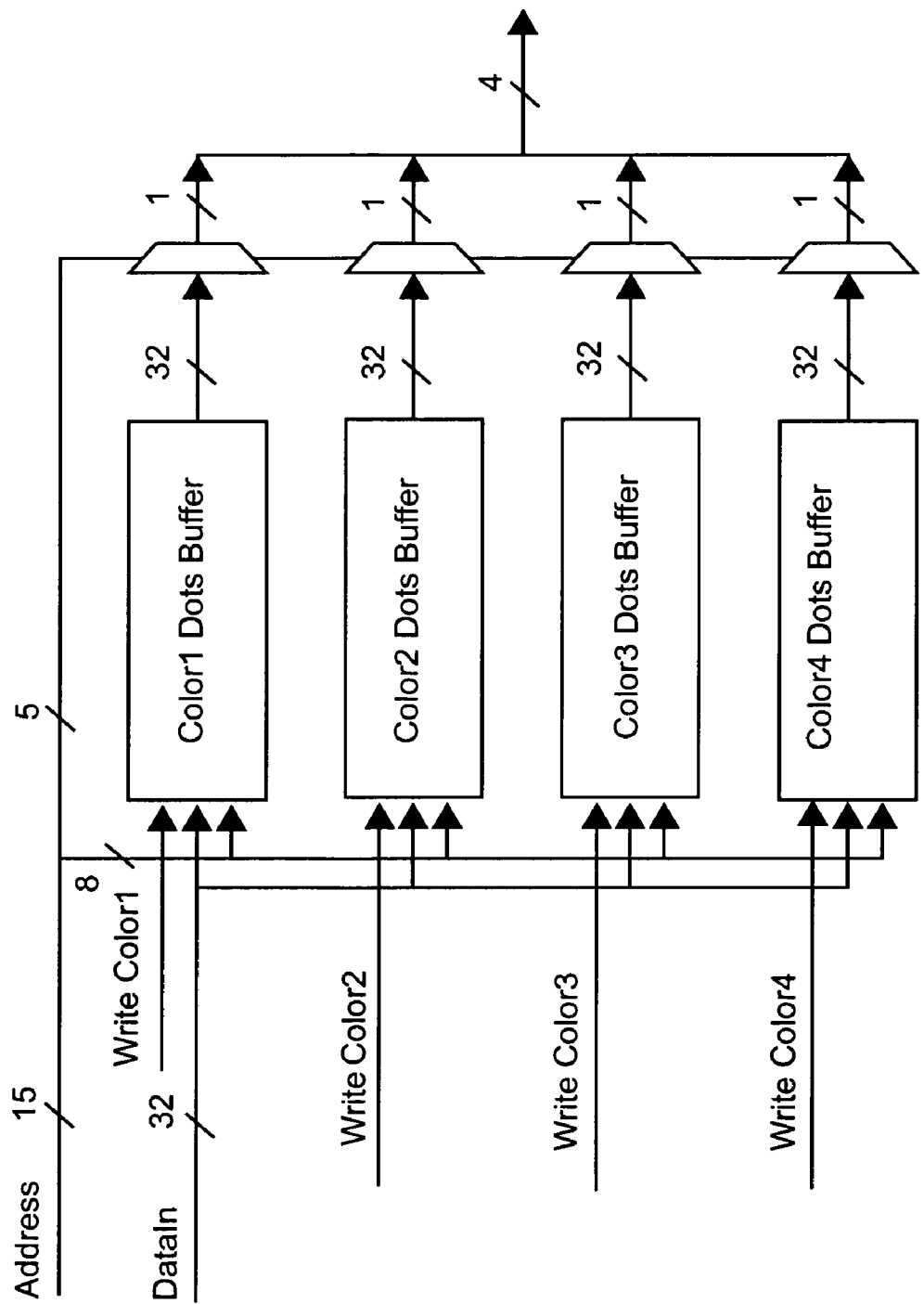
FIG. 46 shows a block diagram of the logical structure of a buffer.

The address decoding circuitry is such that in a given cycle, a single 32-bit access can be made to all 4 sub-buffers—either a read from all 4 or a write to one of the 4. Only one bit of the 32-bits read from each color buffer is selected, for a total of 4 output bits. The process is shown in FIG. 46. 15 bits of address allow the reading of a particular bit by means of 10-bits of address being used to select 32 bits, and 5-bits of address choose 1-bit from those 32. Since all color buffers share this logic, a single 15-bit address gives a total of 4 bits out, one per color. Each buffer has its own WriteEnable line, to allow a single 32-bit value to be written to a particular color buffer in a given cycle. The 32-bits of DataIn are shared, since only one buffer will actually clock the data in.

Note that regardless of the number of colors in the printhead, 4 bits are produced in a given read cycle (one bit from each color's buffer).

10.4.2 Address Generation 10.4.2.1 Reading

Address Generation for reading is straightforward. Each cycle we generate a bit address which is used to fetch 4 bits representing 1-bit per color for a particular segment. By adding 400 to the current bit address, we advance to the next segment's equivalent dot. We add 400 (not 800) since the odd and even dots are separated in the buffer. We do this firstly SegmentGroups sets of SegmentsPerXfer times to retrieve the data representing the even dots (the dot data is transferred to the MJI 36 bits at a time) and another SegmentGroups sets of SegmentsPerXfer times to load the odd dots. This entire process is repeated 400 times, incrementing the start address each time. Thus all dot values are transferred in the order required by the printhead in 400×2×SegmentGroups×SegmentsPerXfer cycles.

In addition, we generate the TransferWriteEnable control signal. Since the LLFU 322 starts before the MJI 320, we must transfer the first value before the Advance pulse from the MJI 320. We must also generate the next value in readiness for the first Advance pulse. The solution is to transfer the first value to the Transfer register after SegmentsPerXfer cycles, and then to stall SegmentsPerXfer-cycles later, waiting for the Advance pulse to start the next SegmentsPerXfer cycle group. Once the first Advance pulse arrives, the LLFU 322 is synchronized to the MJI 320. However, the LineSync pulse to start the next line must arrive at the MJI 320 at least 2SegmentsPerXfer cycles after the LLFU 322 so that the initial Transfer value is valid and the next 32-bit value is ready to be loaded into the Transfer register 342.

The read process is shown in the following pseudocode:

```
DoneFirst = FALSE
For DotInSegment0 = 0 to 400
    CurrAdr = DotInSegment0
    XfersRemaining = 2 × SegmentGroups
    DotCount = SegmentsPerXfer
    Do
        V1 = DotCount = 0
        TransferWriteEnable = (V1 AND NOT DoneFirst) OR ADVANCE
        Stall = V1 AND (NOT TransferWriteEnable)
        If (NOT Stall)
            Shift Register = Fetch 4-bits from
                CurrReadBuffer:CurrAdr
            CurrAdr = CurrAdr + 400
            If (V1)
                DotCount = SegmentsPerXfer − 1
                XfersRemaining = XfersRemaining − 1
            Else
                DotCount = DotCount − 1
            EndIf
        EndIf
    Until (XfersRemaining=0) AND (NOT Stall)
EndFor
```

The final transfer may not be fully utilized. This occurs when the number of segments per transfer does not divide evenly into the actual number of segments in the printhead. An example of this is the 8.5 inch printhead, which has 17 segments. Transferring 9 segments each time means that only 8 of the last 9 segments will be valid. Nonetheless, the timing requires the entire 9th segment value to be generated (even though it is not used). The actual address is therefore a don't care state since the data is not used.

Once the line has finished, the CurrReadBuffer value must be toggled by the processor.

10.4.2.2 Writing

The write process is also straightforward. 4 DMA request lines are output to the DMA controller 200. As requests are satisfied by the return DMA Acknowledge lines, the appropriate 8-bit destination address is selected (the lower 5 bits of the 15-bit output address are don't care values) and the acknowledge signal is passed to the correct buffer's WriteEnable control line (the Current Write Buffer is—CurrentReadBuffer). The 10-bit destination address is selected from the 4 current addresses, one address per color. As DMA requests are satisfied the appropriate destination address is incremented, and the corresponding TransfersRemaining counter is decremented. The DMA request line is only set when the number of transfers remaining for that color is non-zero.

The following pseudocode illustrates the Write process:

```
CurrentAdr[1–4] = 0
While (ColorXfersRemaining[1–4] are non-zero)
    DMARequest[1–4] = ColorXfersRemaining[1–4] NOT = 0
    If DMAAknowledqe[N]
        CurrWriteBuffer:CurrentAdr[N] =
            Fetch 32-bits from data bus
        CurrentAdr[N] = CurrentAdr[N] + 1
        ColorXfersRemaining[N] =
            ColorXfersRemaining[N] − 1 (floor 0)
    EndIf
EndWhile
```

10.4.3 Registers

The following interface registers are contained in the LLFU 322:

TABLE 40

Line Load/Format Unit Registers

| Register Name | Description |
|---|---|
| SegmentsPerXfer | The number of segments whose dots must be loaded before each transfer. This has a maximum value of 9. |
| SegmentGroups | The number of segment groups in the printhead. This has a maximum number of 4. |
| CurrentReadBuffer | The current buffer being read from. When Buffer0 is being read, Buffer1 is written to and vice versa. Should be toggled with each AdvanceLine pulse from the MJI. |
| Go | Bits 0 and 1 control the starting of the read and write processes respectively. A non-zero write to the appropriate bit starts the process. |
| Stop | Bits 0 and 1 control the stopping of the read and write processes respectively. A non-zero write to the appropriate bit stops the process. |
| Stall | This read-only status bit comes from the LLFU's Stall flag. The Stall bit is valid when the write Go bit is set. A Stall value of 1 means that the LLFU is waiting for the ADVANCE |

TABLE 40-continued

Line Load/Format Unit Registers

| Register Name | Description |
|---|---|
|  | pulse from the MJI to continue. The processor can safely start the LSGU for the first line once the Stall bit is set. |
| ColorXfersRemaining[1-4] | The number of 32-bit transfers remaining to be read into the specific Color[N] buffer. |

10.5 Controlling a Print

When controlling a print the processor 181 programs and starts the LLFU 322 in read mode to ensure that the first line of the page is transferred to the buffer. When the interrupts arrive from the DMA controller 200, the processor 181 can switch LLFU buffers 330, 332, and program the MJI 320. The processor 181 then starts the LLFU 322 in read/write mode and starts the MJI 320. The processor 181 should then wait a sufficient period of time to ensure that other connected printer controllers have also started their LLFUs and MJIs (if there are no other connected printer controllers, the processor 181 must wait until the Stall bit of the LLFU 322 is set, a duration of 2 SegmentsPerXfer cycles). The processor 181 can then program the LGSU 316, 318 to start the synchronized print. As interrupts arrive from the DMA controllers 200, the processor 181 can reprogram the DMA channels, swap LLFU buffers 330, 332, and restart the LLFU 322 in read/write mode. Once the LLFU 332 has effectively filled its pipeline, it will stall until the next Advance pulse from the MJI 320. The MJI 320 does not have to be touched during the print.

If for some reason the processor 181 wants to make any changes to the MJI 320 or LLFU 322 registers during an inter-line period it should ensure that the current line has finished printing/loading by polling the status bits of the MJI 320 and the Go bits of the LLFU 322.

11 Generic Printer Driver

This section describes generic aspects of any host-based printer driver for CePrint 10.

11.1 Graphics and Imaging Model

We assume that the printer driver is closely coupled with the host graphics system, so that the printer driver can provide device-specific handling for different graphics and imaging operations, in particular compositing operations and text operations.

We assume that the host provides support for color management, so that device-independent color can be converted to CePrint-specific CMYK color in a standard way, based on a user-selected CePrint-specific ICC (International Color Consortium) color profile. The color profile is normally selected implicitly by the user when the user specifies the output medium in the printer (i.e. plain paper, coated paper, transparency, etc.). The page description sent to the printer 10 always contains device-specific CMYK color.

We assume that the host graphics system renders images and graphics to a nominal resolution specified by the printer driver, but that it allows the printer driver to take control of rendering text. In particular, the graphics system provides sufficient information to the printer driver to allow it to render and position text at a higher resolution than the nominal device resolution.

We assume that the host graphics system requires random access to a contone page buffer at the nominal device resolution, into which it composites graphics and imaging objects, but that it allows the printer driver to take control of the actual compositing—i.e. it expects the printer driver to manage the page buffer.

11.2 Two-Layer Page Buffer

The printer's page description contains a 267 ppi contone layer and an 800 dpi black layer. The black layer is conceptually above the contone layer, i.e. the black layer is composited over the contone layer by the printer. The printer driver therefore maintains a page buffer which correspondingly contains a medium-resolution contone layer and a high-resolution black layer.

The graphics systems renders and composites objects into the page buffer bottom-up—i.e. later objects obscure earlier objects. This works naturally when there is only a single layer, but not when there are two layers which will be composited later. It is therefore necessary to detect when an object being placed on the contone layer obscures something on the black layer.

When obscuration is detected, the obscured black pixels are composited with the contone layer and removed from the black layer. The obscuring object is then laid down on the contone layer, possibly interacting with the black pixels in some way. If the compositing mode of the obscuring object is such that no interaction with the background is possible, then the black pixels can simply be discarded without being composited with the contone layer. In practice, of course, there is little interaction between the contone layer and the black layer.

The printer driver specifies a nominal page resolution of 267 ppi to the graphics system. Where possible the printer driver relies on the graphics system to render image and graphics objects to the pixel level at 267 ppi, with the exception of black text. The printer driver fields all text rendering requests, detects and renders black text at 800 dpi, but returns non-black text rendering requests to the graphics system for rendering at 267 ppi.

Ideally the graphics system and the printer driver manipulate color in device-independent RGB, deferring conversion to device-specific CMYK until the page is complete and ready to be sent to the printer. This reduces page buffer requirements and makes compositing more rational. Compositing in CMYK color space is not ideal.

Ultimately the graphics system asks the printer driver to composite each rendered object into the printer driver's page buffer. Each such object uses 24-bit contone RGB, and has an explicit (or implicitly opaque) opacity channel.

The printer driver maintains the two-layer page buffer in three parts. The first part is the medium-resolution (267 ppi) contone layer. This consists of a 24-bit RGB bitmap. The second part is a medium-resolution black layer. This consists of an 8-bit opacity bitmap. The third part is a high-resolution (800 dpi) black layer. This consists of a 1-bit opacity bitmap. The medium-resolution black layer is a subsampled version of the high-resolution opacity layer. In practice, assuming the low resolution is an integer factor n of the high resolution (e.g.

n=800/267=3), each low-resolution opacity value is obtained by averaging the corresponding n×n high-resolution opacity values. This corresponds to box-filtered subsampling. The subsampling of the black pixels effectively antialiases edges in the high-resolution black layer, thereby reducing ringing artifacts when the contone layer is subsequently JPEG-compressed and decompressed.

Figure 47:
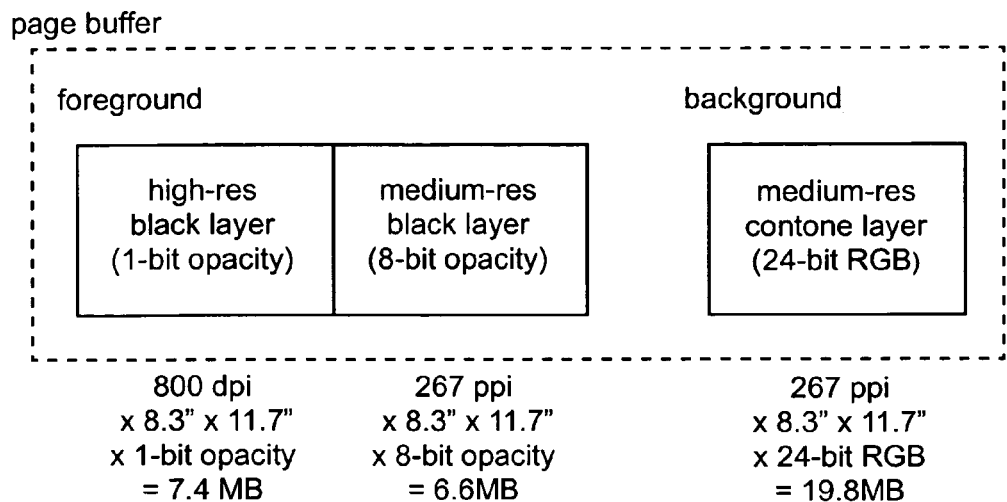
FIG. 47 shows a diagram of the structure and size of a two-layer page buffer.

The structure and size of the page buffer is illustrated in FIG. 47.

11.3 Compositing Model

For the purposes of discussing the page buffer compositing model, we define the following variables.

TABLE 41

Compositing variables

| variable | description | resolution | format |
|---|---|---|---|
| n | medium to high resolution scale factor | — | — |
| $C_{BgM}$ | background contone layer color | medium | 8-bit color component |
| $C_{ObM}$ | contone object color | medium | 8-bit color component |
| $\alpha_{ObM}$ | contone object opacity | medium | 8-bit opacity |
| $\alpha_{FgM}$ | medium-resolution foreground black layer opacity | medium | 8-bit opacity |
| $\alpha_{FgH}$ | foreground black layer opacity | high | 1-bit opacity |
| $\alpha_{TxH}$ | black object opacity | high | 1-bit opacity |

When a black object of opacity $\alpha_{TxH}$ is composited with the black layer, the black layer is updated as follows:

$$\alpha_{FgH}[x, y] \leftarrow \alpha_{FgH}[x, y] \vee \alpha_{TxH}[x, y] \quad \text{(Rule 1)}$$

$$\alpha_{FgM}[x, y] \leftarrow \frac{1}{n^2} \sum_{i=0}^{n-1} \sum_{j=0}^{n-1} 255 \alpha_{FgH}[nx + i, ny + j] \quad \text{(Rule 2)}$$

The object opacity is simply ored with the black layer opacity (Rule 1), and the corresponding part of the medium-resolution black layer is re-computed from the high-resolution black layer (Rule 2).

When a contone object of color $C_{ObM}$ and opacity $\alpha_{ObM}$ is composited with the contone layer, the contone layer and the black layer are updated as follows:

$$C_{BgM}[x, y] \leftarrow C_{BgM}[x, y](1-\alpha_{FgM}[x, y]) \text{ if } \alpha_{ObM}[x, y]>0 \quad \text{(Rule 3)}$$

$$\alpha_{FgM}[x, y] \leftarrow 0 \text{ if } \alpha_{ObM}[x, y]>0 \quad \text{(Rule 4)}$$

$$\alpha_{FgH}[x, y] \leftarrow 0 \text{ if } \alpha_{ObM}[x/n, y/n]>0 \quad \text{(Rule 5)}$$

$$C_{BgM}[x, y] \leftarrow C_{BgM}[x, y](1-\alpha_{ObM}[x, y])+C_{ObM}[x, y]\alpha_{ObM}[x, y] \quad \text{(Rule 6)}$$

Wherever the contone object obscures the black layer, even if not fully opaquely, the affected black layer pixels are pushed from the black layer to the contone layer, i.e. composited with the contone layer (Rule 3) and removed from the black layer (Rule 4 and Rule 5). The contone object is then composited with the contone layer (Rule 6).

If a contone object pixel is fully opaque (i.e. $\alpha_{Obm}[x, y]$=255), then there is no need to push the corresponding black pixels into the background contone layer (Rule 3), since the background contone pixel will subsequently be completely obliterated by the foreground contone pixel (Rule 6).

11.4 Page Compression and Delivery

Once page rendering is complete, the printer driver converts the contone layer to CePrint-specific CMYK with the help of color management functions provided by the graphics system.

The printer driver then compresses and packages the black layer and the contone layer into a CePrint page description as described in Section 6.2. This page description is delivered to the printer 10 via the standard spooler.

Note that the black layer is manipulated as a set of 1-bit opacity values, but is delivered to the printer 10 as a set of 1-bit black values. Although these two interpretations are different, they share the same representation, and so no data conversion is required.

The forward discrete cosine transform (DCT) is the costliest part of JPEG compression. In current high-quality software implementations, the forward DCT of each 8×8 block requires 12 integer multiplications and 32 integer additions. On typical modern general-purpose processors, an integer multiplication requires 10 cycles, and an integer addition requires 2 cycles. This equates to a total cost per block of 184 cycles.

The 26.4 MB contone layer consists of 432,538 JPEG blocks, giving an overall forward DCT cost of about 80 Mcycles. At 150 MHz this equates to about 0.5 seconds, which is 25% of the 2 second rendering time allowed per page.

A CE-oriented processor may have DSP support, in which case the presence of single-cycle multiplication makes the JPEG compression time negligible.

11.5 Banded Output

The printer control protocol supports the transmission of the page to the printer 10 as a series of bands. If the graphics system also supports banded output, then this allows the printer driver to reduce its memory requirements by rendering the image one band at a time. Note, however, that rendering one band at a time can be more expensive than rendering the whole page at once, since objects which span multiple bands have to be handled multiple times.

Although banded rendering can be used to reduce memory requirements in the printer driver, buffers for two bands are still required. One buffer is required for the band being transmitted to the printer 10; another buffer is required for the band being rendered. A single buffer may suffice if the connection between the host processor and printer is sufficiently fast. The band being transmitted to the printer may also be stored on disk, if a disk drive is present in the system, and only loaded into memory block-by-block during transmission.

12 Windows 9X/NT/CE Printer Driver

12.1 Windows 9x/NT/CE Printing System

In the Windows 9x/NT/CE printing system, a printer is a graphics device, and an application communicates with it via the graphics device interface (GDI). The printer driver graphics DLL (dynamic link library) implements the device-dependent aspects of the various graphics functions provided by GDI.

The spooler handles the delivery of pages to the printer, and may reside on a different machine to the application requesting printing. It delivers pages to the printer via a port monitor which handles the physical connection to the printer. The optional language monitor is the part of the printer driver which imposes additional protocol on communication with the printer, and in particular decodes status responses from the printer on behalf of the spooler.

The printer driver user interface DLL implements the user interface for editing printer-specific properties and reporting printer-specific events.

Figure 48:
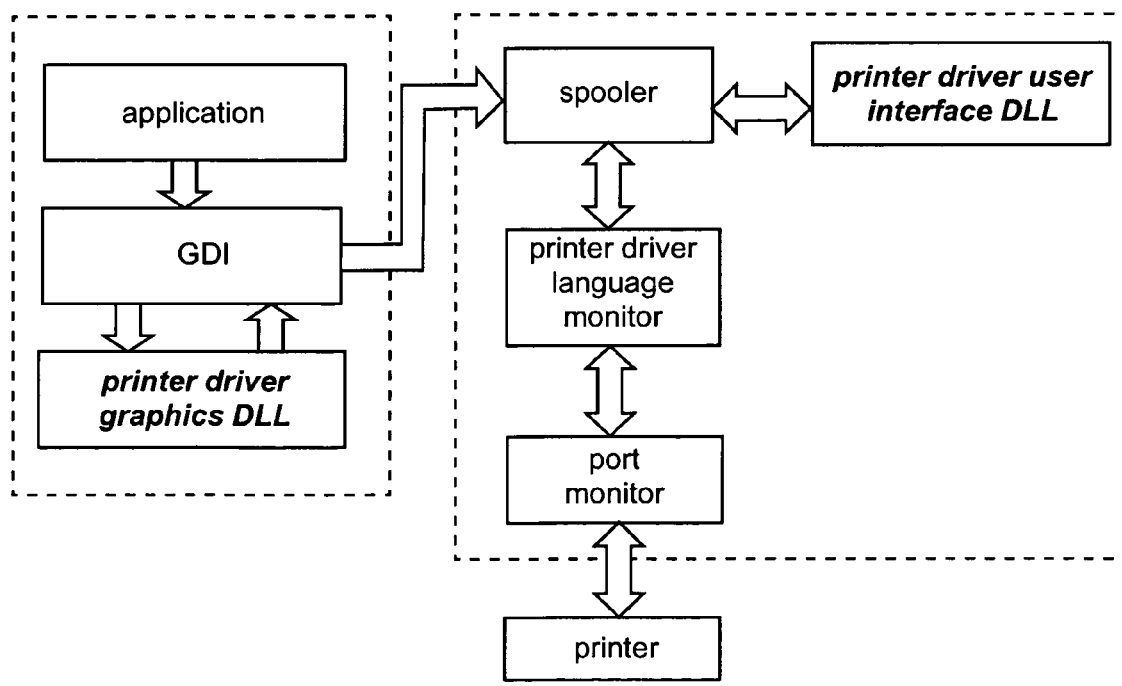
FIG. 48 shows a block diagram of a Windows 9x/NT/CE printing system with printer driver components indicated.

The structure of the Windows 9x/NT/CE printing system is illustrated in FIG. 48.

The printer driver language monitor and user interface DLL must implement the implement the relevant aspects of the printer control protocol described in Section 6.

The remainder of this section describes the design of the printer driver graphics DLL. It should be read in conjunction with the appropriate Windows 9x/NT/CE DDK documentation.

12.2 Windows 9x/NT/CE Graphics Device Interface (GDI)

GDI provides functions which allow an application to draw on a device surface, i.e. typically an abstraction of a display screen or a printed page. For a raster device, the device surface is conceptually a color bitmap. The application can draw on the surface in a device-independent way, i.e. independently of the resolution and color characteristics of the device.

The application has random access to the entire device surface. This means that if a memory-limited printer device requires banded output, then GDI must buffer the entire page's GDI commands and replay them windowed into each band in turn. Although this provides the application with great flexibility, it can adversely affect performance.

GDI supports color management, whereby device-independent colors provided by the application are transparently translated into device-dependent colors according to a standard ICC (International Color Consortium) color profile of the device. A printer driver can activate a different color profile depending, for example, on the user's selection of paper type on the driver-managed printer property sheet.

GDI supports line and spline outline graphics (paths), images, and text. Outline graphics, including outline font glyphs, can be stroked and filled with bit-mapped brush patterns. Graphics and images can be geometrically transformed and composited with the contents of the device surface. While Windows 95/NT4 provides only boolean compositing operators, Windows 98/NT5 provides proper alpha-blending.

12.3 Printer Driver Graphics DLL

A raster printer can, in theory, utilize standard printer driver components under Windows 9x/NT/CE, and this can make the job of developing a printer driver trivial. This relies on being able to model the device surface as a single bitmap. The problem with this is that text and images must be rendered at the same resolution. This either compromises text resolution, or generates too much output data, compromising performance.

As described earlier, CePrint's approach is to render black text and images at different resolutions, to optimize the reproduction of each. The printer driver is therefore implemented according to the generic design described in Section 11.

The driver therefore maintains a two-layer three-part page buffer as described in Section 11.2, and this means that the printer driver must take over managing the device surface, which in turn means that it must mediate all GDI access to the device surface.

12.3.1 Managing the Device Surface

A graphics driver must support a number of standard functions, including the following:

TABLE 42

Standard graphics driver interface functions

| function | description |
| --- | --- |
| DrvEnableDriver | Initial entry point into the driver graphics DLL. Returns addresses of functions supported by the driver. |
| DrvEnablePDEV | Creates a logical representation of a physical device with which the driver can associate a drawing surface. |
| DrvEnableSurface | Creates a surface to be drawn on, associated with a given PDEV. |

DrvEnablePDEV indicates to GDI, via the flGraphicsCaps member of the returned DEVINFO structure, the graphics rendering capabilities of the driver. This is discussed further below.

DrvEnableSurface creates a device surface consisting of two conceptual layers and three parts: the 267 ppi contone layer 24-bit RGB color, the 267 ppi black layer 8-bit opacity, and the 800 dpi black layer 1-bit opacity. virtual device surface which encapsulates these two layers has a nominal resolution of 267 ppi, so this is the resolution at which GDI operations take place.

Although the aggregate page buffer requires about 34 MB of memory, the size of the page buffer can be reduced arbitrarily by rendering the page one band at a time, as described in Section 12.3.4.

A printer-specific graphics driver must also support the following functions:

TABLE 43

Required printer driver functions

| function | description |
| --- | --- |
| DrvStartDoc | Performs any start-of-document handling |
| DrvStartPage | Handles the start of a new page. |
| DrvSendPage | Sends the current page to the printer via the spooler. |
| DrvEndDoc | Performs any end-of-document handling. |

DrvStartDoc sends the start document command to the printer, and DrvEndDoc sends the end document command.

DrvStartPage sends the start page command with the page header to the printer.

DrvSendPage converts the contone layer from RGB to CMYK using GDI-provided color management functions, compresses both the contone and black layers, and sends the compressed page as a single band to the printer (in a page band command).

Both DrvStartPage and DrvSendPage use EngWritePrinter to send data to the printer via the spooler.

Managing the device surface and mediating GDI access to it means that the printer driver must support the following additional functions:

TABLE 44

Required graphics driver functions for a device-managed surface

| function | description |
| --- | --- |
| DrvCopyBits | Translates between device-managed raster surfaces and GDI-managed standard-format bitmaps. |
| DrvStrokePath | Strokes a path. |
| DryPaint | Paints a specified region. |
| DrvTextOut | Renders a set of glyphs at specified positions. |

Copying images, stroking paths and filling regions all occur on the contone layer, while rendering solid black text occurs on the bi-level black layer. Furthermore, rendering non-black text also occurs on the contone layer, since it isn't supported on the black layer. Conversely, stroking or filling with solid black can occur on the black layer (if we so choose).

Although the printer driver is obliged to hook the aforementioned functions, it can punt function calls which apply to the contone layer back to the corresponding GDI implementations of the functions, since the contone layer is a standard-format bitmap. For every DrvXxx function there is a corresponding EngXxx function provided by GDI.

As described in Section 11.2, when an object destined for the contone layer obscures pixels on the black layer, the obscured black pixels must be transferred from the black layer to the contone layer before the contone object is composited with the contone layer. The key to this process working is that obscuration is detected and handled in the hooked call, before it is punted back to GDI. This involves determining the pixel-by-pixel opacity of the contone object from its geometry, and using this opacity to selectively transfer black pixels from the black layer to the contone layer as described in Section 11.2.

12.3.2 Determining Contone Object Geometry

It is possible to determine the geometry of each contone object before it is rendered and thus determine efficiently which black pixels it obscures. In the case of DrvCopyBits and DrvPaint, the geometry is determined by a clip object (CLIPOBJ), which can be enumerated as a set of rectangles.

In the case of DrvStrokePath, things are more complicated. DrvStrokePath supports both straight-line and Bèzier-spline curve segments, and single-pixel-wide lines and geometric-wide lines. The first step is to avoid the complexity of Bèzier-spline curve segments and geometric-wide lines altogether by clearing the corresponding capability flags (GCAPS_BEZIERS and GCAPS_GEOMETRICWIDE) in the flGraphicsCaps member of the driver's DEVINFO structure. This causes GDI to reformulate such calls as sets of simpler calls to DrvPaint. In general, GDI gives a driver the opportunity to accelerate high-level capabilities, but simulates any capabilities not provided by the driver.

What remains is simply to determine the geometry of a single-pixel-wide straight line. Such a line can be solid or cosmetic. In the latter case, the line style is determined by a styling array in the specified line attributes (LINEATTRS). The styling array specifies how the line alternates between being opaque and transparent along its length, and so supports various dashed line effects etc.

When the brush is solid black, straight lines can also usefully be rendered to the black layer, though with the increased width implied by the 800 dpi resolution.

12.3.3 Rendering Text

In the case of a DrvTextOut, things are also more complicated. Firstly, the opaque background, if any, is handled like any other fill on the contone layer (see DrvPaint). If the foreground brush is not black, or the mix mode is not effectively opaque, or the font is not scalable, or the font indicates outline stroking, then the call is punted to EngTextOut, to be applied to the contone layer. Before the call is punted, however, the driver determines the geometry of each glyph by obtaining its bitmap (via FONTOBJ_cGetGlyphs), and makes the usual obscuration check against the black layer.

If punting a DrvTextOut call is not allowed (the documentation is ambiguous), then the driver should disallow complex text operations. This includes disallowing outline stroking (by clearing the GCAPS_VECTOR_FONT capability flag), and disallowing complex mix modes (by clearing the GCAPS_ARBMIXTXT capability flag).

If the foreground brush is black and opaque, and the font is scalable and not stroked, then the glyphs are rendered on the black layer. In this case the driver determines the geometry of each glyph by obtaining its outline (again via FONTOBJ_cGetGlyphs, but as a PATHOBJ). The driver then renders each glyph from its outline at 800 dpi and writes it to the black layer. Although the outline geometry uses device coordinates (i.e. at 267 ppi), the coordinates are in fixed point format with plenty of fractional precision for higher-resolution rendering.

Note that strikethrough and underline rectangles are added to the glyph geometry, if specified.

The driver must set the GCAPS_HIGHRESTEXT flag in the DEVINFO to request that glyph positions (again in 267 ppi device coordinates) be supplied by GDI in high-precision fixed-point format, to allow accurate positioning at 800 dpi. The driver must also provide an implementation of the DrvGetGlyphMode function, so that it can indicate to GDI that glyphs should be cached as outlines rather than bitmaps. Ideally the driver should cache rendered glyph bitmaps for efficiency, memory allowing. Only glyphs below a certain point size should be cached.

12.3.4 Banded Output

As described in Section 6, the printer control protocol supports banded output by breaking the page description into a page header and a number of page bands. GDI supports banded output to a printer to cater for printer drivers and printers which have limited internal buffer memory.

GDI can handle banded output without application involvement. GDI simply records all the graphics operations performed by the application in a metafile, and then replays the entire metafile to the printer driver for each band in the page. The printer driver must clip the graphics operations to the current band, as usual. Banded output can be more efficient if the application takes note of the RC_BANDING bit in the driver's raster capabilities (returned by GetDeviceCaps when called with the RASTERCAPS index) and only performs graphics operations relevant to each band.

If banded output is desired because memory is limited, then the printer driver must enable banding by calling EngMarkBandingSurface in DrvEnableSurface. It must also support the following additional functions:

TABLE 45

| Required printer driver functions | |
|---|---|
| function | description |
| DrvStartBanding | Prepares the driver for banding and returns the origin of the first band. |
| DrvNextBand | Sends the current band to the printer and returns the origin of the next band, if any. |

Like DrvSendPage, DrvNextBand converts the contone layer from RGB to CMYK using GDI-provided color management functions, compresses both the contone and black layers, and sends the compressed page band to the printer (in a page band command).

It uses EngWritePrinter to send the band data to the printer via the spooler.

We claim:

1. Dual printhead controller architecture that comprises
a master central processor capable of being interfaced with a first printhead;
a slave central processor capable of being interfaced with a second printhead;
data transfer means operatively connected between the master central processor and the slave central processor to permit communication between the master and slave central processors; and
a host link operatively connected to the master central processor to permit the master central processor to receive page data from a host processor.

2. Dual printhead controller architecture as claimed in claim 1, in which the master and slave central processors are configured to be interfaced with respective printheads that incorporate pagewidth arrays of micro-electromechanical ink jet printing mechanisms.

3. Dual printhead controller architecture as claimed in claim 1, in which the data transfer means is in the form of a serial link interposed between the master and slave central processors.

4. Dual printhead controller architecture as claimed in claim 1, in which a master memory is connected to the master central processor, the master central processor being configured to store page data for both the printheads in the master memory.

5. Dual printhead controller architecture as claimed in claim 4, in which a slave memory is connected to the slave central processor to receive page data for the printhead of the slave central processor from the master central processor.

* * * * *

UNITED STATES PATENT AND TRADEMARK OFFICE
CERTIFICATE OF CORRECTION

| | | |
|---|---|---|
| PATENT NO. | : 7,414,749 B2 | Page 1 of 1 |
| APPLICATION NO. | : 11/501775 | |
| DATED | : August 19, 2008 | |
| INVENTOR(S) | : Paul Lapstun and Kia Silverbrook | |

It is certified that error appears in the above-identified patent and that said Letters Patent is hereby corrected as shown below:

On the cover page, item (30), "Foreign Application Priority Data" should read:

--Foreign Application Priority Data

Dec. 16, 1998 (AU) ..........................PP7737

Dec. 16, 1998 (AU) ..........................PP7738

Apr. 23, 1999 (AU) ..........................PP9961--

Signed and Sealed this

Eighth Day of March, 2011

David J. Kappos
*Director of the United States Patent and Trademark Office*